United States Patent
Shelton et al.

(10) Patent No.: US 8,069,466 B2
(45) Date of Patent: Nov. 29, 2011

(54) ADVANCED DIGITAL TV SYSTEM

(75) Inventors: Ian Shelton, Ringwood (GB); James Geoffrey Walker, Guildford (GB); Kevin Murray, Fordingbridge (GB); Michael Costello, Middlesex (GB); Nicholas Ashton Hall, Walton-on-Thames (GB)

(73) Assignee: NDS Limited, Staines, Middlesex (GB)

( * ) Notice: Subject to any disclaimer, the term of this patent is extended or adjusted under 35 U.S.C. 154(b) by 661 days.

(21) Appl. No.: 11/920,605

(22) PCT Filed: Jul. 3, 2006

(86) PCT No.: PCT/GB2006/002463
§ 371 (c)(1),
(2), (4) Date: Jan. 22, 2008

(87) PCT Pub. No.: WO2007/015047
PCT Pub. Date: Feb. 8, 2007

(65) Prior Publication Data
US 2009/0249393 A1 Oct. 1, 2009

Related U.S. Application Data

(60) Provisional application No. 60/705,430, filed on Aug. 4, 2005.

(51) Int. Cl.
*H04N 7/16* (2011.01)

(52) U.S. Cl. ............. 725/134; 725/87; 725/88; 725/89; 725/90; 725/91; 725/92; 725/93; 725/94; 725/95; 725/96; 725/97; 725/98; 725/114; 725/115; 725/116; 725/144; 725/145; 725/146; 725/131; 725/133; 725/139; 725/141; 725/142; 725/153; 375/240.01; 375/240.25; 386/216; 386/217; 386/248; 386/349

(58) Field of Classification Search ............. 725/87–98, 725/114–116, 144–146, 131, 133–134, 139, 725/141–142, 151, 153; 375/240.01, 240.25; 386/216–217, 248, 349
See application file for complete search history.

(56) References Cited

U.S. PATENT DOCUMENTS
5,296,931 A * 3/1994 Na .................................. 725/38
(Continued)

FOREIGN PATENT DOCUMENTS
EP         0 912 063 B1      2/2002
(Continued)

OTHER PUBLICATIONS

Chih-Hung Li et al., "A Fast H.264-Based Picture-in-Picture (PIP) Transcoder", Department of Electronics Engineering, National Chiao Tung University, 2004 IEEE International Conference on Multimedia and Expo.

(Continued)

*Primary Examiner* — Jason Salce
(74) *Attorney, Agent, or Firm* — Husch Blackwell LLP

(57) ABSTRACT

A system for displaying electronic program guide information about a plurality of video items on a screen, the system including a display module to display a plurality of pages layering into the screen, each of the pages including a plurality of graphical panels associated with the video items, and a user input module to receive a user input to turn at least one of the pages such that the at least one page is peeled away from other ones of the pages in order to bring the graphical panels of the at least one page in or out of view, wherein the display module is operative to show the turning of the at least one page bringing the at least one page in or out of view. Related apparatus and methods are also described.

2 Claims, 26 Drawing Sheets

U.S. PATENT DOCUMENTS

| | | | |
|---|---|---|---|
| 5,568,200 | A | 10/1996 | Pearlstein et al. |
| 5,691,768 | A | 11/1997 | Civanlar et al. |
| 5,959,690 | A * | 9/1999 | Toebes et al. .................. 348/578 |
| 6,419,137 | B1 | 7/2002 | Marshall et al. |
| 6,466,220 | B1 | 10/2002 | Cesana et al. |
| 6,583,793 | B1 | 6/2003 | Gould et al. |
| 6,621,870 | B1 | 9/2003 | Gordon et al. |
| 6,735,253 | B1 * | 5/2004 | Chang et al. ............. 375/240.16 |
| 7,733,830 | B2 * | 6/2010 | Curcio et al. .................. 370/333 |
| 2003/0021346 | A1 * | 1/2003 | Bixby et al. ............. 375/240.25 |
| 2003/0093803 | A1 * | 5/2003 | Ishikawa et al. ................ 725/94 |
| 2003/0156220 | A1 | 8/2003 | Narita |
| 2004/0017378 | A1 | 1/2004 | Lin et al. |
| 2004/0028142 | A1 | 2/2004 | Kim |
| 2004/0047417 | A1 | 3/2004 | Gordon et al. |
| 2004/0047614 | A1 * | 3/2004 | Green .......................... 386/111 |
| 2004/0057523 | A1 | 3/2004 | Koto et al. |
| 2004/0067043 | A1 * | 4/2004 | Duruoz et al. .................. 386/68 |
| 2004/0078822 | A1 * | 4/2004 | Breen et al. ..................... 725/86 |
| 2004/0096002 | A1 | 5/2004 | Zdepski et al. |
| 2004/0190614 | A1 | 9/2004 | Schlockermann et al. |
| 2005/0155061 | A1 | 7/2005 | Kim |
| 2005/0257239 | A1 * | 11/2005 | Evans et al. ..................... 725/88 |
| 2006/0050790 | A1 | 3/2006 | Eerenberg et al. |
| 2007/0133951 | A1 * | 6/2007 | Flecchia ....................... 386/112 |
| 2008/0292263 | A1 * | 11/2008 | Van Gestel ..................... 386/52 |

FOREIGN PATENT DOCUMENTS

| | | |
|---|---|---|
| EP | 1 365 385 A2 | 11/2003 |
| EP | 1 383 339 A1 | 1/2004 |
| EP | 0 919 953 B1 | 8/2004 |
| GB | 2 353 123 A | 2/2001 |
| GB | 2 403 618 A | 1/2005 |
| JP | 11-122555 | 4/1999 |
| JP | 11-168729 | 6/1999 |
| JP | 2002-016876 | 1/2002 |
| KR | 100411174 B1 | 12/2003 |
| WO | WO 98/26596 | 6/1998 |
| WO | WO 00/62298 | 10/2000 |
| WO | WO 02/45304 A2 | 6/2002 |
| WO | WO 2004/056098 A1 | 7/2004 |
| WO | WO 2004/072935 A2 | 8/2004 |

OTHER PUBLICATIONS

Dong Tian et al., "DPB Management", Joint Video Team (JVT) of ISO/IEC MPEG & ITU-T VCEG, 6th Meeting: Awaji, Island, JP, Dec. 5-13, 2002.

Kent Wittenburg et al., "Rapid Serial Visual Presentation Techniques for Consumer Digital Video Devices", Mitsubishi Electric Research Laboratory, TR-2003-19, Aug. 2003.

Dirac Enhancements, Multiple Reference Frames, available on the worldwide web at: http://dirac.sourceforge.net/documentation/algorithm/enhancements/080multi_ref._htm.

* cited by examiner

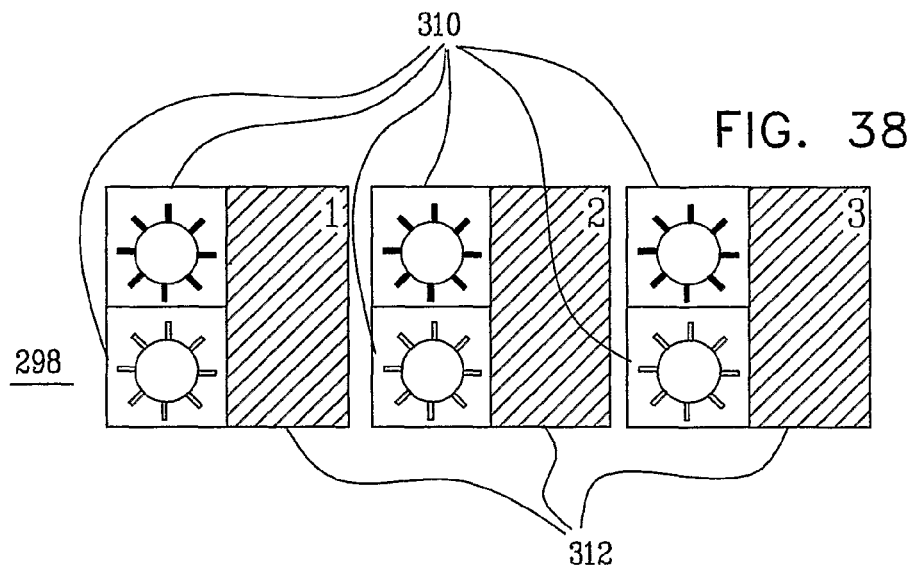
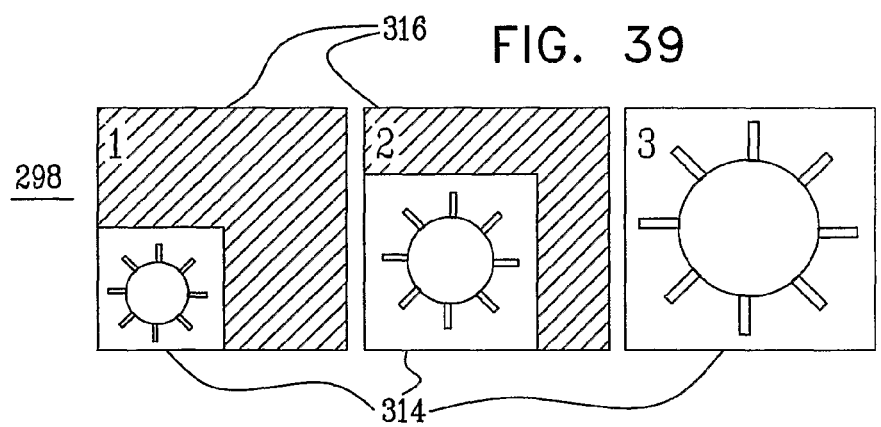
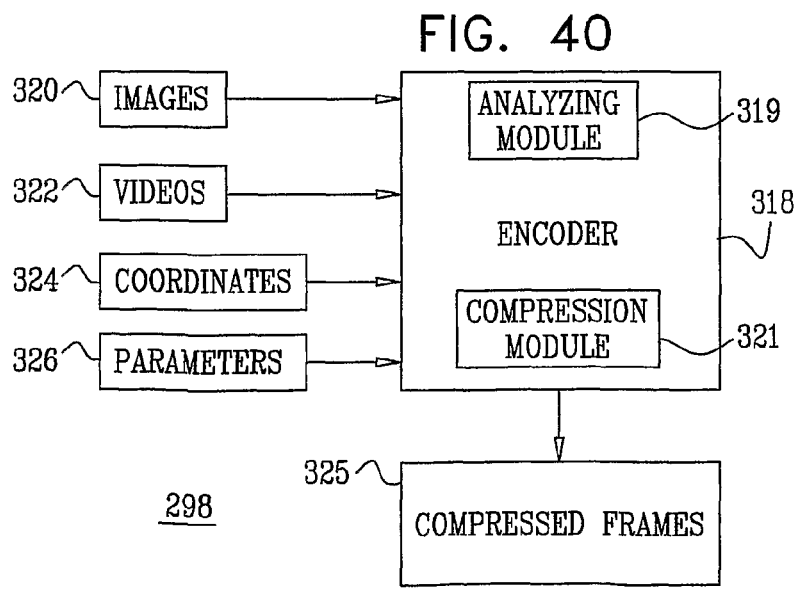

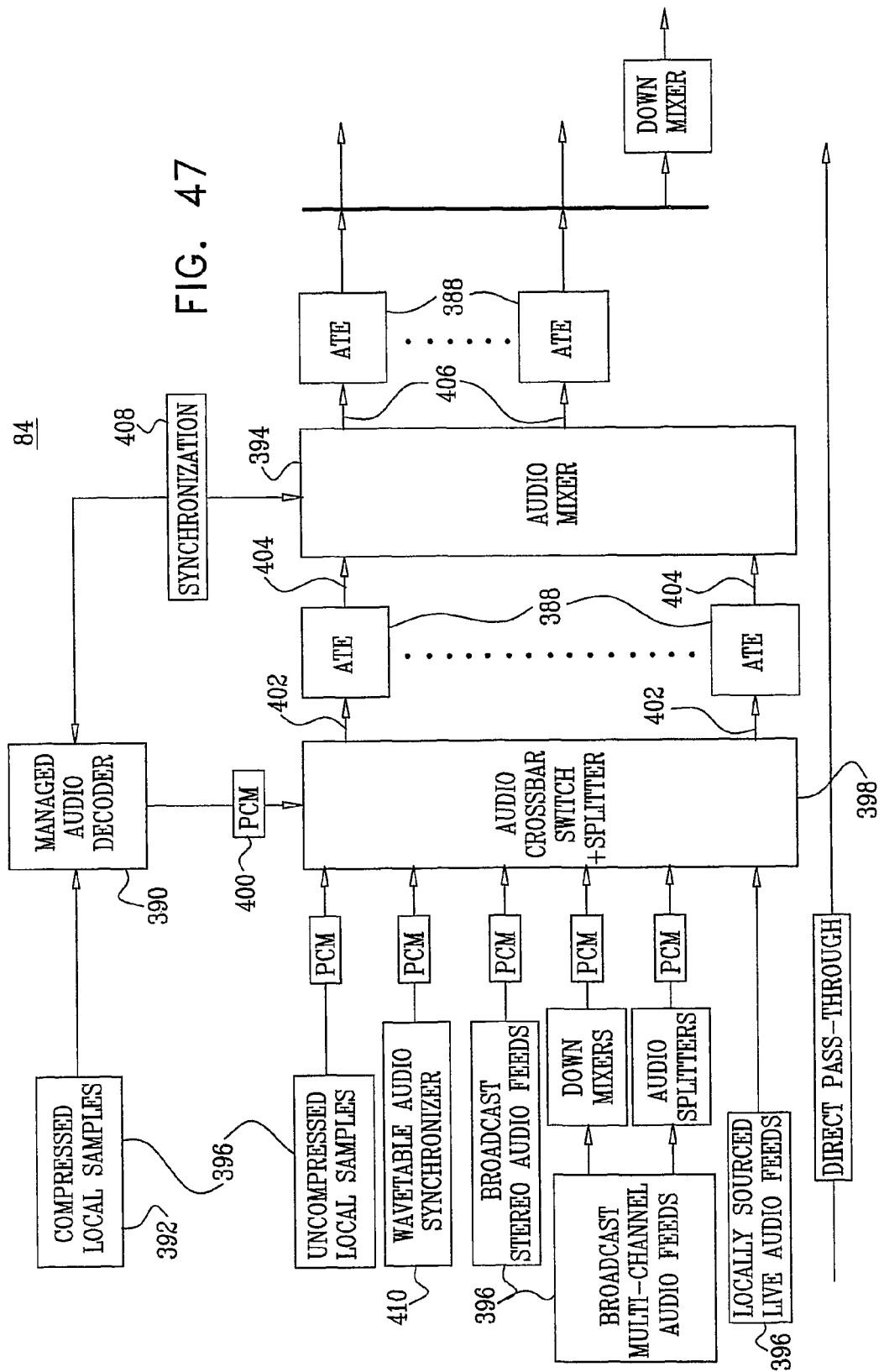

ADVANCED DIGITAL TV SYSTEM

RELATED APPLICATION INFORMATION

The present application is a 35 USC §371 application of PCT/GB2006/002463, filed on 3 Jul. 2006 and entitled "Advanced Digital TV System", which was published on 8 Feb. 2007 in the English language with International Publication Number WO 2007/015047 and which relies for priority on U.S. Provisional Patent Application Ser. No. 60/705,430 of Shelton, et al., filed 4 Aug. 2005, the disclosures of which are hereby incorporated herein by reference.

FIELD OF THE INVENTION

The present invention relates to an advanced digital television (TV) system.

BACKGROUND OF THE INVENTION

By way of introduction, viewers are now expecting more advanced graphics, video and audio in relation to television as a result of their experience with computers, and in particular the Internet. However, capabilities of set top boxes are generally limited due to inherent limitations of the set top boxes, mainly in relation to the hardware thereof.

One solution is to use a similar hardware set up used in computers and other advanced graphic, video and/or audio systems. However, the computer and similar systems are generally too expensive to be implemented in a set top box.

The following references are also believed to represent the state of the art:

US Published Patent Application 2005/0155061 of Kim;
US Published Patent Application 2004/004717 of Gordon, et al.;
US Published Patent Application 2003/0156220 of Narita;
US Published Patent Application 2004/0017378 of Lin, et al.;
US Published Patent Application 2004/0190614 of Schlockermann, et al.;
PCT Published Patent Application WO 2004/072935 of NDS Limited;
US Published Patent Application 2006/0050790 of Eerenberg, et al.;
European Published Patent Application EP1365385 of Broadcom Corporation;
Japan Published Patent Application 11-168729 of Toshiba Corp.;
Japan Published Patent Application 2002-016876 of Toshiba Corp.;
U.S. Pat. No. 6,446,220 to Cesana, et al.; and
A publication entitled "Rapid Serial Visual Presentation Techniques for Consumer Digital Video Devices" by the Mitsubishi Electric Research Laboratory, August 2003.

The disclosures of all references mentioned above and throughout the present specification, as well as the disclosures of all references mentioned in those references, are hereby incorporated herein by reference.

SUMMARY OF THE INVENTION

The present invention, in preferred embodiments thereof, includes an advanced set top box system including hardware and software for providing enhanced graphics (including overlay graphics and animations), video, audio, user input and timeline and synchronization.

In preferred embodiments thereof, the advanced set top box system includes some or all of the following functionality: display a mixture of synchronized graphics and video in such a way that the graphics and video merge and it is generally difficult to see which one is which; present video transitions and effects which are preferably at least of the quality seen in studio presentation equipment; jump around video clips from any suitable frame on one stream to any suitable frame on another stream at any suitable speed and with the stream playing out in any direction; change the speed and direction of playout smoothly and without any visible defects; present audio and audio effects which are at least of the quality available on modern consumer entertainment equipment; separately control the playout of audio regardless of what is happening to the video or graphics; perform audio mixing from multiple sources; improve the synchronization and timeline control; control playout and transitions of graphics, video and audio with field accuracy; control playout to achieve the presentation quality to at least that seen in studio presentation equipment; support multiple controllers of different types simultaneously; and allow for advanced input types, for example, but not limited to, iMotion and voice recognition.

The present invention, in preferred embodiments thereof also includes a system and method for compressing electronic program guide (EPG) screenshots and video clips, for example, but not limited to, as a sequence of P or B coded MPEG video frames.

The present invention, in preferred embodiments thereof also includes a high definition EPG having a series of tabbed graphical paneled pages which layer into the screen in much the same way as a series of files in a filing cabinet or a series of Music compact disks (CDs) in a rack of CDs. A remote control, for example, is then be used to peel away or bring back layers, effectively giving the illusion of moving through a stack of pages of information.

There is thus provided in accordance with a preferred embodiment of the present invention, a system for displaying electronic program guide information about a plurality of video items on a screen, the system including a display module to display a plurality of pages layering into the screen, each of the pages including a plurality of graphical panels associated with the video items, and a user input module to receive a user input to turn at least one of the pages such that the at least one page is peeled away from other ones of the pages in order to bring the graphical panels of the at least one page in or out of view, wherein the display module is operative to show the turning of the at least one page bringing the at least one page in or out of view.

Further in accordance with a preferred embodiment of the present invention each of the pages includes a tab to facilitate selection of any one of the pages.

Still further in accordance with a preferred embodiment of the present invention each of the graphical panels has a shape, the display module being operative to display on the screen a non-linear changing of the shape of the graphical panels of the at least one page as the at least one page is being turned.

Additionally in accordance with a preferred embodiment of the present invention the display module is operative to display the video items in the graphical panels.

Moreover in accordance with a preferred embodiment of the present invention each of the video items displayed in the graphical panels has a shape, the display module being operative to display on the screen a non-linear changing of the shape of the videos of the at least one page as the at least one page is being turned.

Further in accordance with a preferred embodiment of the present invention the video items include a plurality of live video items.

Still further in accordance with a preferred embodiment of the present invention the video items include a plurality of non-live sourced video items.

Additionally in accordance with a preferred embodiment of the present invention the display module is operative to display the at least one page turning about an axis.

Moreover in accordance with a preferred embodiment of the present invention the display module is operative to display the at least one page turning vertically about a horizontal axis.

Further in accordance with a preferred embodiment of the present invention the user input module is operative to receive a user input to extend one of the pages to an extended page, the display module being operative to show the extended page on the screen, the extended page including additional information relating to one or more of the graphical panels of the extended page.

Still further in accordance with a preferred embodiment of the present invention each of the pages is uniquely associated with one of a plurality of television channels.

Additionally in accordance with a preferred embodiment of the present invention the pages are arranged alphabetically.

Moreover in accordance with a preferred embodiment of the present invention the graphical panels of each of the pages are arranged alphabetically.

Further in accordance with a preferred embodiment of the present invention the pages are arranged chronologically.

Still further in accordance with a preferred embodiment of the present invention the graphical panels of each of the pages are arranged chronologically.

Additionally in accordance with a preferred embodiment of the present invention the user input module is operative to receive a user input to move a focus between graphical panels in one of the pages, the display module being operative to display the focus on one of the graphical panels.

Moreover in accordance with a preferred embodiment of the present invention the user input module is operative to receive a user input to turn at least one of the pages and move a position of a focus of the graphical panels in the pages at the same time.

There is also provided in accordance with still another preferred embodiment of the present invention, a set-top box system including a decoder to decode a compressed video stream into a decoded video stream, and an alpha generator operationally connected to the decoder, the alpha generator being operative to generate an alpha channel for the decoded video stream.

Further in accordance with a preferred embodiment of the present invention, the system includes a compositor operationally connected to the alpha generator, the compositor being operative to alpha blend the decoded video stream with another decoded video stream based on the alpha channel.

Still further in accordance with a preferred embodiment of the present invention the decoded video stream includes a plurality of video frames, the alpha generator being operative to generate the alpha channel based on at least one of the video frames.

Additionally in accordance with a preferred embodiment of the present invention the one video frame includes a set of RGB values, the alpha generator being operative to generate the alpha channel based on the set of RGB values.

Moreover in accordance with a preferred embodiment of the present invention the decoded video stream includes a plurality of video frames, the alpha channel includes a value applied to at least one of the video frames.

Further in accordance with a preferred embodiment of the present invention the decoded video stream includes a plurality of video frames, each of the video frames including a plurality of pixels, the alpha channel includes a value applied to each of the pixels of at least one of the video frames.

Still further in accordance with a preferred embodiment of the present invention the alpha generator is operative to apply the value to each of the pixels of at least one of the video frames based on a vector based graphics system.

Additionally in accordance with a preferred embodiment of the present invention the alpha generator is operative to apply the value to each of the pixels of at least one of the video frames based on at least one bitmap sequence.

Moreover in accordance with a preferred embodiment of the present invention, the system includes a memory arrangement having a plurality of areas, the memory arrangement being operationally connected to the alpha generator, the decoded video stream including a plurality of video frames, each of the video frames including a plurality of blocks of pixels, and an image transform engine operationally connected to the memory arrangement, the image transform engine being operative to move the blocks between the areas of the memory arrangement.

Further in accordance with a preferred embodiment of the present invention the image transform engine is a blitter.

Still further in accordance with a preferred embodiment of the present invention the image transform engine is operative to perform image transform operations on the pixels.

Additionally in accordance with a preferred embodiment of the present invention the image transform engine is operative to perform at least one of scaling and shaping of at least part of least one of the video frames.

Moreover in accordance with a preferred embodiment of the present invention the image transform engine and the alpha generator are operative to perform a video transition effect between the decoded video stream and another decoded video stream.

There is also provided in accordance with still another preferred embodiment of the present invention, a set-top box system for cueing up of material, the system including a storage arrangement to store a plurality of videos, and a first decoder operationally connected to the storage arrangement, the first decoder being operative to decode one of the videos off of the storage arrangement, stop decoding the one video at a first specific frame, save at least one reference frame and a plurality of decoding state information, the at least one reference frame and the decoding state information being necessary to allow restarting the decoding from the first specific frame, loading the at least one reference frame and the decoding state information, and then restarting the decoding from the first specific frame at a future point in time.

Further in accordance with a preferred embodiment of the present invention, the system includes a second decoder to decode a main streamed video, and a compositor operationally connected to the first decoder and the second decoder, the compositor being operative to composite the outputs of the first decoder and the second decoder such that the one video from the first specific frame is inserted into the main streamed video.

Still further in accordance with a preferred embodiment of the present invention the first decoder is operative to decode another one of the videos off of the storage arrangement to a second specific frame, while the one video is still cued up in the first decoder, such that the other video is also cued up ready to be decoded from the second specific frame at another future point in time.

Additionally in accordance with a preferred embodiment of the present invention the first decoder is operative to decode the other video from the second specific frame at the other future point in time.

Moreover in accordance with a preferred embodiment of the present invention the first decoder is operative to de-cue the previously cued up other video.

Further in accordance with a preferred embodiment of the present invention the first decoder is operative to select the one video for decoding instead of the other video.

Still further in accordance with a preferred embodiment of the present invention the first decoder is operative to decode the one video off of the storage arrangement to the first specific frame faster than real time.

There is also provided in accordance with still another preferred embodiment of the present invention, a screenshot compression system for compressing uncompressed screenshots, the system including an encoder including an analyzing module to analyze the screenshots to identify commonality among the screenshots, and create a reference frame based on the commonality of the screenshots, and a compression module to compress the screenshots based on the reference frame.

Additionally in accordance with a preferred embodiment of the present invention the screenshots include a plurality of macroblock boundaries, the analyzing module being operative to analyze the screenshots based on the macroblock boundaries.

Moreover in accordance with a preferred embodiment of the present invention the compression module is operative to compress the screenshots into a stream including a plurality of compressed frames, the compressed frames including at least one of an MPEG B-frame and an MPEG P-frame.

Further in accordance with a preferred embodiment of the present invention the compression module is operative to compress the reference frame as an MPEG I-frame in the stream of the compressed frames.

Still further in accordance with a preferred embodiment of the present invention the reference frame is compressed and sent in a different stream to the stream of compressed frames.

Additionally in accordance with a preferred embodiment of the present invention the analyzing module is operative to reorder a sequence of the screenshots so as to improve efficiency of the compression of the screenshots.

There is also provided in accordance with still another preferred embodiment of the present invention, a screenshot compression system for compressing uncompressed screenshots, the system including an encoder including an analyzing module to analyze the screenshots to identify commonality among the screenshots, and determine a suitable reference frame based on the commonality of the screenshots, the suitable reference frame being selected from a pre-existing frame, and a compression module to compress the screenshots based on the reference frame.

Moreover in accordance with a preferred embodiment of the present invention the compression module is operative to compress the screenshots into a stream including a plurality of compressed frames, the compressed frames including at least one of an MPEG B-frame and an MPEG P-frame.

Further in accordance with a preferred embodiment of the present invention the reference frame is part of a dictionary of images that resides in a set-top box.

Still further in accordance with a preferred embodiment of the present invention the compression module is operative to compress the screenshots into a stream including a plurality of compressed frames, the compressed frames including an MPEG I-frame and at least one of an MPEG B-frame and an MPEG P-frame, the MPEG I-frame corresponding to the reference frame.

Additionally in accordance with a preferred embodiment of the present invention the screenshots include a plurality of macroblock boundaries, the analyzing module being operative to analyze the screenshots based on the macroblock boundaries.

Moreover in accordance with a preferred embodiment of the present invention the analyzing module is operative to reorder a sequence of the screenshots so as to improve efficiency of the compression of the screenshots.

There is also provided in accordance with still another preferred embodiment of the present invention, a set-top box system to display a video of a first video stream including a window displaying a video of a second video stream using a long-term reference frame, the system including a first decoder to decode the first video stream, the first video stream including a reference to the long-term reference frame, and a second decoder to decode the second video stream, the second decoder having an output frame, the long-term reference frame pointing to the output frame, the second decoder being operative to be start decoding the second video stream without driving an output.

Further in accordance with a preferred embodiment of the present invention the at least one long-term reference frame is not received by the set-top box system in a main video stream.

There is also provided in accordance with still another preferred embodiment of the present invention, a set-top box system for managing reference frames, the system including a decoder independent buffer to store at least one reference frame, and a video decoder to decode a compressed video based on the at least one reference frame, the decoder having a dedicated buffer to store the at least one reference frame, the decoder being operative to transfer the at least one reference frame between the dedicated buffer and the decoder independent buffer.

There is also provided in accordance with still another preferred embodiment of the present invention, a set-top box system, including a storage arrangement to store a compressed video clip formed from a plurality of sub-regions of at least one video frame, the video clip having a start and an end, and a decoder arrangement to loop-decode the sub-regions of the at least one video frame with a seamless cut between the start and the end of the video clip.

There is also provided in accordance with still another preferred embodiment of the present invention, a set-top box system, including a storage arrangement to store a plurality of compressed video images, each of the video images having a size, and a flexible video decoder, the decoder having a maximum processing speed, the decoder being operative to decode a variable number of the compressed video images at the same time, the variable number being based on the maximum processing speed of the decoder and the size of the video images for decoding.

There is also provided in accordance with still another preferred embodiment of the present invention, a set-top box system, including a decoder operative to receive a compressed frame which is too large for decoding by the decoder, and decode only a sub-region of the compressed frame.

There is also provided in accordance with still another preferred embodiment of the present invention, a method for displaying electronic program guide information about a plurality of video items on a screen, the method including displaying a plurality of pages layering into the screen, each of the pages including a plurality of graphical panels associated with the video items, receiving a user input to turn at least one of the pages such that the at least one page is peeled away from other ones of the pages in order to bring the graphical panels of the at least one page in or out of view, and showing the turning of the at least one page bringing the at least one page in or out of view.

There is also provided in accordance with still another preferred embodiment of the present invention, a method including decoding a compressed video stream into a decoded video stream, and generating an alpha channel for the decoded video stream.

There is also provided in accordance with still another preferred embodiment of the present invention, a method for cueing up of material, the method including storing a plurality of videos, decoding one of the videos, stopping the decoding of the one video at a first specific frame, saving at least one reference frame and a plurality of decoding state information, the at least one reference frame and the decoding state information being necessary to allow restarting the decoding from the first specific frame, loading the at least one reference frame and the decoding state information, and then restarting the decoding from the first specific frame at a future point in time.

There is also provided in accordance with still another preferred embodiment of the present invention, a screenshot compression method for compressing uncompressed screenshots, the method including analyzing the screenshots to identify commonality among the screenshots, creating a reference frame based on the commonality of the screenshots, and compressing the screenshots based on the reference frame.

There is also provided in accordance with still another preferred embodiment of the present invention, a screenshot compression method for compressing uncompressed screenshots, the method including analyzing the screenshots to identify commonality among the screenshots, determining a suitable reference frame based on the commonality of the screenshots, the suitable reference frame being selected from a pre-existing frame, and compressing the screenshots based on the reference frame.

There is also provided in accordance with still another preferred embodiment of the present invention, a method for playing a video clip, including storing a compressed video clip formed from a plurality of sub-regions of at least one video frame, the video clip having a start and an end, and loop-decoding the sub-regions of the at least one video frame with a seamless cut between the start and the end of the video clip.

BRIEF DESCRIPTION OF THE DRAWINGS

The present invention will be understood and appreciated more fully from the following detailed description, taken in conjunction with the drawings in which:

FIG. 38 is a view of a plurality of images including equal sized spare area for use in the compression system of FIG. 34;

FIG. 39 is a view of a plurality of images including unequal sized spare area for use in the compression system of FIG. 34;

FIG. 40 is a block diagram view of the compression system of FIG. 34 constructed and operative in accordance with a preferred embodiment of the present invention;

FIG. 47 is a block diagram view of an audio effects processor of the set-top box system of FIG. 13.

DETAILED DESCRIPTION OF A PREFERRED EMBODIMENT

By way of introduction, the preferred embodiments provided herein are preferably implemented in hardware and/or software. It will be appreciated that the exact specification for the silicon chip(s) used in implementation is very much driven by the platform operator and the chipset vendor. Therefore, the description below specifies the general requirements necessary in order to enable the preferred embodiments to be implemented. For example, a particular set-top box (STB) platform may require more TV outputs, or more input tuners. It is appreciated that each STB platform needs to be treated on a case by case basis and may require multiple copies of the system building blocks described in the preferred embodiments, below, in order to achieve the desired functionality. Similarly, different chipset vendors implement hardware in different ways and therefore the vendors derive acceleration in different ways.

Figure 1:
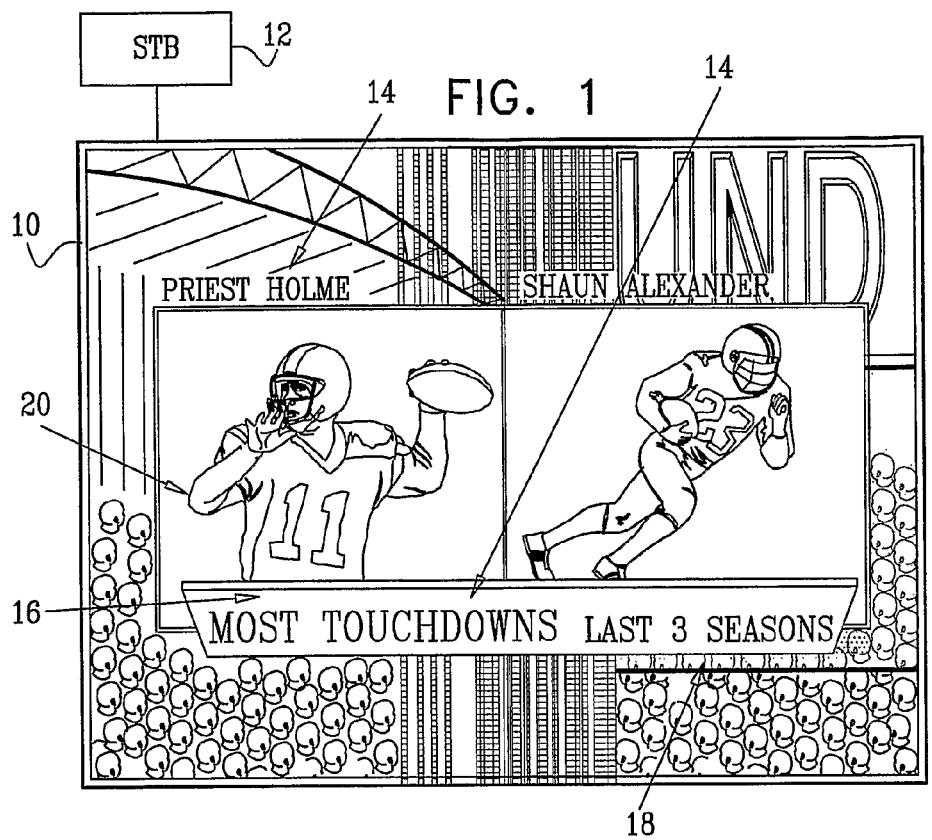
FIG. 1 is a sample screen of an interactive TV application running on a set-top box system constructed and operative in accordance with a preferred embodiment of the present invention.
Figure 2:
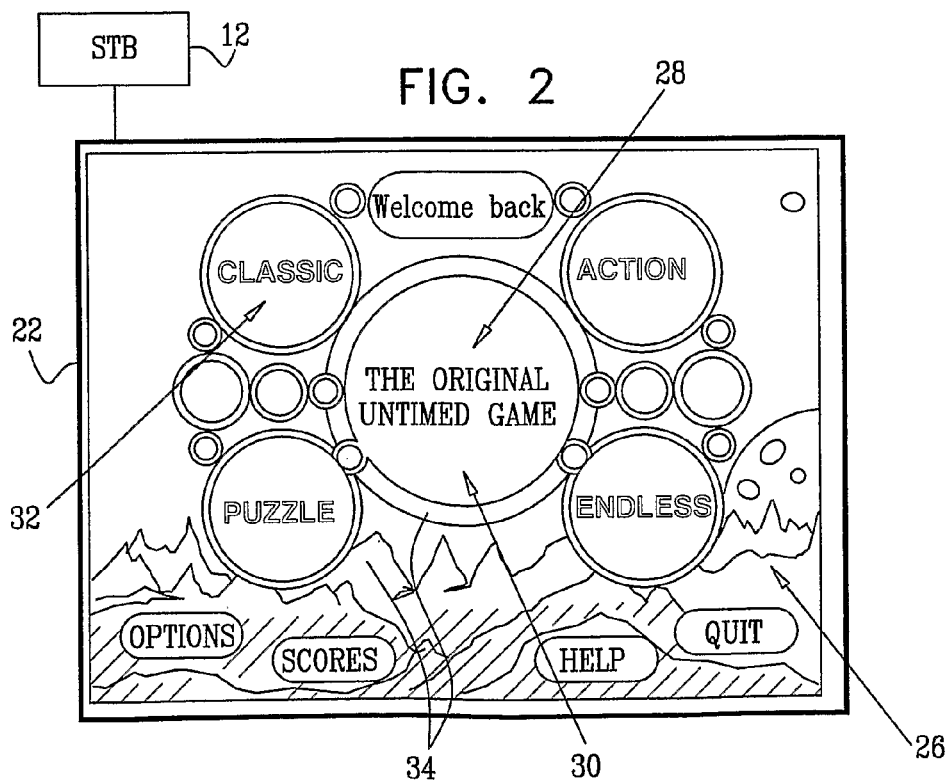
FIGS. 2 and 3 are sample screens of a game application running on the set-top box system of FIG. 1.
Figure 3:
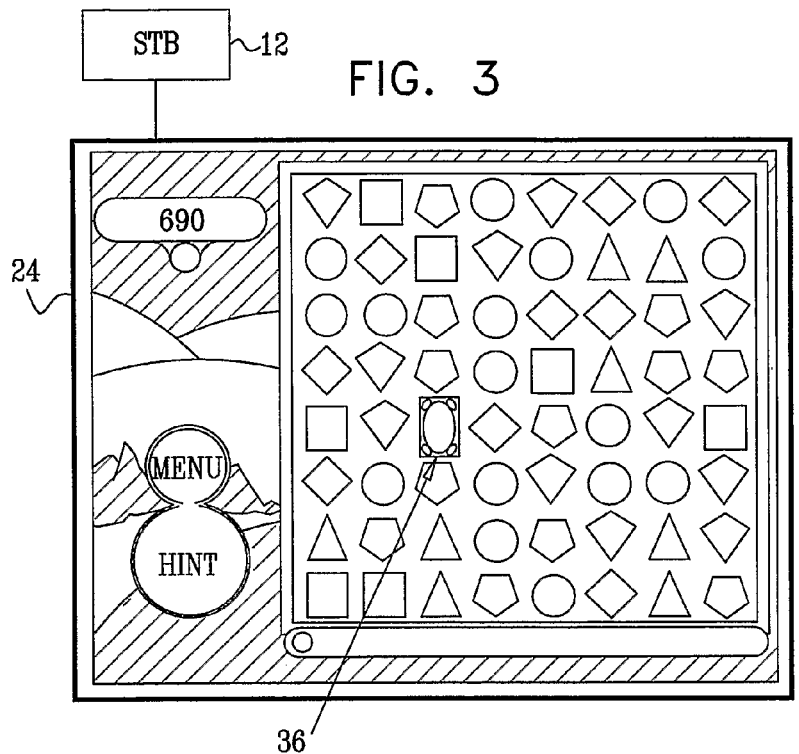

FIGS. 1-3 illustrate the kind of graphical, video and audio effects that are preferably produced in preferred embodiment of the present invention.

Reference is now made to FIG. 1, which is a sample screen 10 of an interactive TV application running on a set-top box system 12 constructed and operative in accordance with a preferred embodiment of the present invention. The set-top box system 12 is preferably operative to support one or more of the following (typically derived from TV studio presentation mixers): scaleable text with different weightings in the same line; wide color range, anti-aliased, drop shadowed text; animated and rotating/revealing text into place (arrow 14); high quality scaleable bitmap image processing that preferably does not introduce visual artifacts into the bitmap graphics for example using bilinear and bicubic algorithms; pseudo three-dimensional (3D) rotations or text or graphical constructions (arrow 16); multiple layers of arbitrarily size video animated into view with alpha reveal (arrow 18); bitmaps scale up to appear in the screen (arrow 20); all operations synchronized to a timeline; multiple areas of constantly moving overlays; overlays revealed through changes in transparency; pseudo 3D rotating logos; animated overlays exploding from the screen to form the backdrop to areas of text or other graphics; multiple moving video overlays of any suitable size or shape and in any suitable position on the screen; large moving backgrounds; bitmap images animated across the screen at any suitable speed; any suitable number of bitmap images effortlessly moved at different places and with different speeds; flares or flashes tracked across the screen to highlight areas or draw the eye to a particular area of the screen; text revealed through changes in alpha; text revealed in synchronization with a background area reveal; text animated in from somewhere and revealed through changes in transparency; text textured with bitmap or gradient fills; text scaled up/down with precision and substantially no loss of quality; TV Channel identification text animated across the screen and positioned against the edge of a moving video transition; graphical elements drawn or filled at a controlled rate; text rotated into view; flashes or flare effects flash through the text as the text rotates; multiple layers of graphical overlays and high quality text (anti-aliased, textured, filtered, blended and scalable text) flies into position from different areas of the screen in a pre-determined sequence with accurate animation and changing transparency; tables of text lines scrolled or rotated into view according to a predetermined order; timing of scrolling or rotations is controlled; transparency of table elements is also controlled; lines of tables rotate at different rates to give a cascading rotation effect; flashes or flares are added to a table to highlight key parts of the table; and complex alpha based reveals or transitions performed between different layers of graphics.

Other general functionality of the set-top box system 12 is now described below.

The set-top box system 12 is also operative to preferably provide functionality for 3D games, for example, but not limited to: enabling multiple tracks of video (typically four or more tracks) to be seamlessly switched from one part of one track to another part of another track; high quality text rendering (anti-aliased, textured, filtered, blended and scalable text); 3D-like Play objects and audio mixing.

Additionally or alternatively, the set-top box system 12 is also preferably operative to provide functionality such that if an advertisement is stored with content to disk, the advertisement can be frame accurately replaced with an alternative suitable piece of content and any suitable transitions are generally possible.

Reference is now made to FIGS. 2 and 3, which show a sample screen 22 and a sample screen 24 of a game application running on the set-top box system 12 of FIG. 1, respectively. The set-top box system 12 is preferably operative to provide functionality for the enhanced presentation of 2D games as shown in the sample screen 22 of FIG. 2 and the sample screen 24 of FIG. 3. The following features are typically provided: full screen moving backgrounds (arrow 26); text effects including shimmering and drop shadows (arrow 28); precision animation of large bitmaps (arrow 30); gradient light simulating fills (arrow 32); multiple layer of graphics moving independently (arrow 34); large number of (for example, but not limited to 30 or more) animated play objects including lighting effects, highlights and rotations (arrow 36).

Figure 4:
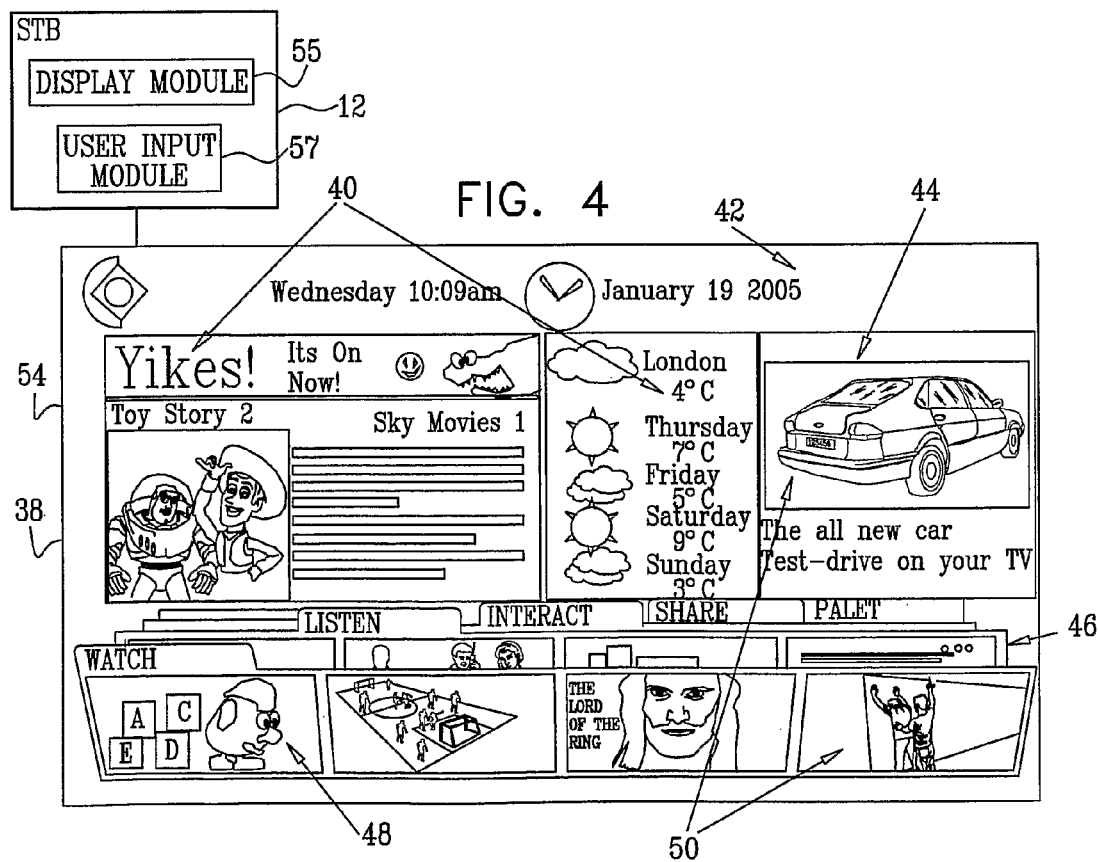
FIG. 4 is a view of a high definition EPG constructed and operative in accordance with a preferred embodiment of the present invention.

Reference is now made to FIG. 4, which is a view of a high definition EPG 54 having a sample screen 38 constructed and operative in accordance with a preferred embodiment of the present invention. By way of introduction, high definition (HD) TV is starting to grow in popularity and the screens used tend to be larger in size than screens traditionally used for standard definition (SD) TV. On average people sit relatively closer to high definition TVs, giving the viewer a greater field of view. However, electronic program guides tend to just be up-scaled versions of the SD counterparts and are not taking full advantage of the new space available. In addition, set top boxes have to increasingly handle more connectivity and user interactivity options.

A visually simple way to make more and more user interface options available to the viewer is required. The visual features available to the viewer must also dynamically scale as one set top box in a system may have more features available than another or new features may be added during the life time of the TV system. Also, TV systems increasingly have to support more channels and features. Simple ways to sort and navigate around lots of channels is therefore required.

Figure 13:
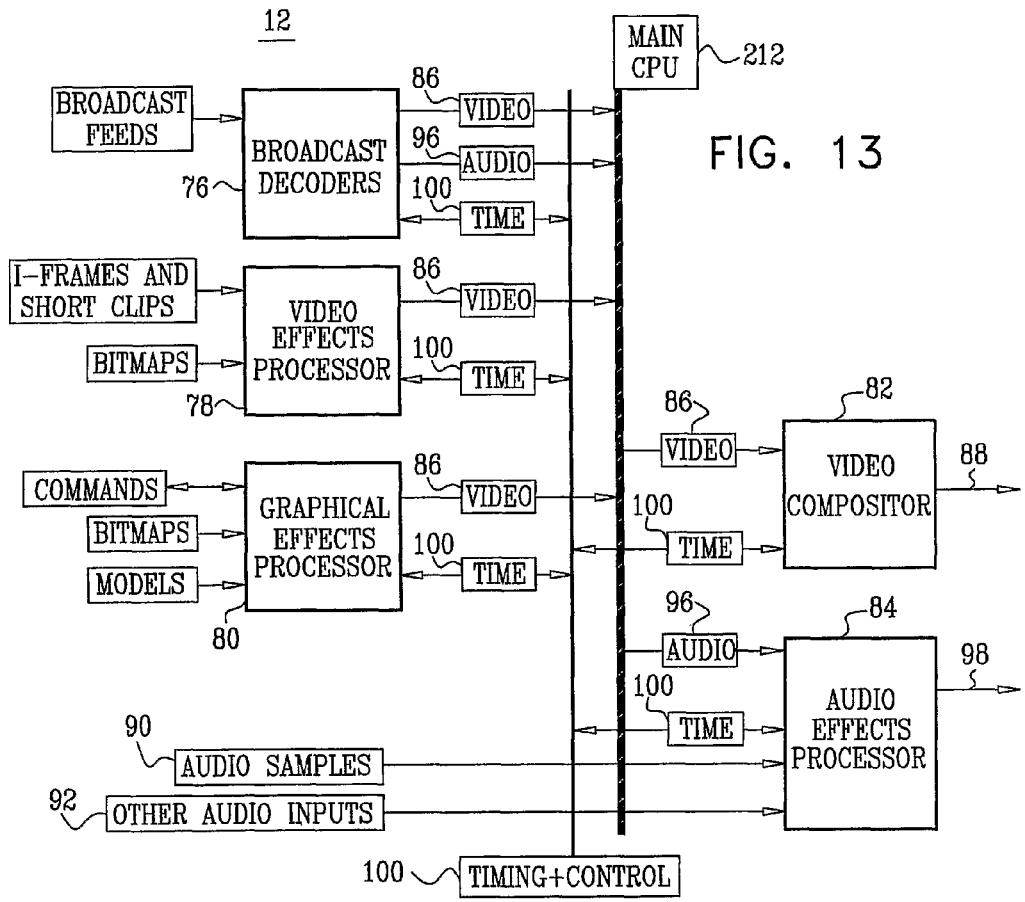
FIG. 13 is a block diagram view of the set-top box system of FIG. 1.

The high definition EPG 54 is preferably implemented on the set-top box system 12 (FIG. 13). The high definition EPG 54 typically includes one or more of the following features: animated text which is scaleable, animated, drop shadowed and/or textured (arrow 40); full sized moving background at the same time as any other suitable effect (arrow 42); scaleable textured graphics including lighting, shading and/or reflection effects (arrow 44); pseudo 3D effects including drop down tabs, rotations of video or graphics and/or page turns bulges (arrow 46); down-scaled, non linear shaping of live video where the shape is changed smoothly on a frame by frame basis and movement is less than a pixel (arrow 48); multiple arbitrarily shaped and scaled video clips from disk are placed on screen (arrow 50); large areas of graphics are smoothly scaled up/down to or from full screen; mosaics of video clips are formed from video which originates from any suitable source; full moving backgrounds at the same time as fill mosaics; reflections of the mosaic and or the graphical constructions; multiple movies are placed on screen from any suitable source; movies are smoothly scaled up/down on screen with graphical constructions around the video that scale up/down at the same time/rate such that the video appears to fit in the graphics; transitions between video sequences from any suitable source; the transition effects are performed with a combination of transparency changes and deformations of video sequences; transitions are performed where an intermediate video or still image are placed mid transition; and complex overlaid graphics are added and sequenced to the video transition.

Figure 5:
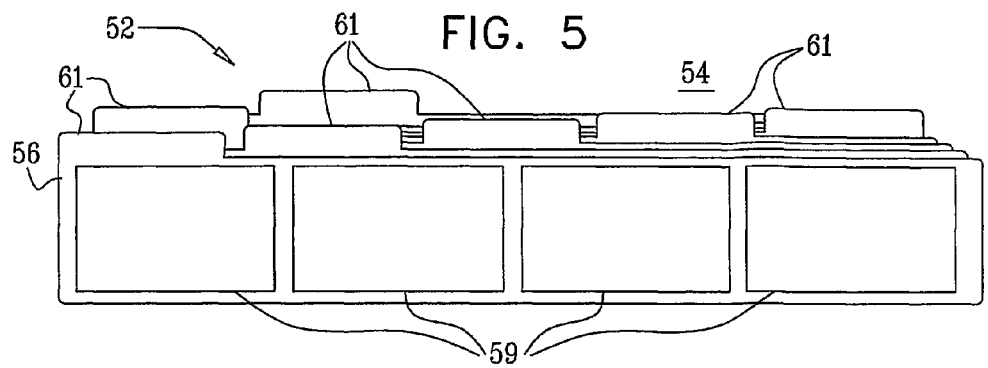
FIG. 5 is a view of a plurality of tabbed graphical paneled pages of the EPG of FIG. 4.
Figure 6:
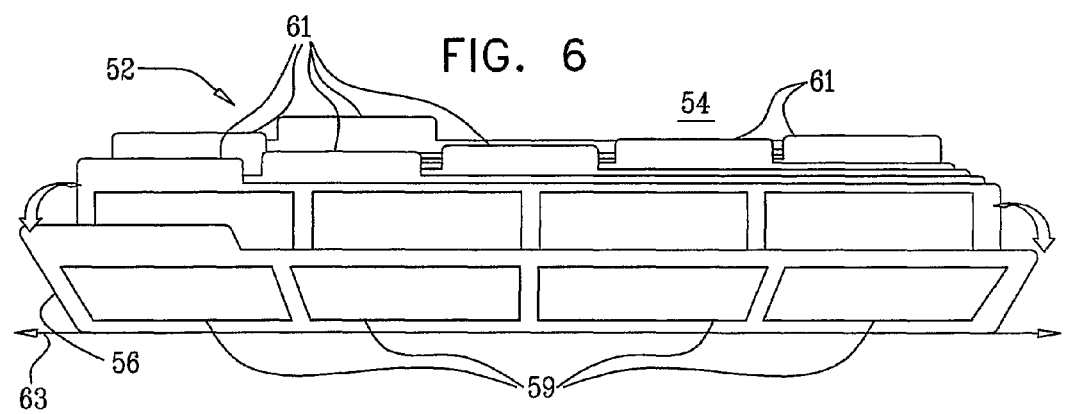
FIG. 6 is a view of the tabbed graphical paneled pages of FIG. 5 showing one of the paneled pages being peeled away.

Reference is now made to FIG. 5, which is a view of a plurality of tabbed graphical paneled pages 52 of the high definition EPG 54 of FIG. 4. Reference is also made to FIG. 6, which is a view of the tabbed graphical paneled pages 52 of FIG. 5 showing a paneled page 56 being peeled away from the other tabbed graphical paneled pages 52. Reference is also made to FIG. 4. Instead of designing a flat layout EPG, the high definition EPG 54 is designed as a series of tabbed graphical paneled areas or pages 52 that layer into the screen in much the same way as a series of files in a filing cabinet or a series of Music CDs in a rack of CDs. A remote control (not shown) is then typically used to peel away or bring back the layers of the pages 52, effectively giving the illusion of moving through a stack of pages of information.

The high definition EPG 54 preferably includes a display module 55 and a user input module 57. The display module 55 is typically operative to display the pages 52 layering into the screen 38. Each page 52 typically includes a plurality of graphical panels 59 associated with video items. The graphical panels 59 are typically live or non-live (for example, but not limited to, disk sourced) video items or graphical representations of the associated videos. Therefore, the display module 55 is preferably operative to display the video items in the graphical panels 59. Each of the pages 52 preferably includes a tab 61 to facilitate selection of the pages 52.

The user input module 57 is generally operative to receive a user input, typically from a remote control, to turn the page 56 (or more of the pages 52), such that the page 56 is peeled away from the other pages 52 in order to bring the graphical panels 59 of the page 56 in or out of view (out of view in the example of FIG. 6).

The display module 55 is preferably operative to show the turning of the page 56 bringing the page 56 in or out of view, the turning typically being vertically about a horizontal axis 63. Additionally, the display module 55 is preferably operative to display on the screen 38 a non-linear changing of the shape of the video items, or the graphical representations, in the graphical panels 59 of the page 56 as the page 56 is being turned.

The design of the high definition EPG 54 has the advantage that the number of paneled pages stretching back into the distance may be different for each set top box (STB) and the number of paneled pages may change dynamically or over time. For example, if the STB needs to support locally connected devices because the hardware configuration of the STB supports the feature, an extra paneled page(s) is preferably added to the paneled pages allowing the viewer to see and interact with locally connected devices. Similarly, if an operator wants to add a new feature to all STBs on a network, an extra paneled page(s) is preferably added to the high definition EPG 54.

Figure 7:
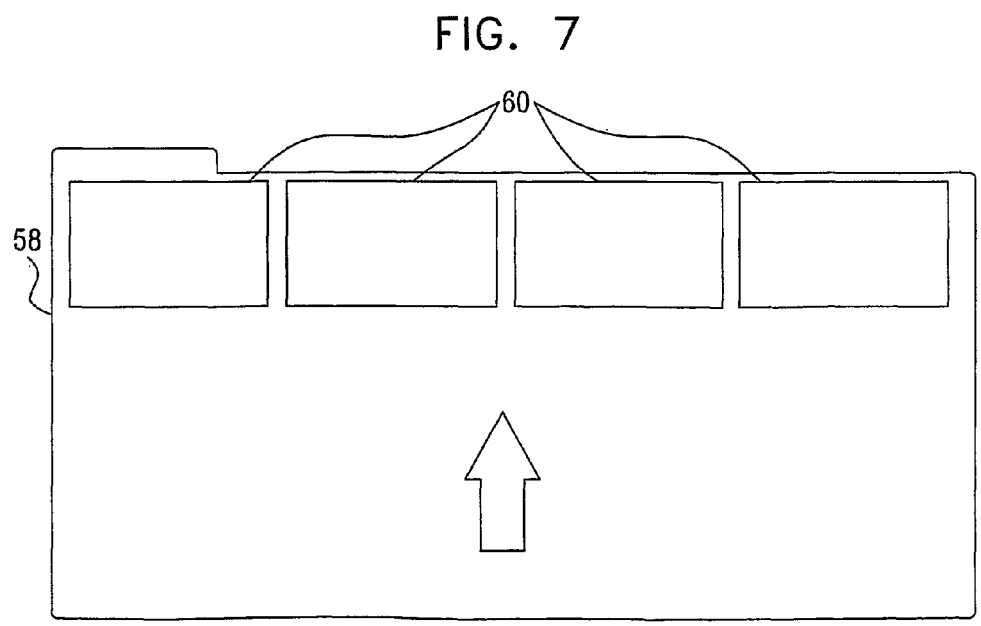
FIG. 7 is a view of an extended paneled page of the tabbed graphical paneled pages of FIG. 5.

Reference is now made to FIG. 7, which is a view of an extended paneled page 58 of the tabbed graphical paneled pages 52 of FIG. 5. The viewer typically navigates to a paneled page and then the viewer extends the paneled page to obtain more information on a subject area yielding the extended paneled page 58. The extended paneled page 58 typically includes additional information relating to one or more of the graphical panels 59. Additionally or alternatively, the extended paneled page 58 includes one or more of the following: text; graphical arrangements; images; or videos, depending on the purpose and the features available on the network. In FIG. 7, a number of small videos 60 show the programs available for viewing. The user input module 57 is preferably operative to receive user input to extend one of the pages 52 to the extended paneled page 58. The display module 55 is preferably operative to show the extended paneled page 58 on the screen 38.

Figure 8:
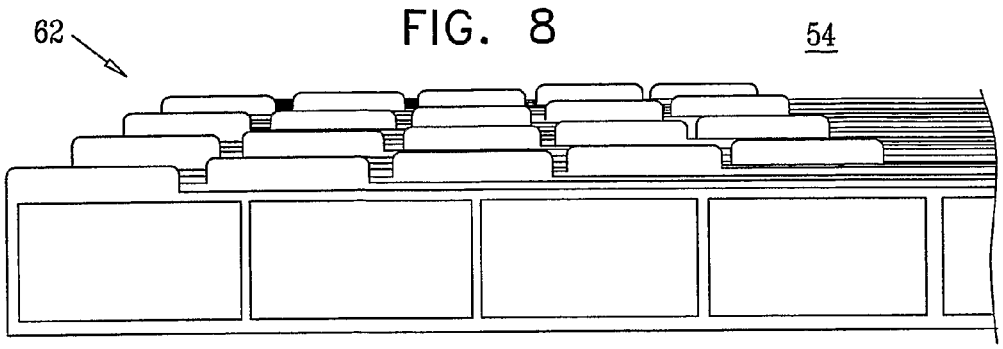
FIG. 8 is a view of a plurality of tabbed graphical paneled pages for a channel viewing mode of the EPG of FIG. 5.
Figure 9:
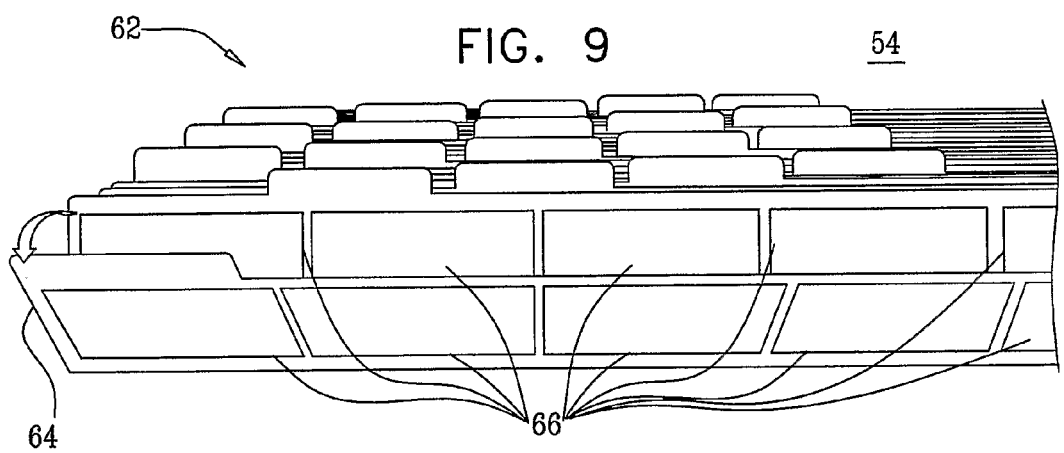
FIG. 9 is a view of the tabbed graphical paneled pages of FIG. 8 showing one of the paneled pages being peeled away.

Reference is now made to FIG. 8, which is a view of a plurality of tabbed graphical paneled pages 62 for a channel viewing mode of the high definition EPG 54 of FIG. 5. Reference is also made to FIG. 9, which is a view of the tabbed graphical paneled pages 62 of FIG. 8 showing a paneled page 64 being peeled away from the other tabbed graphical paneled pages 62. Reference is also made to FIG. 4.

The tabbed graphical paneled pages 62 preferably include a plurality of videos 66. The videos 66 may be arranged in the tabbed graphical paneled pages 62 in many ways to help with navigation and searching. The high definition EPG 54 is preferably operative such that the viewer can switch the view at any suitable time from one where the facilities of the set-top box system 12 are shown, to, for example, one where all of the TV channels are seen.

In TV channel mode, each channel is shown on a different paneled page of the tabbed graphical paneled pages 62. In other words, each of the pages 62 is uniquely associated with one TV channel. Therefore, the channels layer back into the distance with one tab of the tabbed graphical paneled pages 62 showing one channel. The videos 66 on each paneled page, in the example of FIG. 8, span from left to right.

The high definition EPG 54 is preferably operative such that the viewer can move left and right on each paneled page 62 or press a button to extend any of the paneled pages 62 upwards, if required. Navigating left and right moves a focus to a different piece of content which can be played by viewer selection. The different pieces of content may be the next piece of content to be broadcast on a channel or other items such as the last piece of content recorded or the last game played on the channel, by way of example only.

Traditionally, EPGs use a timeline associated with each piece of content such that the viewer determines when a piece of content is to be aired. The high definition EPG 54 generally assumes that content is increasingly recorded and available locally so that the paneled pages show only what is available. Therefore, the high definition EPG 54 typically uses the screen space to promote the content rather than the scheduling time.

Figure 10:
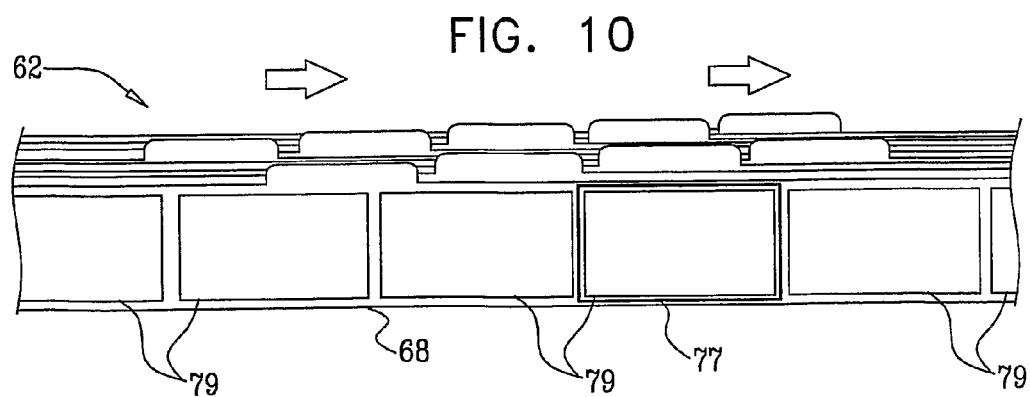
FIG. 10 is a view illustrating right navigation in a paneled page of the tabbed graphical paneled pages of FIG. 8.

Reference is now made to FIG. 10, which is a view illustrating right navigation in a paneled page 68 of the tabbed graphical paneled pages 62 of FIG. 8. Each page 62 typically includes a plurality of graphical panels 79. In the channel viewing mode, the viewer moves in and out of the screen to look at different channels or moves left/right to see what content is available on the channel. The viewer can move in and out of the screen at the same time as moving left/right. FIG. 10 shows a viewer moving the paneled page 68 to the right.

The user input module 57 is preferably operative to receive a user input to move a focus 77 between the graphical panels 79 in the page 68. The display module 55 is typically operative to display the focus 77 on one of the graphical panels 79.

The user input module 57 is also preferably operative to receive a user input to turn one or more of the pages 62 and move a position of the focus 77 of the graphical panels 79 in the pages 62 at the same time, for example, so that the viewer can move to a graphical panel 79 which is in a diagonal position from where the viewer is currently positioned.

Figure 11:
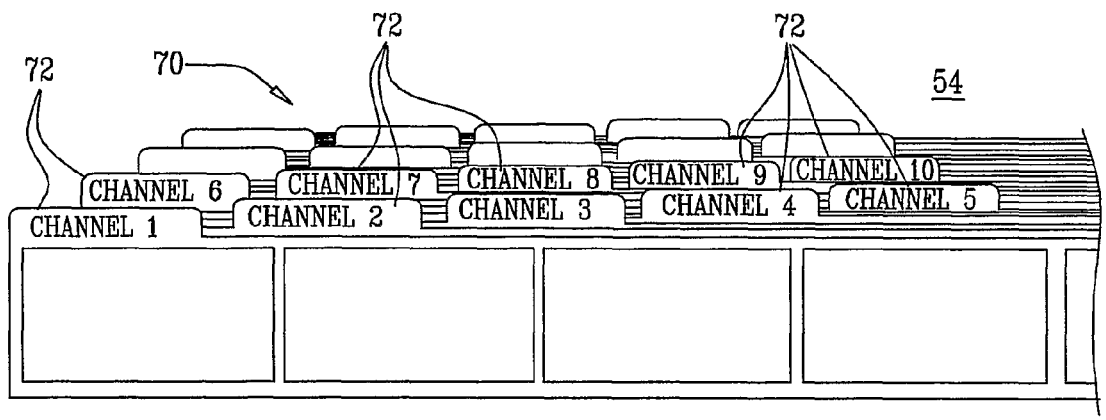
FIG. 11 is a view illustrating tabbed graphical paneled pages labeled with channel numbers of the EPG of FIG. 4.

Reference is now made to FIG. 11, which is a view illustrating a plurality of tabbed graphical paneled pages 70 labeled with a plurality of channel numbers 72 of the high definition EPG 54 of FIG. 4. The paneled pages 70 show channels layering back into the screen and content available on the channel is arranged on each paneled page 70. However, it will be appreciated by those ordinarily skilled in the art that the tabs can be arranged in different ways, for example, by viewer configuration, thus helping with navigation and searching.

Figure 12:
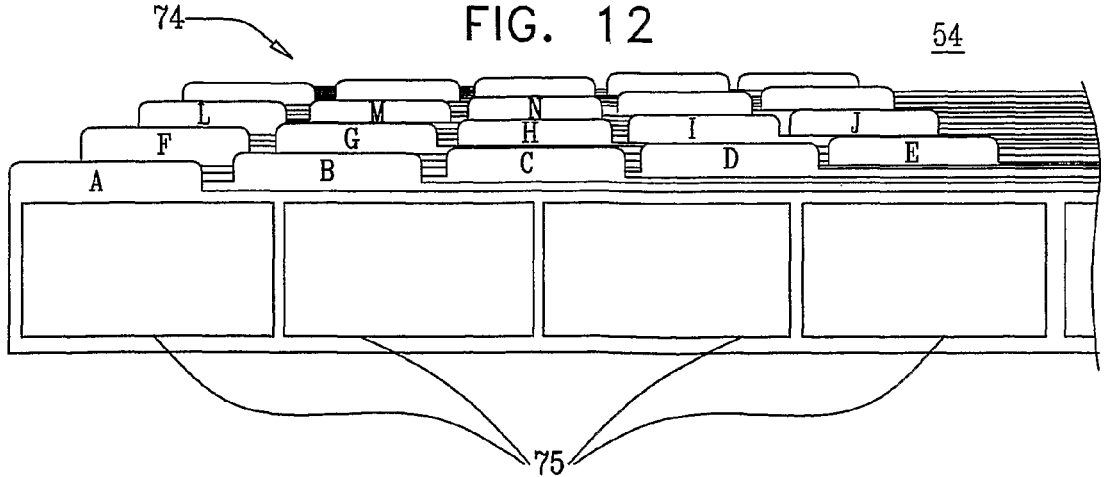
FIG. 12 is a view illustrating tabbed graphical paneled pages labeled alphabetically of the EPG of FIG. 4.

Reference is now made to FIG. 12, which is a view illustrating a plurality of tabbed graphical paneled pages 74 labeled alphabetically of the high definition EPG 54 of FIG. 4. Each of the tabbed graphical paneled pages 74 includes a plurality of graphical panels 75. The content shown in FIG. 12 is arranged alphabetically from front to back. In other words, the tabbed graphical paneled pages 74 are arranged alphabetically from front to back. The graphical panels 75 on a particular page 74 are also arranged alphabetically from left to right. By way of example only, the content may be arranged chronologically where time stretches back into the distance so that the pages 74 are arranged chronologically and the graphical panels 75 in each paneled page 74 (available during a particular time period) are arranged chronologically from left to right.

Reference is now made to FIG. 13, which is a block diagram view of the set-top box system 12 of FIG. 1. FIG. 13 describes the highest level functional blocks of the set-top box system 12.

The set-top box system 12 is preferably operative to provide a mix of high definition (HD) and standard definition (SD) inputs and a mix of TV output standards in the same set-top box. The set-top box system 12 typically incorporates a personal video recorder (PVR). In order to keep costs and risks of the set-top box system 12 low, the set-top box system 12 is typically implemented by designing the silicon chips of the set-top box system 12 as a natural evolution of existing and proven set-top box building blocks.

Inevitably more screen movement, color and blending means bigger and more graphical assets. Therefore, the set-top box system 12 is preferably operative to keep the costs of storage and transmission down through the extensive use of compression or vector techniques described hereinbelow, in particular with reference to FIGS. 25-40.

The set-top box system 12 is preferably operative to include one or more of the following general features: support the decoding and processing of multiple video feeds; support multiple locally generated graphical layers; support multiple locally generated video layers; support the compositing of multiple layers of video and graphics to create a final viewer experience; support the decoding and processing of multiple incoming audio feeds; support multiple locally generated audio samples to create a final viewer experience; all operations are inherently synchronized and controlled against one common set of timelines; video and graphics are allowed to merge such that it is not generally possible to tell the difference between the video and graphics; and support complex multi-layer graphical constructions.

The set-top box system 12 is preferably scalable to allow for more outputs and inputs of different types.

Additionally or alternatively, the set-top box system 12 is preferably operative so that video and audio of different line standards and resolutions are handled.

The set-top box system 12 is preferably operative such that any loss in video or audio quality through the system 12 is zero in situations where no processing is done. When processing is performed, the degradation in the video or audio quality is not typically perceived by a viewer/listener.

Optionally, the set-top box system 12 supports: video and audio input from local audio-visual devices attached to the set-top box system 12; and plug-ins which are used to process video and audio flowing through the set-top box system 12.

The set-top box system 12 preferably supports: 2-way remote controls; allowing multiple controllers to be used simultaneously; and multiple key presses simultaneously from any suitable controller and optionally key-repeat and button-up functionality. The controller(s) are typically implemented using technology such as Bluetooth, IR blasters, and wireless LAN technology standard IEEE 802.11 as known to those ordinarily skilled in the art of remote controllers.

The set-top box system 12 optionally supports one or more of the following: video and audio streams which originate from connected devices; video and audio which originate from dedicated base band inputs; and plug-able advanced controllers.

The set-top box system 12 preferably includes a broadcast decoder subsystem 76, a video effects processor 78, a graphical effects processor 80, a video compositor 82 and an audio effects processor 84.

The broadcast decoder subsystem 76 is now described briefly. The broadcast decoder subsystem 76 is described in more detail with reference to FIGS. 20-23.

The broadcast decoder subsystem 76 includes the primary decoders for the set-top box system 12. The broadcast decoder subsystem 76 preferably includes at least two video broadcast decoders 176 (FIG. 20) in order to allow for channel changing transition effects and to allow for content to be jumped around seamlessly.

The compression technology of the received video is assumed to depend on other broadcaster requirements. At the time of writing, MPEG-2 is typically the default compression technology for Standard Definition systems and MPEG-2 or H.264 for High definition systems. Therefore, whilst the set-top box system 12 does not assume a particular technology, the set-top box system 12 does make some assumptions about the way the compression systems work and the features available. For example, at the time of writing, an alpha channel is not carried with the MPEG-2 and H264 compression systems. It will be appreciated by those ordinarily skilled in the art that the components of the set-top box system 12 may need to be adapted to the compression technology used by the broadcaster.

The broadcast decoder subsystem 76 is preferably operative to support: all suitable output TV resolutions for example, but not limited to, up to and including 1080×1920; all appropriate frame rates, for example, but not limited to, up to 60 Hz; interlaced and non-interlaced standards; and all appropriate video aspect ratios for example, but not limited to, 16:9 to/from 4:3, and Letterbox/Pillbox to full screen.

The broadcast decoder subsystem 76 is also preferably operative to support: the set up and timing of video transitions from one decoded video input to another; the scaling and transformation of video under software control on a frame by frame basis; an alpha channel to be added to the incoming video under software control on a frame by frame basis; and application of different levels of alpha from a simple fixed value to a complex per pixel alpha which changes on a frame by frame bases.

The broadcast decoder subsystem 76 is preferably timeline aware such that at all times it is preferably possible for software to read the timing related information for the current frames being decoded where the timing information preferably includes one or more of following: timeline control protocol information from a separate packet identification (PID); time codes derived from the compressed video group of pictures (GOP) and/or Picture headers; and from presentation time stamp (PTS) and/or decoder time stamp (DTS) and/or program clock reference (PCR). The broadcast decoder subsystem 76 is typically operative to enable a field or frame based interrupt which is synchronized to the relevant vertical blanking interval (VBI) period, preferably by software control.

The broadcast decoder subsystem 76 is preferably operative to cue up and play content from storage, typically including: under software control, one of the video broadcast decoders 176 cues up, ahead of time, such that a specific frame or field is decoded to the output of the video broadcast decoder; under software control, for content which has already been cued up to be played (the maximum time required between cueing up content and playing the content is typically less than a second; inserting content off disk into either an incoming live broadcast feed or another disk based feed using the above cueing technique; cue-up up to four (or more) alternative disk based streams using the cueing method and select only one of the disk based streams for play-out; and de-cue material which has previously been cued up. Cueing of material is described in more detail with reference to FIGS. 22 and 29.

The set-top box system 12 is preferably operative such that frames from multiple video broadcast decoders 176 are synchronized (genlocked) to a common time base.

The video effects processor 78 is now described briefly. The video effects processor 78 is described in more detail with reference to FIGS. 24-43.

The video effects processor 78 handles all video-based effects for the set-top box system 12. TV graphics are becoming more televisual and there is generally more motion, meaning that constantly moving overlays and effect sequences synchronized to the main video feeds are both becoming more important. The video effects processor 78 therefore includes all the decoders and handlers for pre-rendered bitmaps and decoders.

The video effects processor 78 is preferably operative to playout moving video backgrounds or overlays preferably including: a plurality (for example, but not limited to, two) separately controllable full screen overlays or underlays; clips with a duration in the region of between 100 milliseconds and several hours, for example; play back in a loop with a seamless cut between start and end from/to any suitable frame; and seamlessly concatenate new clips onto the end of the clip that is currently playing.

The video effects processor 78 is optionally operative to playout moving video thumbnails preferably including: movie thumbnails of arbitrary size which collectively cover up to the full size of the output screen; medium duration clips with a duration in the region of between 10 seconds and 20 minutes for example; play back in a loop with a seamless cut between start and end from/to any suitable frame in the sequence; and seamlessly concatenate new clips onto the end of the clip that is currently playing.

The video effects processor 78 is preferably operative to support full 24 bit color, by way of example only, for all video related effects.

The video effects processor 78 is typically operative to apply a simple alpha channel (which is fixed), or a complex alpha channel (which changes every frame), to the video layers.

The video effects processor 78 is preferably operative such that: the speed and direction of the playback of any suitable video clip can be varied; there is substantially no restrictions on the size and shape of any video overlays (for example, but not limited to, the video being the bottom 30 lines of the screen); and the cue up and frame accurate triggering of play-out start and stop is supported as well as the storage and loading of reference frames and a decoding state.

The video effects processor 78 is preferable operative such that any reference image generated in the decoding process may be transferred to an external storage independent of the dedicated decoder buffer. The video effects processor is preferable operative such that any reference images used in the decoding processor may be transferred from (loaded from) an external source. The video effects processor is operative such that loaded reference images need not necessarily have been generated from the video effects processor. Similarly, any state information used in the decoding process of a coded stream, preferably at any point in the processing of the stream, may be saved, and later loaded back into the video effects processor.

The video effects processor 78 is preferably operative such that, when informed of a region of interest in frames of an input stream, only the region of interest is selectively decoded from the frames of the input stream. The video effects processor 78 preferably ignores or skips components of the stream that do not include the region of interest. The region of interest is typically at least one of the decoding data or the output data (for example, the video effects processor 78 may decode a slightly larger region than the region outputted by the video effects processor 78). The above method generally saves both memory and processing bandwidth.

The video effects processor 78 is preferably operative to: loop-decode sub-regions of a frame(s) with a seamless cut between the start and end of a video clip; and seamlessly concatenate new clips formed from sub-regions of a frame(s) onto the end of a clip that is currently playing.

The video effects processor 78 preferably notifies applications running on a main CPU 212 of the set-top box system 12 (through an interrupt) of the following: each frame VBI start point; end of clip and start of clip; and embedded frame time code.

The video effects processor 78 is preferably operative such that MPEG I-Frame tiling or PNG tiling is supported. The video effects processor 78 preferably supports the direct reading/writing between the main CPU 212 and any suitable video effects buffer (not shown).

The graphical effects processor 80 is now described briefly. The graphical effects processor 80 is described in more detail with reference to FIGS. 44-45.

The graphical effects processor 80 typically includes contains all of the graphics handling for the system, for example, but not limited to, all the graphics which are generated in real time in the set-top box system 12. Examples include Vector based graphics and text rendering.

The graphical effects processor 80 is preferably operative to include one or more of the following text rendering features: antialiasing; transforms (3×3 affine; supporting scaling, rotation, and shearing); animations; rendered stroked and filled (solid color, gradient filled and texture); shape effects such as bevels; highlighting effects such as drop shadows; and bitmap or vector formats.

The graphical effects processor 80 is preferably operative to include one or more of the following vector graphic features: arbitrary shapes supported using paths comprising straight line segments; quadratic and cubic Bezier curve segments; ellipse arc segments; antialiasing; transforms (3×3 affine; supporting scaling rotation, shearing); animations; rendered stroked and filled (solid color, gradient filled and texture); mapping SVG Basic and/or Macromedia Flash to hardware.

The graphical effects processor 80 is preferably operative to support hardware decoding of I-frame or PNG bitmap formats.

The graphical effects processor 80 is optionally operative to support hardware decoding of one or more of the following formats: GIF; JPG; DV or BMP images, depending on system requirements.

The graphical effects processor 80 is preferably operative to support the following color formats and conversions, by way of example only: up to 32 bits per pixel RGBA or YUVA (4:4:4 or 4:2:0); all CLUTx formats; 1 or 8 bpp alpha channel; conversion from YUV 4:2:0 to RGB 4:4:4; conversion from CLUTx to RGB888; separately addressable alpha channel. It should be noted that the set-top box system 12 may have to support other color formats if, for example, the set-top box system 12 needs to support DV standard format.

The graphical effects processor 80 is preferably operative to support a direct drawing interface (pixel level access to a memory surface) and the reading from the main CPU 212 (FIG. 13) of any suitable memory buffer used by the graphical effects processor 80.

The graphical effects processor 80 is optionally operative to support the rendering of 3D models.

The set-top box system 12 is preferably operative to ensure that the geometry of other elements in the system 12 is consistent with the graphical effects processor 80 by issuing geometry co-ordinate commands originating from the graphical effects processor 80.

The graphical effects processor 80 is preferably operative to support the delivery of vector generated alpha planes to other parts of the system 12.

The graphical effects processor 80 is typically operative to accept assets incoming from the video effects processor 78 for textures, by way of example only.

The video compositor 82 is the main compositor for the set-top box system 12. The video compositor 82 typically takes a plurality of full resolution, full frame rate, full color feeds 86 from the other subsystems of the set-top box system 12 and composites the feeds 86 together. The video compositor 82 outputs a composite feed 88 to an output stage (not shown) of the set-top box system 12.

The audio effects processor 84 is now described briefly. The audio effects processor 84 is described in more detail with reference to FIGS. 46-47.

The audio effects processor 84 handles all of the audio in the set-top box system 12. Banks of a plurality of samples 90 are played out, looped and mixed with a plurality of other audio feeds 92. The audio effects processor 84 includes an audio mixer 394 (FIG. 47) which mixes the samples 90 and other audio feeds 92 with a plurality of audio feed(s) 96 from the broadcast decoder subsystem 76, creating a final audio output 98.

The audio effects processor 84 is preferably operative to support: the selection, mixing and transitions between incoming broadcast audio feeds 96; and multi-language system capabilities.

The audio effects processor 84 is preferably operative to support the locally injected audio samples 90, for example, but not limited to: up to 16 or more compressed streams where the compressed audio formats supported include formats supported by the audio effects processor 84 such as MPEG1 Layers 1, 2, 3; up to 16 or more stereo PCM uncompressed streams; all sample rates/precisions supported by the compression standards used in the platform for example up to 48 KHz, 16 bit max; mixing of different input rates and precisions; seamless looping and concatenation of clips; ramp-like transitions between clips where the ramp up/down rate and the shape of the ramp is controllable (s-shaped ramps for example).

The audio effects processor 84 is preferably linked into the overall synchronization mechanism of the set-top box system 12, described below.

Additionally, the audio effects processor 84 is preferably operative to: cue up and play an audio clip with sample accurate in/out points; start and stop play-out of audio clips with a timing that is at least as accurate as that used for the video playout; audio ramp up/down to lead/lag video or graphics; support 4.1, 5.1, 6.1, 7.1 multi-channel audio systems by way of example only; support the mixing of audio in any suitable combination of locally inserted clips 90 and other audio inputs 92; split all inputs into the mono components of the input before entering the audio mixer 394 (FIG. 47) in order to allow precise control of the position of any suitable audio track in a multi-channel surround-sound system; and support the control of attenuation on any of the inputs and outputs to the audio mixer 394 (FIG. 47).

The audio effects processor 84 optionally supports: the addition of audio effects to any suitable channel into, or out of, the audio mixer 394 (FIG. 47) for example, but not limited to, echo, reverb, panning, time stretching, pitch shifting, dynamic range compression; and input from local audio devices attached to the set-top box system 12.

The audio effects processor 84 is preferably operative such that any suitable audio source can be transferred between the main CPU 212 (FIG. 13) and the audio effects processor 84.

There is preferably inherent synchronization throughout the set-top box system 12. All video coming in from external sources is aligned on a common time base 100. If necessary, frames are typically dropped or inserted to keep the synchronization. All video frames and audio samples are preferably time stamped and the time order is typically constantly maintained as the information is clocked through the set-top box system 12.

In addition, the set-top box system 12 is continuously aware of broadcast or local timelines. The broadcast timelines may be present in incoming audio/video (A/V) feeds, in which case the broadcast timelines are always kept with video frames as the video frames are clocked through the set-top box system 12. The broadcast timelines may be present in incoming audio/video/data feeds. The broadcast timelines are typically used to calibrate one of a plurality of high-resolution clocks (for example, but not limited to, 90 KHz or above) (not shown) included in the set-top box system 12 to enable low-level timing control of the output audio and video signals. Local timelines are typically generated from the clock without external calibration.

Events may then be scheduled against the timelines, for example, but not limited to, a compositor may reconfigure itself synchronously to an entry in a given timeline.

Several components appear in a number of places in the set-top box system 12. The same components are all assumed to have substantially the same functionality, and the same components may physically be the same device. In the description below, the functionality is partitioned to aid understanding and suggest where partitioning may be designed into the silicon, if necessary.

Figure 14:
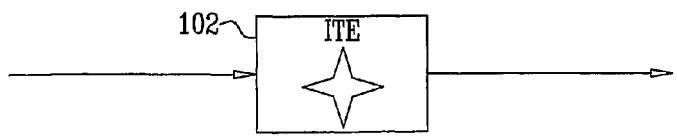
FIG. 14 is a view of an image transform engine for use with the set-top box system of FIG. 13.

Reference is now made to FIG. 14, which is a view of an image transform engine 102 (ITE) for use with the set-top box system 12 of FIG. 13. The image transform engine 102 is operative to quickly move blocks of pixels from one area of memory to another, optionally perform an operation on the pixels and alpha-blend the pixels into a target area. The operations are direct memory access (DMA) based and operate asynchronously to the main CPU 212 (FIG. 13) processing. The format of the input and output buffers typically conforms to any format listed in the features of the image transform engine 102 listed below. The image transform engine 102 is preferably controlled through a list of instructions which, once enabled executes automatically in sequence, triggered either from the completion of execution of the previous instruction or linked to a timing trigger. It should be noted that it is typically possible to modify the list of instructions dynamically ("on the fly"). The image transform engine 102 is generally referred to as a BitBlt device or Blitter in STB hardware systems.

The Image Transform Engine 102 generally has one input and one output, the input and output memory area ranges typically having an arbitrary size.

On transfer of memory from input to output, the image transform engine 102 optionally allows one or more of the following operations to be performed: moving and/or copying including sub-pixel copy/move to allow for slow/accurate animation and source area removal to allow for animation; color including color space conversion (YCbCr (4:2:0)->RGB888(4:4:4)), color expansion (CLUTx->RGB888, channel splitting, channel mixing, channel combining, separately addressable color/alpha channels), color correction (gamma, contrast, gain, brightness, hue/saturation/lightness); scaling including unlimited up-scaling, unlimited down-scaling, high quality scaling algorithm (for example, but not limited to, N-tap filters where N is larger than 2, and the tap-filters may be applied in several dimensions such as Bilinear and Bicubic algorithms), any suitable number of source/target lines or columns; shaping including transforms (3×3 affine; supporting scaling, rotation and shearing)), other non-linear deformations from/to any suitable arbitrarily shaped area (e.g.: page turns); filtering including blurs (Gaussian), sharpening, edge detection/embossing, filtering applied to any 4 points for example or any suitable bounded area as specified through vector based co-ordinate system; blending including alpha blend a new source item onto a target item (in other words, every pixel transferred is a read, blend, write operation (alpha based porter-duff)).

It should be noted that color or alpha fill typically resides in a vector engine.

The image transform engine 102 also typically allows alpha planes to be separately addressed. By way of a non-limiting example, an 8 bit PNG can be decoded to form the alpha plane of an existing RGB image.

The image transform engine 102 is typically operative to perform at least 20 full output screen sized operations per frame period or the equivalent pixel transfer rate.

The set-top box system 12 includes several image transform engines 102, described herein below. Each image transform engine 102 performs substantially the same function.

The set-top box system 12 also includes a memory pool (not shown). The memory pool preferably includes all memory buffers used for storing transient images, audio and video frames in the set-top box system 12. As far as possible, all blocks of data in the set-top box system 12 are preferably accessible from the main CPU 212 (FIG. 13) to allow for any suitable intermediate processing or plug-in like architectures. It is generally always possible to read flows of data going through the set-top box system 12, modify the data flows, and re-inject the data flows into the correct flow.

To ensure that the main CPU 212 (FIG. 13) can interpret the blocks of data, the blocks of data preferably have a standard header which is used by application software to track and process frames.

Figure 15:
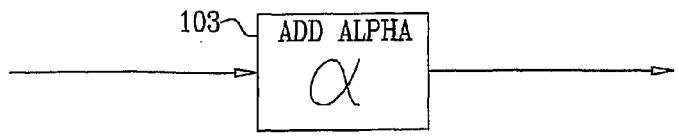
FIG. 15 is a view of a symbol indicating the addition of an alpha channel in the set-top box system of FIG. 13.

Reference is now made to FIG. 15, which is a view of a symbol 103 used to represent the addition of an alpha channel in the set-top box system 12 of FIG. 13. Alpha blending is typically used extensively in the set-top box system 12 by the image transform engines 102 and compositors (described in more detail with reference to FIGS. 17-19) to make graphics and video appear to blend into one overall visual presentation or to create effects like transitions. To enable alpha blending, it is necessary to specify an alpha plane for any suitable video or graphics based source.

For MPEG or other broadcast compression formats, an alpha channel is not always supported as part of the standard, and rarely used even when supported. Therefore, if an alpha channel is required to create an effect like a video transition for example, an alpha channel must be defined dynamically ("on the fly") as the video is being decoded.

Figure 16:
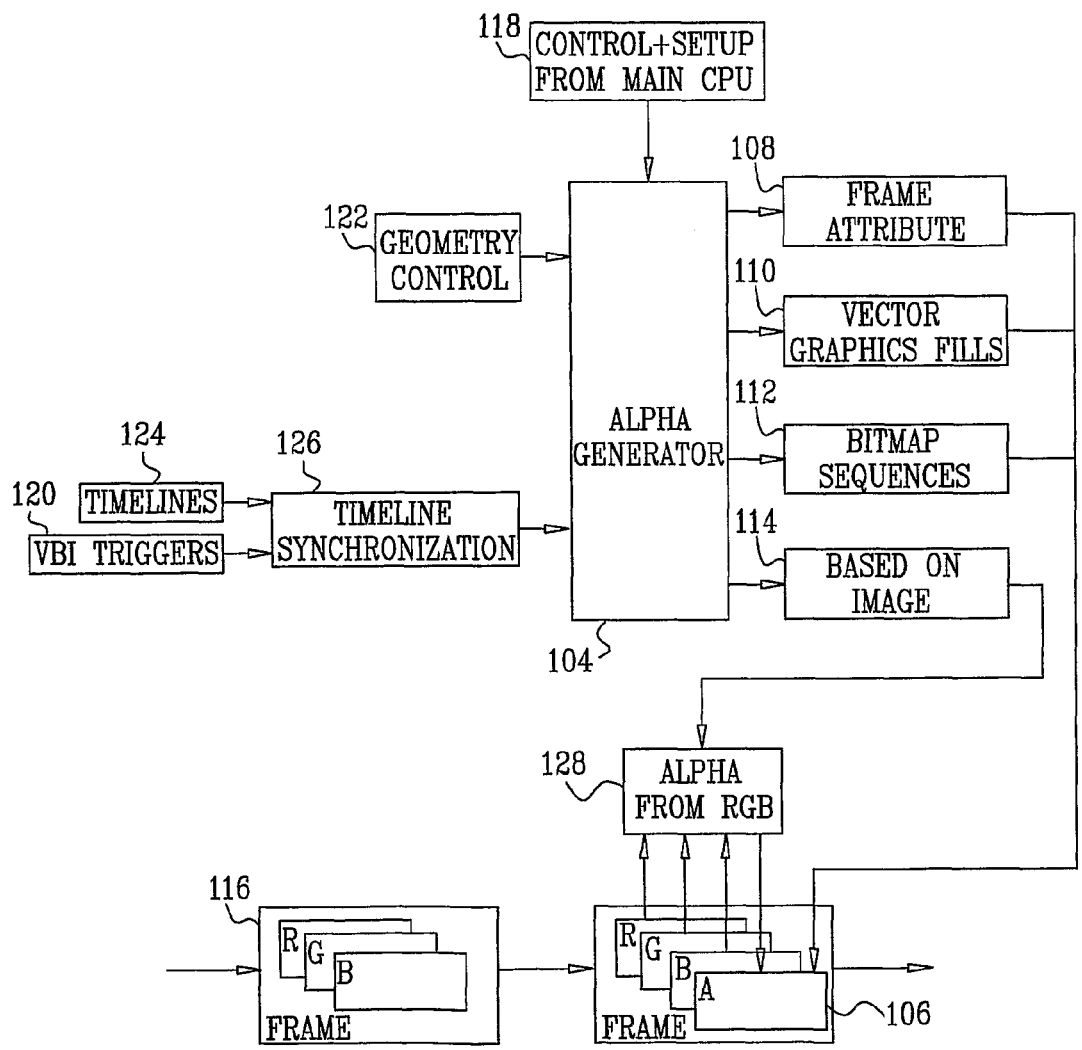
FIG. 16 is a detailed block diagram view of an alpha generator of the set-top box system of FIG. 13.

Reference is now made to FIG. 16, which is a detailed block diagram view of an alpha generator 104 of the set-top box system 12 of FIG. 13. The set-top box system 12 includes the alpha generator 104 which is typically operative to apply an alpha channel. The alpha channel may be applied in a number of different ways, each of the ways supporting a different kind of effect.

The alpha generator 104 is used to generate an alpha channel 106 for a frame 116 where one is not already available. The alpha generator 104 is typically used in all the video and graphics sub systems of the set-top box system 12.

The alpha generator 104 preferably supports one or more of the following alpha capabilities: a simple 1, 8, or 16 bit value is applied to each frame 116 (block 108); a per-pixel value which is filled from the vector based graphics system allowing for selective areas, gradient effects and shaped area fills (block 110); a per pixel value which is filled from a sequence of 1, 8 or 16 bit PNG images (block 112); the alpha channel 106 is derived from the original image (block 114), in particular the RGB (block 128), the alpha channel 106 being used to generate drop shadows, luma or chroma keying whereby the color and tolerance or a luma threshold are defined.

The alpha generator 104 has many ways of adding the alpha channel 106 to each frame 116 being clocked through the set-top box system 12. The ways of adding an alpha channel are set up from the main CPU 212 (FIG. 13) as a sequence of instructions (block 118) which are triggered without CPU intervention of VBI triggers (block 120). The overall system geometry control (block 122) is an input to the alpha generator 104. The overall system geometry control is used in the alpha generator 104 to define the position and shape of the area to be filled. For vector based fills, the overall system geometry control also defines the type of fill. The timelines (block 124) are also an input to the alpha generator 104. The timelines 124 and the VBI triggers 120 are synchronized (block 126) allowing instructions (block 118) loaded into the alpha generator 104 to be frame accurately actioned.

Figure 17:
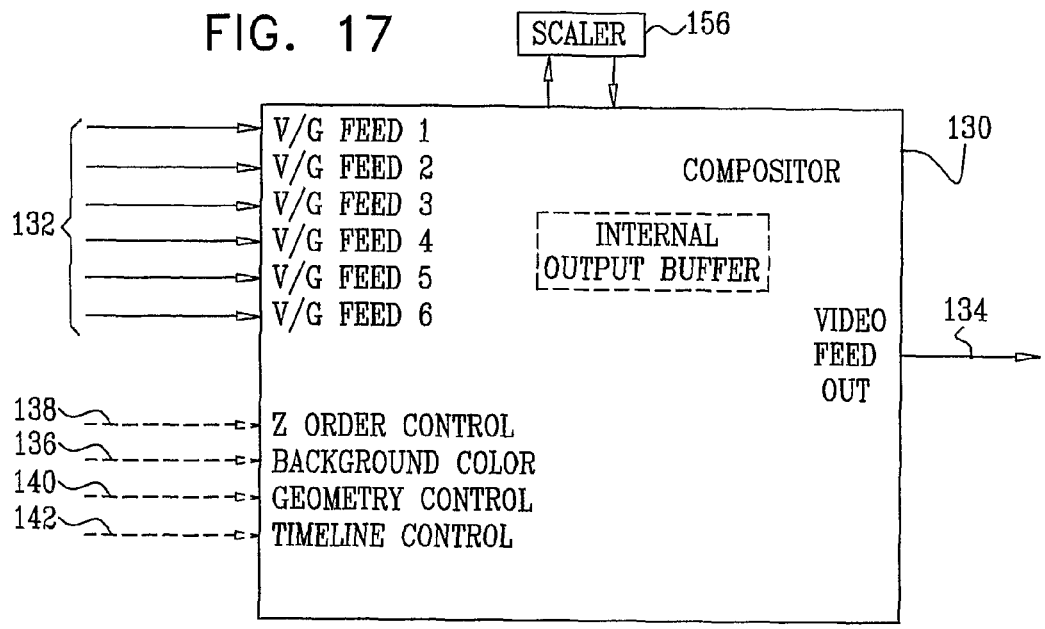
FIG. 17 is a block diagram view of a compositor for use with the set-top box system of FIG. 13.

Reference is now made to FIG. 17, which is a block diagram view of a compositor 130 for use with the set-top box system 12 of FIG. 13. There are several compositors 130 in the set-top box system 12. Each of the compositors 130 shown in the set-top box system 12 may embodied as a single component. However, the compositors 130 have been described as separate components herein in order to allow for partitioning of hardware, should partitioning prove necessary. Each of the compositors 130 typically performs substantially the same function(s). Each compositor 130 typically includes one or more of the following features described below.

Each compositor 130 preferably composites a plurality (for example, but not limited to, 6) separate full resolution, full frame rate, full color input video sequences together to form a single full resolution, full frame rate output 134. The input video sequences are input to the compositor 130 via a plurality of V/G feeds 132.

Each compositor 130 preferably allows a background color to be defined as an RGB888 value (arrow 136). The background color is the color against which alpha blending is preferably performed. No background is generally assumed for upstream compositors.

The Z-order of any of the input video sequences is preferably definable through software control (arrow 138). Only the background color plane is generally effectively fixed in position as the last or furthest layer away.

The input frames of the input video sequences may be alpha blended together according to the values of the "per frame" or "per pixel" alpha attributes via a geometry control input (arrow 140).

The compositor 130 also preferably has a timeline control input (arrow 142) for synchronizing the input video sequences.

The compositor typically includes a scaler 156, the functionality of which is described in more detail with reference to FIG. 18.

Figure 18:
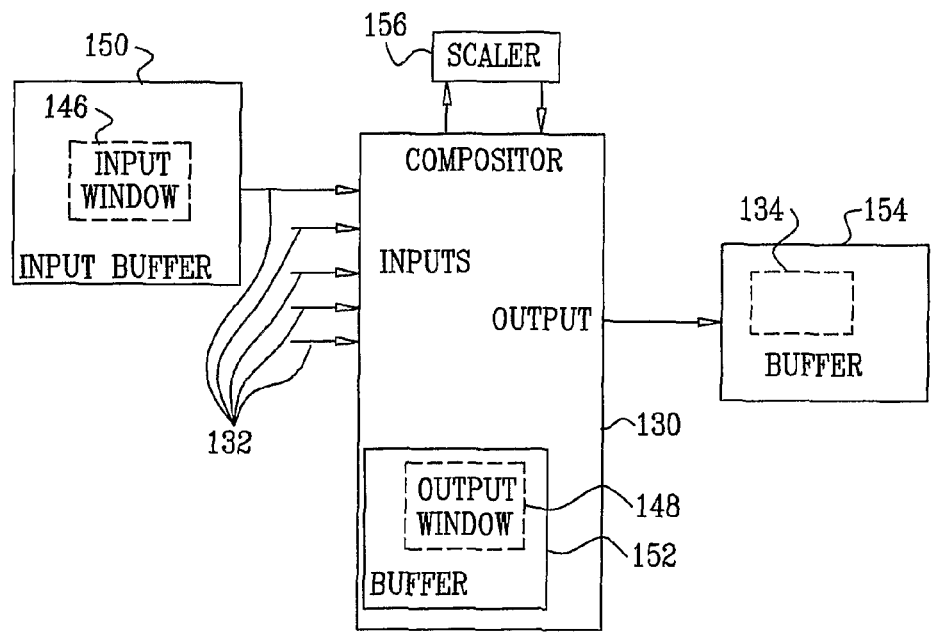
FIG. 18 is a block diagram view of an example process performed by the compositor of FIG. 17.

Reference is now made to FIG. 18, which is a block diagram view of an example process performed by the compositor 130 of FIG. 17. The compositor 130 typically takes input from the various input video sequences and composites, and/or alpha blends, the sequences together into the final output 134. FIG. 18 shows an input window 146 of one of the input video sequences in an input buffer 150. FIG. 18 also shows an output window 148 in an internal buffer 152 of the compositor 130 and a downstream buffer 154.

The input buffer 150 is connected to one of the V/G feeds 132 of the compositor 130. The input window 146 is defined and stored in the input buffer 150. The input window 146 gives the compositor 130 an input region to be transferred to the output window 148. The output window 148 is preferably defined through software setup.

The windows 146, 148 define the area and position of the input pixels and define where the input pixels are positioned in the output 134. Therefore, by implication the windows 146, 148 define whether any scaling is performed by the scaler 156 on transfer of the pixels from the input window 146 to the output window 148. There is an output window defined for each input video sequence.

The video sequences may be alpha blended together as defined by the Z order (arrow 138 of FIG. 17).

The internal buffer 152 is clocked out of the compositor 130 to either the TV output circuitry or the downstream buffer 154, depending on where the compositor 130 is located in the set-top box system 12.

Figure 19:
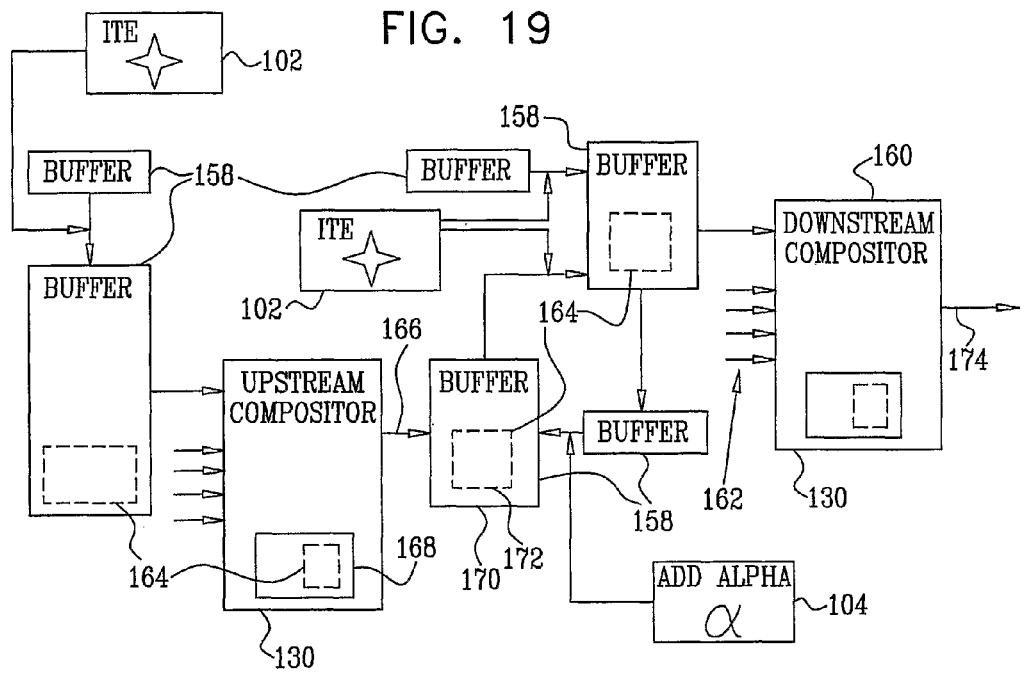
FIG. 19 is a block diagram showing combined use of compositors, image transform engines and memory buffers for use with the set-top box system of FIG. 13.

Reference is now made to FIG. 19, which is a block diagram showing combined use of operationally connected elements preferably including the compositors 130, the image transform engines 102, one of the alpha generators 104 and a plurality of memory buffers 158 for use with the set-top box system 12 of FIG. 13. Starting at the downstream compositor 130, namely a compositor 160, the compositor 160 preferably composites a plurality of inputs 162 together. The memory buffers 158 and a plurality of windows 164 of the memory buffers 158 are typically defined through software control. The memory buffers 158 acting as input buffers for the compositor 160 are typically filled from any other memory buffer 158 in the same memory domain by using one of the image transform engines 102. The image transform engines 102 typically transform blocks of pixels as already described above with reference to FIG. 14.

Upstream compositors typically operate in substantially the same way as the compositor 160. An output 166 of an upstream compositor 168 is preferably output to a software defined window 172 of a downstream buffer 170.

It should be noted that the buffers 158 connected to the input of the upstream compositor 168 may be partitioned in a different memory domain than the memory buffers 158 attached to the downstream compositor 160, for example, but not limited to, use in bus partitioning, if appropriate.

It should also be noted that the main CPU 212 (FIG. 13) preferably needs to have read/write access to all the memory buffers 158 except the buffers that are internal to the compositors 130. The access to the memory buffers 158 generally allows the main CPU 212 (FIG. 13) to perform intermediate processing on video, audio or graphics passing through the set-top box system 12. The only point that is generally not accessible by the main CPU 212 (FIG. 13) is a final composited output 174 of the downstream compositor 160. In higher security implementations, access by the CPU 212 to buffers containing compressed video data, and possibly to uncompressed video data, may be prohibited, or severely limited, The number of outputs and the way that the hardware of the set-top box system 12 is constructed to accommodate the outputs is typically very much platform dependant, but it is assumed that there are generally two different types of multiple output configurations as follows.

The first configuration is a "same output presentation" which is typically used where an exact copy of the TV output is required, and possibly at a different scale, for example, but not limited to, to feed a VCR or second screen in another room. In the cases of the previous examples, it might be necessary to scale the TV output up or down. The scaling is assumed to be performed through the addition of a scaler (not shown) on the output side of the final downstream compositor 160.

The second configuration is a "different output presentation" which is typically adopted where a completely different output presentation is required, for example, but not limited to, for an independent TV output or for showing the same TV presentation at the same scale, but with a different composition. The "different output presentation" configuration might be appropriate if the set-top box system 12 is operative to support multiple TVs in different rooms, for example, where each room can independently use the facilities of the set-top box system 12.

The "different output presentation" configuration typically necessitates multiple video effects processors 78, graphical effects processors 80 and audio effects processors 84 (FIG. 13). However, multiple video effects processors 78, graphical effects processors 80 and audio effects processors 84 may not be necessary if reduced functionality is acceptable for some TV outputs. The exact layout is therefore platform dependent.

Figure 20:
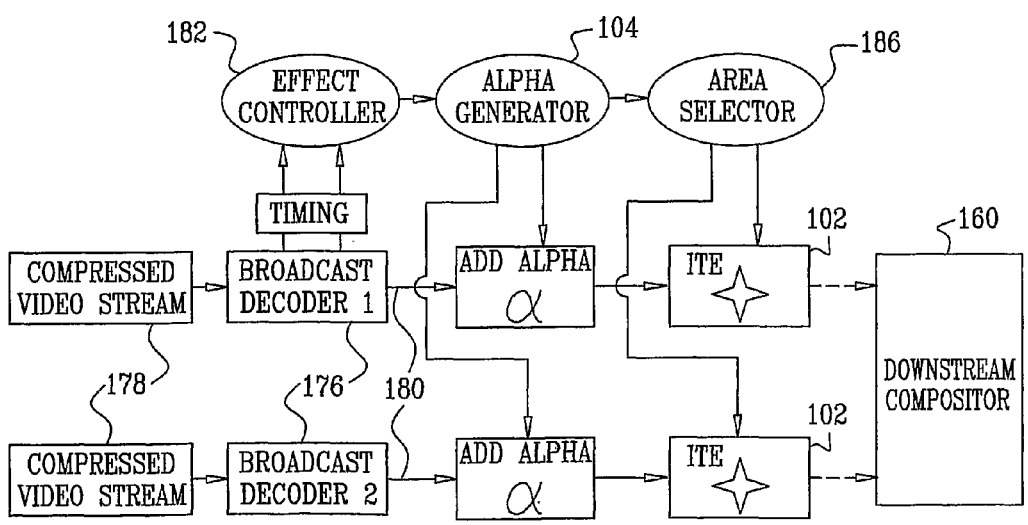
FIG. 20 is a block diagram view of a broadcaster decoder subsystem for use with the set-top box system of FIG. 13.

Reference is now made to FIG. 20, which is a block diagram view of the broadcast decoder subsystem 76 for use with the set-top box system 12 of FIG. 13. The video broadcast decoders 176 of the broadcast decoder subsystem 76 are typically the main input decoders to the set-top box system 12. The video broadcast decoders 176 are preferably operative to decode a plurality of broadcast streams 178 in real time off-air or from disk. The video broadcast decoders 176 preferably handle any suitable compression format required by the set-top box system 12. Features like "trick mode" are supported by the set-top box system 12. As described above with reference to FIG. 13, a minimum of two video broadcast decoders 176 are required for the set-top box system 12. If appropriate, more video broadcast decoders 176 are added to the broadcast decoder subsystem 76 by increasing the number of component chains.

In the broadcast decoder subsystem 76 subsystem, the video broadcast decoders 176 are augmented with additional components to form a larger sub-system. The following section describes the typical features of the broadcast decoder subsystem 76.

The broadcast decoder subsystem 76 is preferably operative to: enable the decoding of at least two broadcast video streams 178 yielding a plurality of decoded video streams 180; and to condition the decoded video streams 180 to allow downstream mixing and effects to be added to the decoded video streams 180; to extract timing and time-line information from the streams 180 in order to allow downstream effects to be performed on, or added to, the decoded video streams 180 in way that can be synchronized to the underlying content of the streams 180; and to allow video transition effects to be performed on the decoded video streams 180.

The compressed broadcast streams 178 may be from any suitable "broadcast originating" source, but are generally either from a live streamed source or a stored file based source.

The typical flow through the broadcast decoder subsystem 76 is now described.

First, the video broadcast decoders 176 typically decode the compressed broadcast streams 178 to base band YCbCr 4:2:0 decoded video streams 180. A plurality of timing data 184 or metadata embedded in the video stream 180 is extracted and passed up to controlling software typically managed by an effect controller 182.

The video streams 180 are then processed to pre-condition the video streams 180 ready for the rest of the set-top box system 12 including: pan and scan vector processing; up/down scaling that is required as part of the compression syntax; features relating to conditioning the content for the rest of the set-top box system 12; de-interlacing; optionally frame rate conversion (depending on the feature set of the set-top box system 12); any additional up/down sampling required for video resolution matching prior to any transitions.

The actual video transitions are typically performed through a combination of the image transform engines 102, the alpha generator 104 and the downstream video compositor 160. The video broadcast decoders 176, the alpha generator 104, the image transform engines 102, the compositor 160, the area selector 186 and the effect controller 182 are preferably operationally connected as shown in FIG. 20.

The alpha controller 104 is used to create alpha channels for each of the decoded video streams 180. In the example of FIG. 20, the created alpha channels are assumed be applied to a whole picture before any suitable transformations are performed by the image transform engines 102.

The image transform engines 102 are typically used to perform any suitable transforms necessary to create the desired transitions. If the transition(s) requires a video to shrink into the distance for example, one of the image transform engines 102 may be programmed by an area selector 186 to shrink the video 180 over the next few frames. The area selector 186 is typically a software control module running on the main CPU 212 (FIG. 13).

The created alpha channels are typically used to create effects like cross fades, whereby the alpha is increased on one the video feeds 180 and reduced on another video feed 180, for example. When the video feeds 180 are composited downstream by the compositor 160, the cross fade effect is seen. In combination, the alpha generator 104 and the image transform engines 102 are typically used to create most transitions under software control.

It will be appreciated by those ordinarily skilled in the art that the order of the image transform engines 102 and the alpha generator 104 may be reversed, for example the image transform engines 102 can process the videos 180 before the alpha generator 104. Additionally, it will be appreciated by those ordinarily skilled in the art that the created alpha channels can be applied to a region or regions of the picture before or after transformations are performed by the image transform engines 102, as appropriate.

Figure 21:
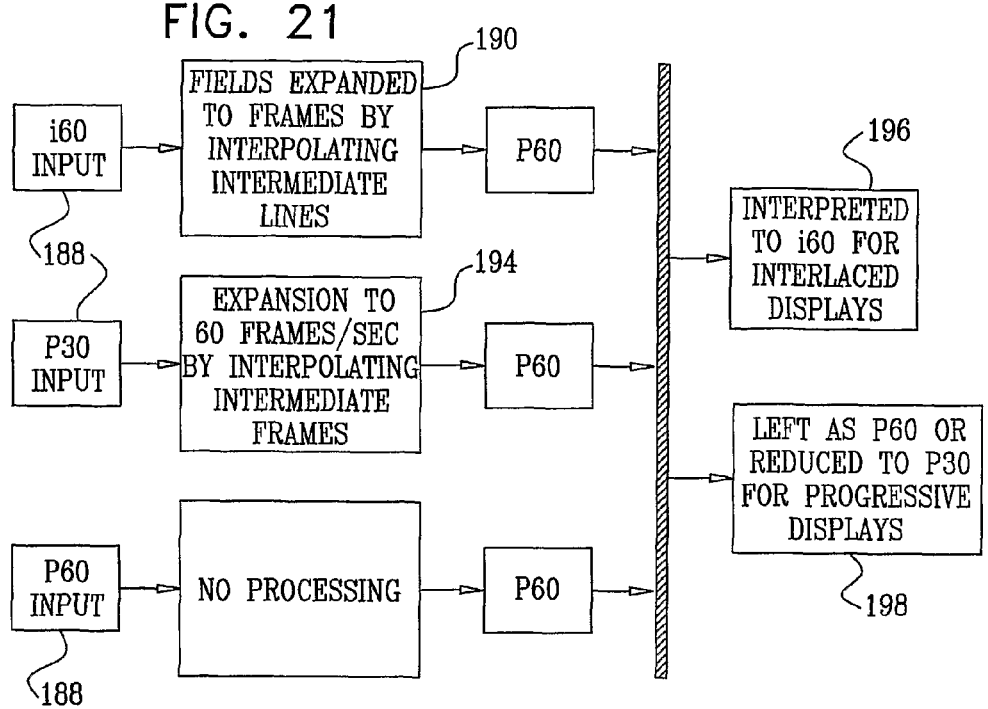
FIG. 21 is a block diagram view of a preferred method of converting all video feeds to the same format for use with the set-top box system of FIG. 13.

Reference is now made to FIG. 21, which is a block diagram view of a preferred method of converting a plurality of video feeds 188 to the same format for use with the set-top box system 12 of FIG. 13. The incoming feeds 188 may be different combinations of resolution, frame rate and aspect ratio. To allow for a transition between the feeds 188, the resolution, frame rate and aspect ratio factors need to be rationalized into a common format. However, the rationalization must preferably be done in a way that minimizes any reduction in video quality.

Therefore, to ensure that interlaced frames can co-exist with non interlaced frames, interlaced frames are expanded to full frames including creating intermediate lines.

The set-top box system 12 preferably operates at a system frame/field rate of 50 or 60 Hz by way of example only. Therefore, any of the feeds 188 coming into the system 12, whether interlaced or not, are expanded to the system frame/field rate. Hence interlaced feeds 188 with 60 Hz field rate are converted to a 60 Hz frame rate by interpolating the missing lines (block 190). Also non-interlaced feeds 188 with 30 Hz field rate are converted to 60 Hz by interpolating intermediate frames (block 194).

The above method ensures that all the feeds 188 are in the same format, meaning that all the feeds 188 can be composited together. However, the feeds 188 can also be converted back to the original format losslessly by removal of the additional lines (block 196). Additionally, the feeds 188 may be left at 60 Hz frame rate or reduced to 30 Hz frame rate for progressive displays (block 198).

It should be noted that 1080i (interlaced) HD feeds are preferably converted to 1080P, thus doubling the bus bandwidth required for the set-top box system 12. It should be noted that any suitable common format can be used in place of p60 format either to reduce the bandwidth requirements or to match the input and output formats. The format can even change dynamically rather than being a static system fixed format.

Separate feeds in the set-top box system 12 preferably need to be locked or synchronized together to ensure that a seamless switch from one video source to another is achieved. Given that the video sources can come from anywhere, a clock synchronization mechanism (not shown) is preferably provided in the set-top box system 12.

The set-top box system 12 is preferably operative such that all switching is performed on VBI at the frame rate of the set-top box system 12.

All content time synchronization information is typically extracted as described with reference to FIG. 13. The synchronization information is typically from several sources which can be enabled under software control. The timing information is made available to controlling software running on the main CPU 212 (FIG. 13).

Figure 22:
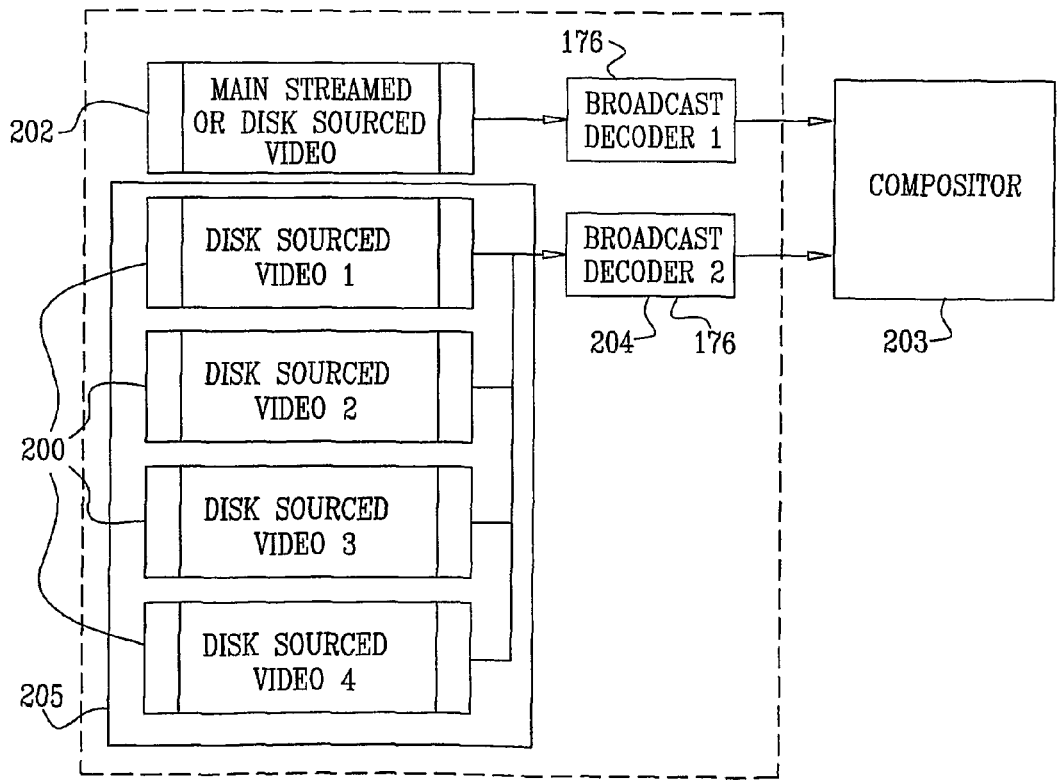
FIG. 22 is a block diagram view illustrating a preferred method of insertion of alternative material for use with the set-top box system of FIG. 13.

Reference is now made to FIG. 22, which is a block diagram view illustrating a preferred method of insertion of a plurality of alternative material 200 for use with the set-top box system 12 of FIG. 13.

The main video broadcast decoders 176 have some special features used to handle the frame accurate switching or insertion of the alternative A/V material 200. The alternative material 200 is typically stored in a disk arrangement 205 as shown in FIG. 22. It will be appreciated by those ordinarily skilled in the art that the disk arrangement 205 may be a single storage unit or separate storage units which are operationally connected to each other.

One of the video broadcast decoders 176, namely a video broadcast decoder 204, is preferably operative to handle cueing up of the alternative material 200 (off disk material) for insertion into either incoming live feeds from a tuner (not shown) or another disk based content 202 with frame accuracy. When the content 202 is disk based content, the content 202 is typically stored in the disk arrangement 205. As shown in FIG. 22: the content 202 is typically decoded by the other video broadcast decoder 176; the output of the decoders 176 is preferably composited by a compositor 203 such that the alternative material 200 is inserted into the content 202; and the video broadcast decoders 176, the disk arrangement 205 and the compositor 203 are preferably operationally connected. FIG. 22 shows up to four disk based sources 200, by way of example only, being cued up in the video broadcast decoder 204 ready for insertion. The cueing method is preferably used for applications where alternative material needs be inserted, like advertising material, or applications where a key press is required to make the final decision as to which piece of material is to be inserted. Telescopic Advertising, Xtreamplay of NDS Limited or DVD-like menuing and games are examples where the cueing feature is typically used. Cueing of material is described in more detail with reference to FIG. 29.

The requirements for trick mode are generally defined or limited by the platform operator and the compression algorithms being used. For the set-top box system 12, however, any changes in speed and direction are generally substantially smooth and deterministic. Frames are preferably not be dropped or repeated below a known threshold (for example, but not limited to 12 frames per second or less) and any latencies and speed increments are preferably minimized thereby giving smooth ramp up/down/acceleration control to the video playback.

Figure 23:
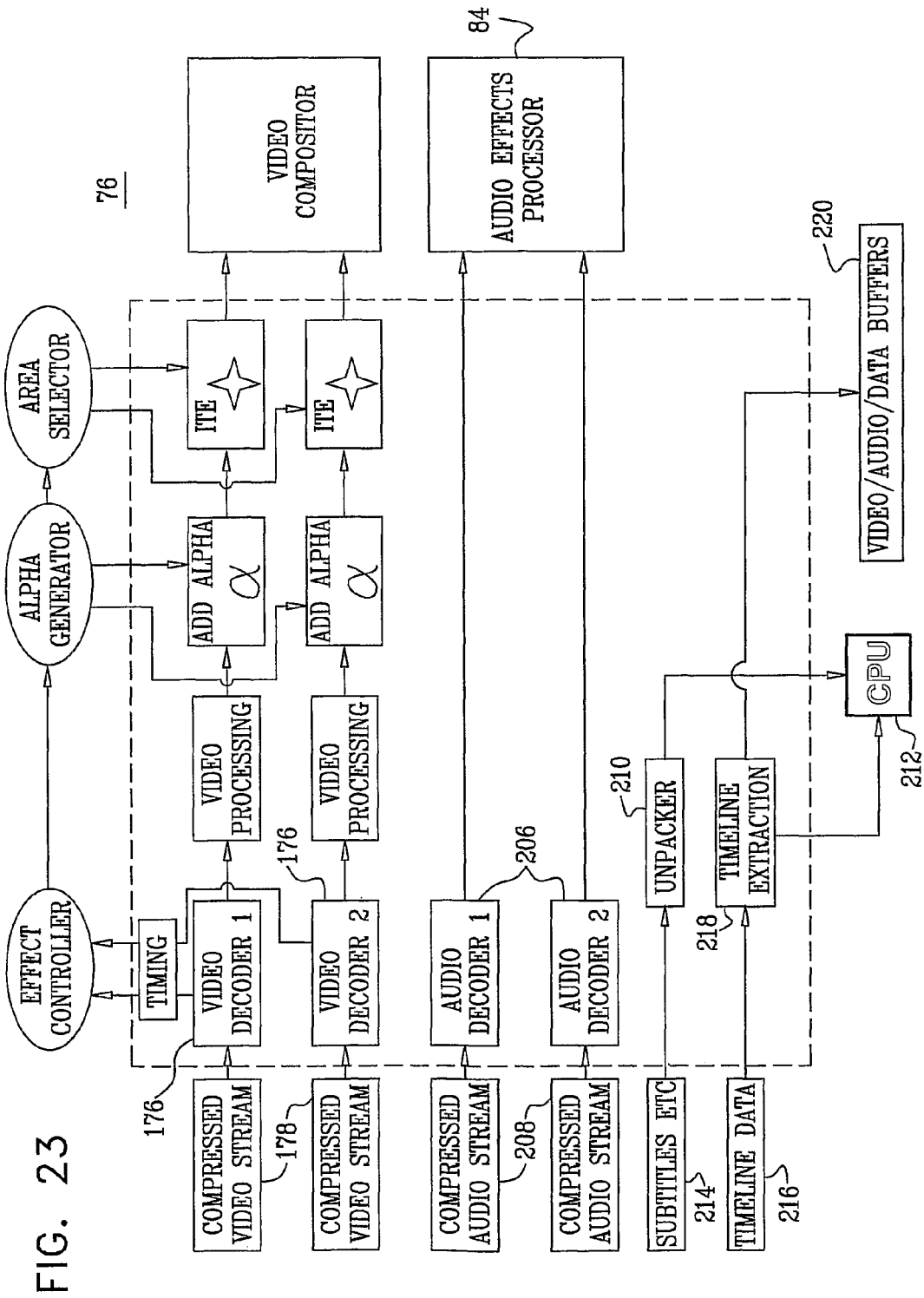
FIG. 23 is a detailed block diagram view of the broadcast decoder subsystem of the set-top box system of FIG. 13.

Reference is now made to FIG. 23, which is a detailed block diagram view of the broadcast decoder subsystem 76 of the set-top box system 12 of FIG. 13. FIG. 23 shows the broadcast decoder subsystem 76 including the video decoders 176 and a plurality of audio decoders 206.

Under normal viewing, it is expected that a plurality of audio streams 208 associated with the video streams 178 are either decoded by the audio decoders 206 and passed through the set-top box system 12 to the audio effects processor 84 or fed through the set-top box system 12 without any change, depending on audio type and the final audio output. The audio effects processor 84 is described in more detail with reference to FIGS. 46-47.

The broadcast decoder subsystem 76 includes an unpacker 210 for extracting data of a plurality of supplementary synchronized streams 214 for subtitles, closed captions and possibly other streams such as DVD format including sub-picture auxiliary streams. The supplementary synchronized streams 214 are extracted and fed to the main CPU 212. The data is preferably processed within the main CPU 212 and dropped back into the graphics system through the graphical effects processor 80 described in more detail with reference to FIGS. 44-45. The extracting is typically hardware accelerated.

Additionally, a plurality of timeline data 216 is preferably extracted by a timeline extraction module 218 and forwarded to the main CPU 212 and a plurality of video/audio data buffers 220.

By way of introduction, several video effects processors are now described with reference to FIGS. 24-43. It will be appreciated that any of the video effects processors described with reference to FIGS. 24-43 can be used alone or in any suitable combination for use as the video effects processor 78.

Figure 44:
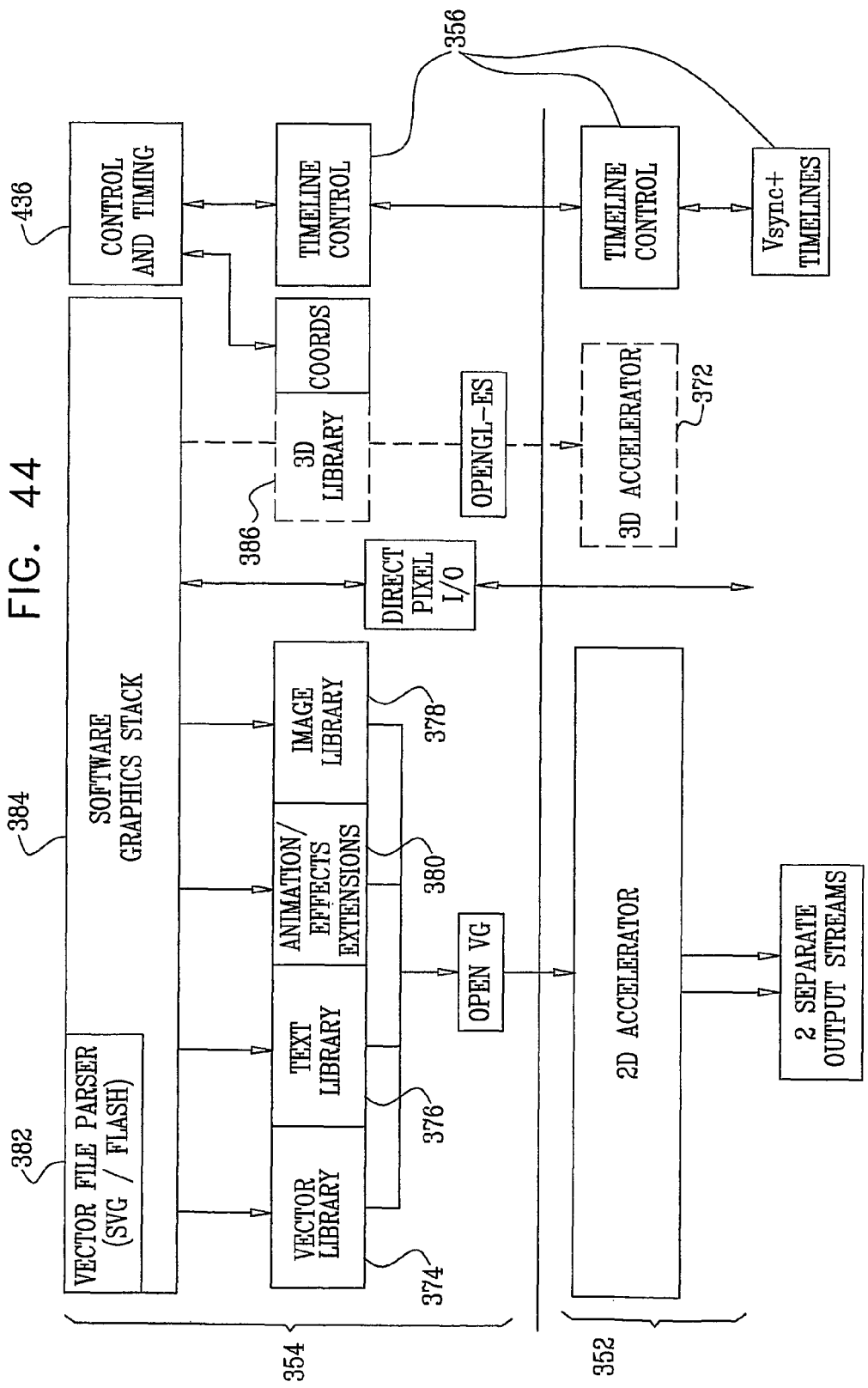
FIG. 44 is a block diagram view of a graphical effects processor for use with the set-top box system of FIG. 13.

The video effects processor 78 is preferably used to create composites of moving video, used to provide constantly moving backgrounds, effects or overlays. The video effects processor 78 is also preferably used to create collections of assets to be used by other elements in the set-top box system 12. The video effects processor 78 is typically linked to, and complimentary to, the graphical effects processor 80 (FIG. 44).

The objectives of the broadcast decoder subsystem 76 are generally as follows: to create a scalable, cost sensitive, subsystem for generating moving video backgrounds, overlays and effects; to handle any timing and synchronization necessary to link the video effects to the rest of the set-top box system 12; and to handle a media package loading mechanism described with reference to FIGS. 33-40.

The video effects processors described with reference to FIGS. 24-43 are divided into two broad categories, namely a basic level video effects processor and an advanced level video effects processor.

The basic level is generally for short duration looping backgrounds or overlays (max 2 mins) based on MPEG I-frames or PNGs. Any EPG movie thumbnails are typically bitmap stills.

The advanced level is generally for long duration looping backgrounds or movie thumbnails based on Long GOP compression. The actual compression format used is typically arbitrary as long as the storage and transmission bandwidth requirements are met.

Figure 24:
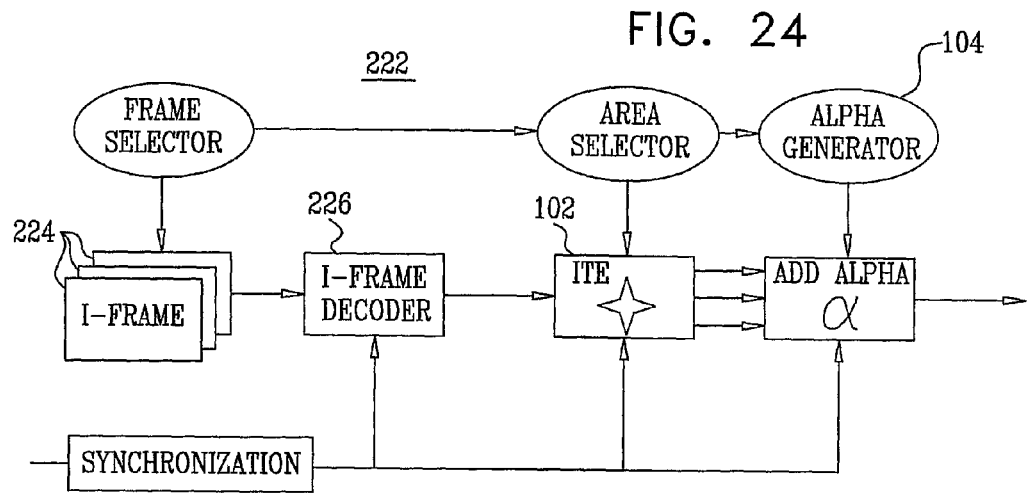
FIG. 24 is a block diagram view of a basic level video effects processor of the set-top box system of FIG. 13.

Reference is now made to FIG. 24, which is a block diagram view of a basic level video effects processor 222 of the set-top box system 12 of FIG. 13.

One of a plurality of I-frames 224 are typically presented to an I-frame decoder 226 during a frame period. The I-frame decoder 226 preferably decodes any suitable shape of I-frame 224 as long as the I-frame 224 includes an integral number of macro blocks. The decoded output or regions of the I-frame decoder 226 are then generally processed and copied with pixel accuracy onto a surface by the image transform engine 102. Following composition, the alpha generator 104 typically adds an alpha layer to the I-frames 224. The basic level video effects processor 222 preferably includes a frame selector 225 for selecting individual I-frames as required.

Overall, the basic level video effects processor 222 generally allows multiple regions of moving, full color video to be used as a background or overlay for example, but not limited to, providing background images for EPGs and other graphics utilizing I-frames, requiring interruption of the decoding process in order to display the I-frames, thereby providing a significant advance over existing systems. The existing systems typically use static screen shots generally requiring interrupting the CPU rather than having a specialized separate parallel decoder for I-frames.

Figure 25:
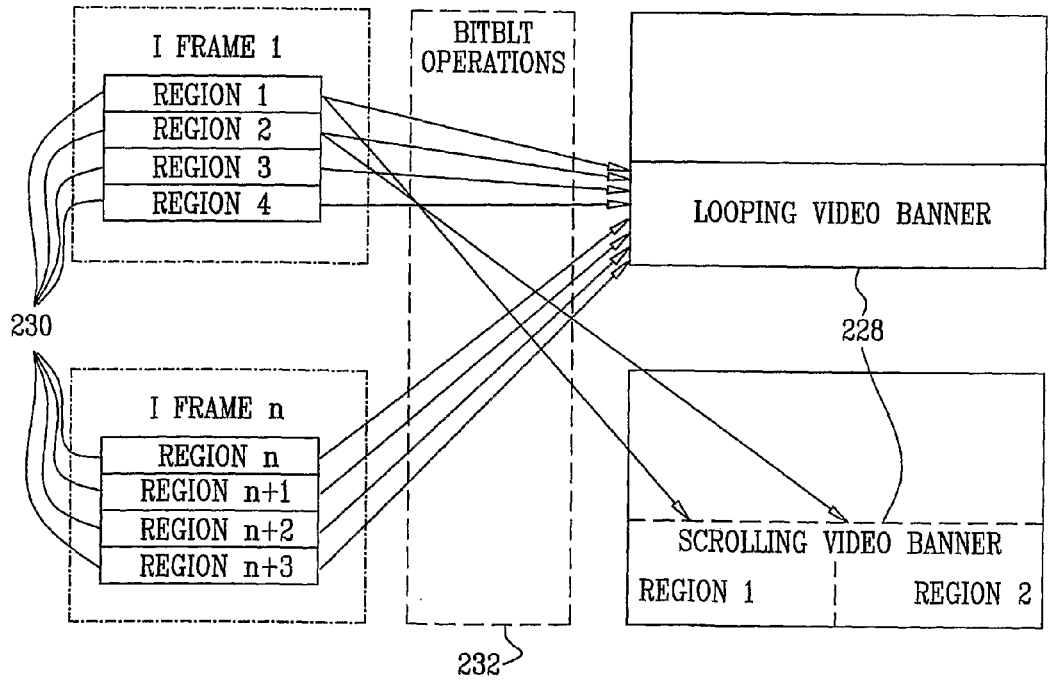
FIG. 25 is a block diagram view illustrating a preferred method of creating a video overlay using the video effects processor of FIG. 24.

Reference is now made to FIG. 25, which is a block diagram view illustrating a preferred method of creating a plurality of video overlays 228 using the video effects processor 222 of FIG. 24. The basic level video effects processor 222 (FIG. 24) preferably allows a set of tiles 230 to be defined as a set of I-frames. Then, a decode-blit process (block 232) is typically used to create an output (the video overlays 228) from the tiles. The overall effect is to enable multiple regions of full color moving video to be used.

In the example of FIG. 25, regions (tiles 230) of whole I-frames (I-frame 1 and I-frame n) are generally blitted in a timed sequence to create video overlays 228. Obviously, the tiles 230 of the I-frames (I-frame 1 and I-frame n) can be arranged in any suitable way, from each I-frame including one frame (tile 230) of each region, to each I-frame including areas of many video overlays. Ultimately, the arrangement of the I-frames depends on which option gives the best compression. In a similar manner, it may be appropriate to alter the compression across the picture to give the correct amount of quality to a particular graphic.

Figure 26:
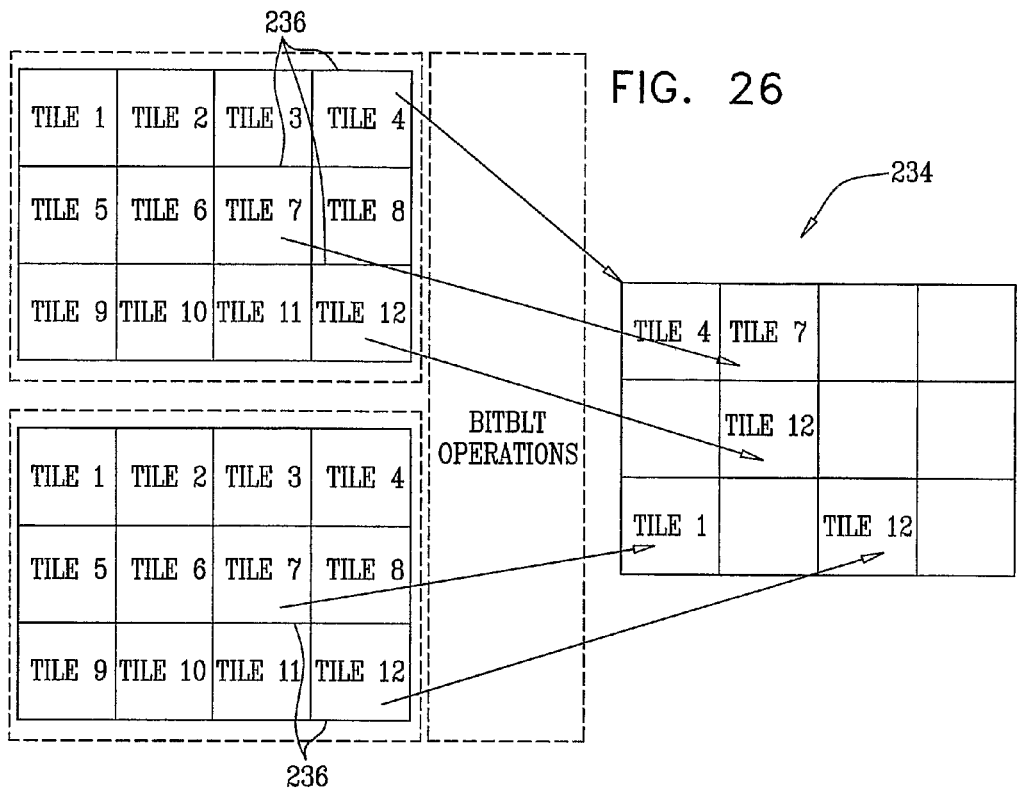
FIG. 26 is a block diagram view illustrating a preferred method of creating a background or levels of a game using the video effects processor of FIG. 24.

Reference is now made to FIG. 26, which is a block diagram view illustrating a preferred method of creating a background 234 or levels of a game using the basic level video effects processor 222 of FIG. 24. In the example of FIG. 26, a set of I-frames can be arranged as a plurality of tiles 236 and used to create many backgrounds 234 or levels of a game, for example. It should be noted that combining the example of FIG. 26 with the example of FIG. 25, video tiles and animated and moving sprites can be supported, typically requiring the addition of an alpha channel. Alpha channels are described with reference to FIG. 27.

Figure 27:
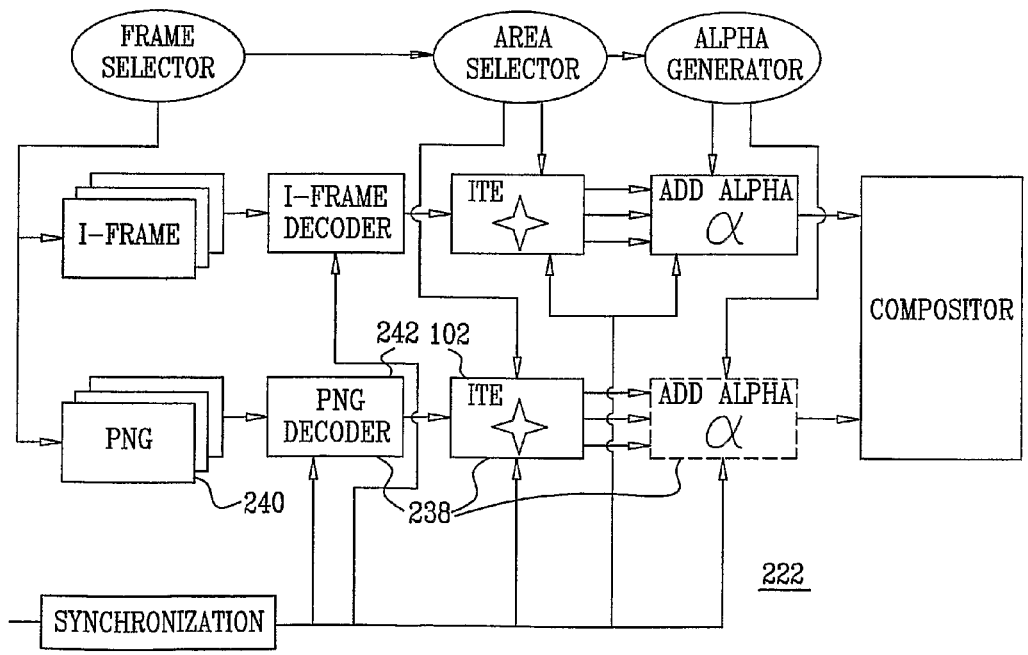
FIG. 27 is a block diagram view of the basic level video effects processor of FIG. 24 with a PNG decoder arrangement.

Reference is now made to FIG. 27, which is a block diagram view of the basic level video effects processor 222 of FIG. 24 with a PNG decoder arrangement 238. To allow for more efficient palette based storage and/or higher precision color images, a chain of PNG decoding parallel to the I-frame decoding described with reference to FIG. 24 is preferably applied as shown in FIG. 27. The PNG decoder arrangement 238 includes: a PNG decoder 242 for decoding a plurality of PNGs 240. The output of the PNG decoder 242 is preferably processed by another of the image transform engines 102. The addition of an alpha channel to the PNG track is optional as the PNG image may already have an alpha channel.

Optionally, the basic level video effects processor 222 includes separate tracks for JPEG, GIF or DV decoders, if necessary.

With alpha capability, the basic level video effects processor 222 is very flexible and typically achieves one or more of the following effects: create multiple moving video regions of any suitable size, anywhere on the screen with alpha reveal and animation; create tile based backgrounds, where tiles are substituted on a frame by frame basis; create arbitrarily shaped, animated sprite sets using the pixel perfect PNG alpha capability; and generate sets of full color depth and alpha channel bitmap assets to be used in local compositions or passed to the graphical effects processor 80 (FIG. 44) for further processing.

Using I-frames and PNGs with long or large movie sequences typically requires large storage capabilities and transmission bandwidth, so a long GOP based version of the Video Effects Processor 78 is preferably required. Long GOP versions of the Video Effects Processor 78 are described below with reference to FIGS. 28-31 and 43.

Figure 28:
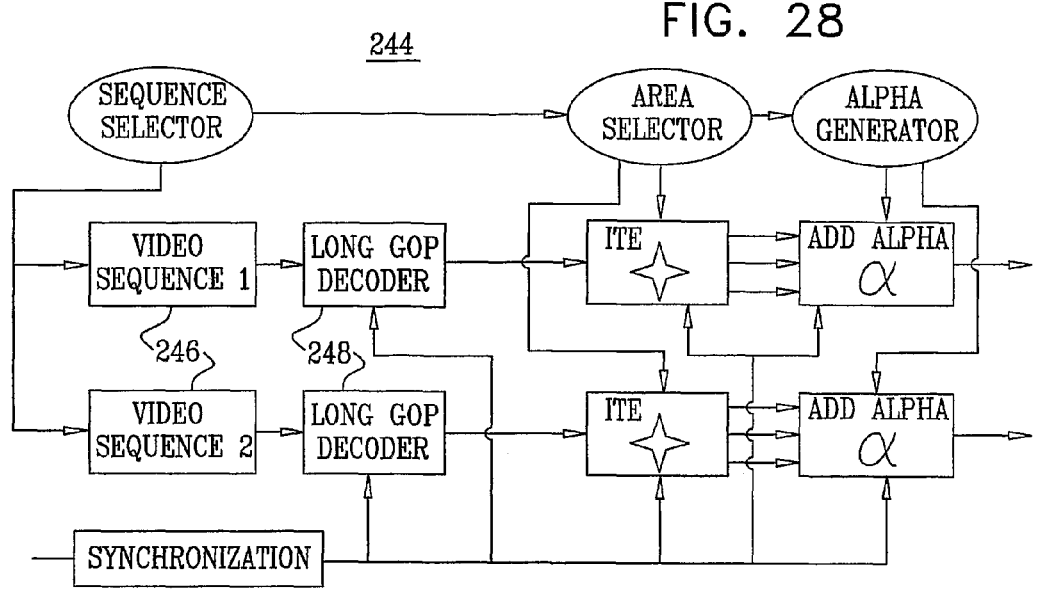
FIG. 28 is a block diagram view of an advanced level video effects processor for use with the set-top box system of FIG. 13.

Reference is now made to FIG. 28, which is a block diagram view of an advanced level video effects processor 244 for use with the set-top box system 12 of FIG. 13. The architecture of the advanced level video effects processor 244 is substantially the same as the architecture of the basic level video effects processor 222 except that the advanced level video effects processor 244 is preferably operative to handle long GOP compressed sequences (for example, a plurality of video sequences 246) as well.

The advanced level video effects processor 244 typically includes a plurality of long GOP decoders 248.

The implementation of the long GOP decoders 248 is typically silicon dependent. However, it should be noted that the total output video area of each of the long GOP decoders 248 is never greater than one screen area. Therefore, through careful management of the long GOP decoders 248, it is generally possible to use the advanced level video effects processor 244 to decode one screen area from many sources.

Figure 29:
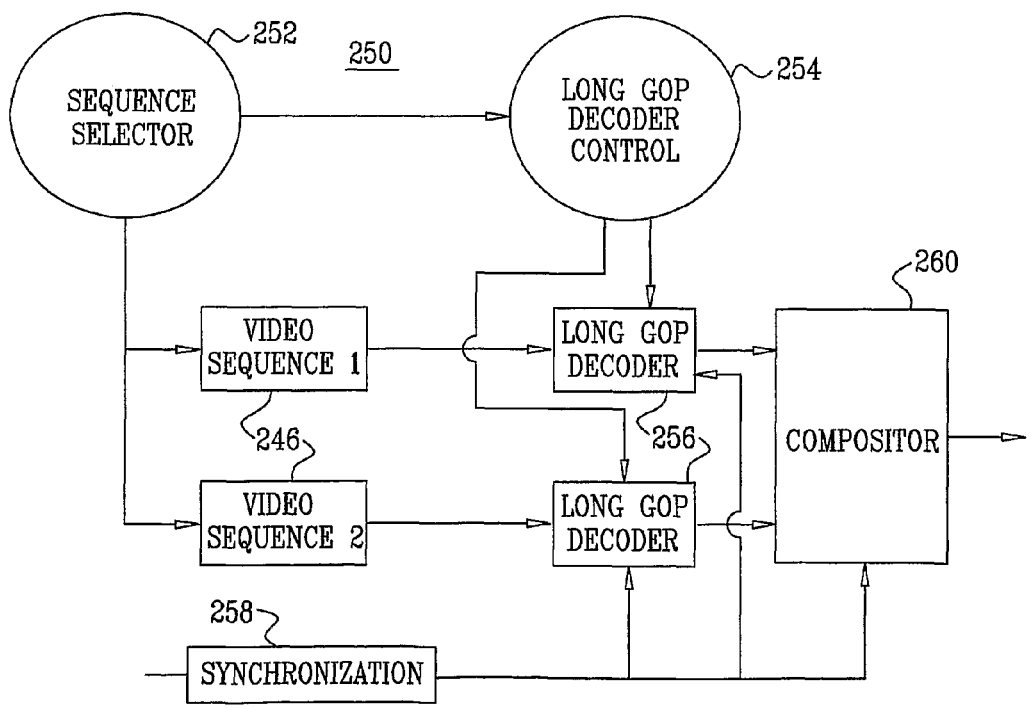
FIG. 29 is a block diagram view of a managed decoder for use with the set-top box system of FIG. 13.

Reference is now made to FIG. 29, which is a block diagram view of a managed decoder 250 for use with the set-top box system 12 of FIG. 13. The managed decoder 250 typically includes a sequence selector 252, a long GOP decoder control 254 and two long GOP decoders 256.

The managed decoder 250 is a long GOP based decoder which preferably has the following attributes: reference frames used by the long GOP decoders 254 are managed such that multiple streams or stills can be decoded simultaneously; the managed decoder 250 is timeline aware (block 258) and is controlled by the long GOP decoder control 254 to decode to a specific frame in the video sequence 246 (in other words, to decode to frame X, and put frame X in an output buffer of the managed decoder 250 until the managed decoder 250 is instructed to play the video).

In all the video effects processors described herein, it is assumed that: the clips played out come from a storage arrangement (for example, but not limited to, the disk arrangement 205 of FIG. 22); and the storage mechanism is managed in such a way that the storage mechanism is operative to cope with the required throughput.

Using the two decoders 256 (or alternatively the long GOP decoders 248 of FIG. 28), the two video sequences 246 may be decoded, each of the sequences 246 at full screen, to base band video simultaneously, and if, the outputs of the long GOP decoders 256 are synchronized together, a switch can be used to seamlessly switch from one of the outputs to another of the outputs of the long GOP decoders 256. The above method is preferably used to seamlessly concatenate content together or to give seamless loops. The difficult part is to get the timing right such that the correct frame on one sequence 246 is concatenated to the correct frame of the other sequence 246. However, if content is coming from storage, and the managed decoder 250 is aware of which frame the managed decoder 250 is decoding, the managed decoder 250 is instructed by the main CPU 212 (FIG. 13) to cue up to a specific frame (typically faster than real-time) in the video sequence 246, ready to play (typically at real-time) from where the managed decoder 250 cued up to. Therefore, the managed decoder 250 decodes video up to a specific frame and saves the reference frame(s) and other decoding state information necessary to allow restarting the decoding from the exact same specific frame at which the managed decoder 250 stopped decoding. At a future point in time, the managed decoder 250 loads the reference frame(s) and the decoding state information and restarts decoding from the specific frame.

Using the above cueing technique typically has two benefits. First, any timing issues are simplified, because the managed decoder 250 has the content at the correct frame, ready to playout on demand. Second, the concept of cueing up ahead of time is preferably used to reduce any real time constraints on the set-top box system 12 and to manage the flow of content out of storage.

Note that the control mechanisms required are substantially the same as the control mechanisms described in the video aspects of the broadcast decoder subsystem 76.

In FIG. 29, a compositor 260 is used as a switch with the relevant input being routed through to the output and clocked through on a VBI period.

In FIG. 29, there are two decoders 256. However it is well known that decoders typically run faster than real time, so for real time playout, one decoder can be used to generate multiple outputs, by careful management of the reference frames that are used to generate the output, as will be described below with reference to FIG. 30.

Figure 30:
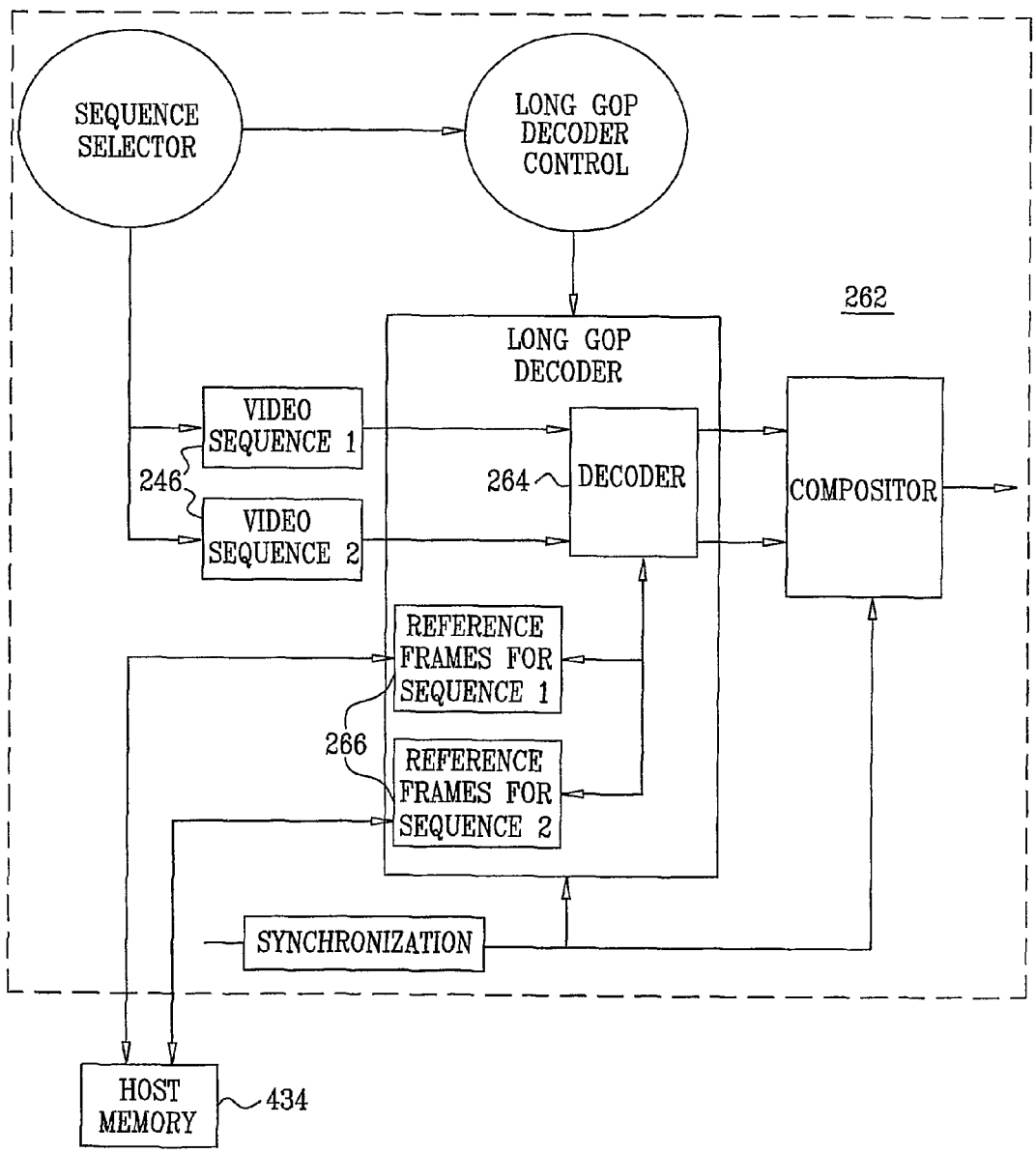
FIG. 30 is a block diagram view of a multiple input managed decoder for use with the set-top box system of FIG. 13.

Reference is now made to FIG. 30, which is a block diagram view of a multiple input managed decoder 262 for use with the set-top box system 12 of FIG. 13. The multiple input managed decoder 262 preferably includes a single decoder 264 which processes the input sequences 246 and a plurality of corresponding reference frames 266 on a time sharing basis. For each frame period, the decoder 264 typically decodes one frame from video sequence 1 using reference frames 1. Then, the decoder 264 typically switches to video sequence 2 using reference frames 2, pushing the decoded frames for each sequence out in one frame period.

The number of streams that the decoder 264 decodes is only typically limited by CPU capability, memory and the compression scheme used.

For small video that only fill part of the screen such as promos, advertisements or banners, by way of example only, two full screen loads of video may processed by the decoder 264 at once.

The reference frames 266 may be stored in, and/or loaded from a decoder independent buffer 434, which is not a dedicated buffer of the multiple input managed decoder 262, even though the multiple input managed decoder 262 may make some use of the buffer 434. In other words, the reference frames 266 may be transferred between the decoder independent buffer 434 and a dedicated buffer of the multiple input managed decoder 262. The term "transfer between" as used in the specification and claims is defined as loading a reference frame from the buffer 434 and/or storing a reference frame in the buffer 434. The term "dedicated" buffer as used in the specification and claims is defined as a buffer for exclusive use by a decoder. The buffer 434 is typically a buffer of a host memory or the host CPU 212. It should be noted that the reference frames 266 may or may not be physically moved when the reference frames 266 are moved into or out of the dedicated buffer of the multiple input managed decoder 262 For example, the dedicated buffer of the multiple input managed decoder 262 may be reassigned to another memory location, which moves the reference frames 266 into, or out of, of the dedicated buffer or the buffer 434. Therefore, the term "transfer between" as used in the specification and claims is defined to include moving a reference frame by reassigning the physical memory location of the dedicated buffer.

Figure 31:
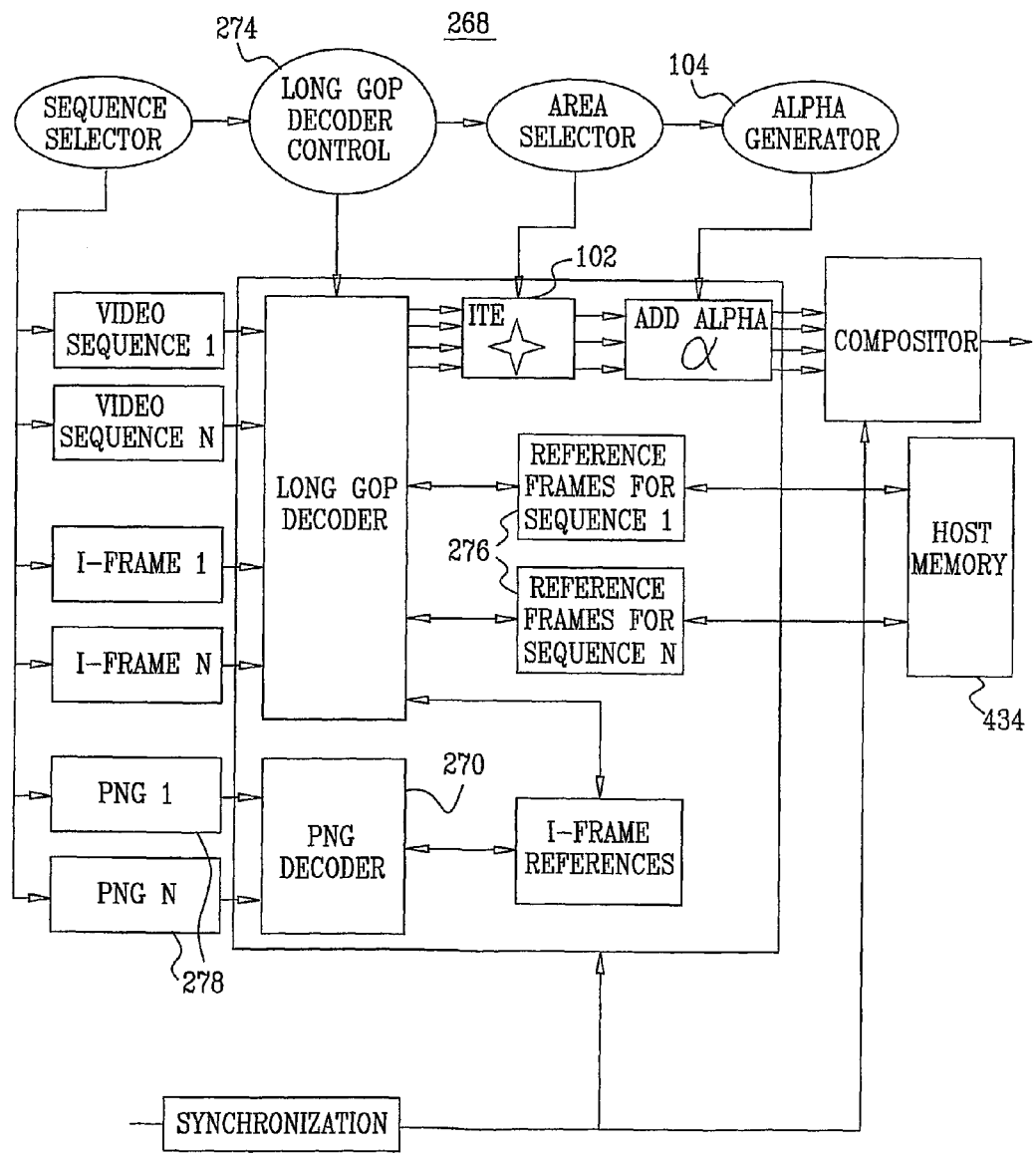
FIG. 31 is a block diagram view of another advanced level video effects processor for use with the set-top box system of FIG. 13.

Reference is now made to FIG. 31, which is a block diagram view of another advanced level video effects processor 268 for use with the set-top box system 12 of FIG. 13. The advanced level video effects processor 268 preferably includes a long GOP decoder 272 managed by a long GOP decoder control 274.

In a similar way to that described with reference to the basic level video effects processor 222 of FIG. 27, the advanced level video effects processor 268 typically includes the image transform engine 102 and the alpha generator 104 to allow for the shaping, animation and alpha effects aspects.

The advanced level video effects processor 268 also preferably includes a PNG decoder 270 so that a plurality of I-frame references 276 for the long GOP decoder 272 may also come from a PNG source 278.

The basic level video effects processor 222 (FIG. 24), the managed decoder 250 (FIG. 29) and the advanced level video effects processor 268 (FIG. 31) are typically operative to handle arbitrarily sized (in space and time) video clips as well as pushing out any suitable region of any suitable frame of any suitable clip on cue (given a disk access and cue up time). Hence, the basic level video effects processor 222 (FIG. 24), the managed decoder 250 (FIG. 29) and the advanced level video effects processor 268 (FIG. 31) typically have much more advanced uses as described below with reference to FIGS. 32-40.

Figure 32:
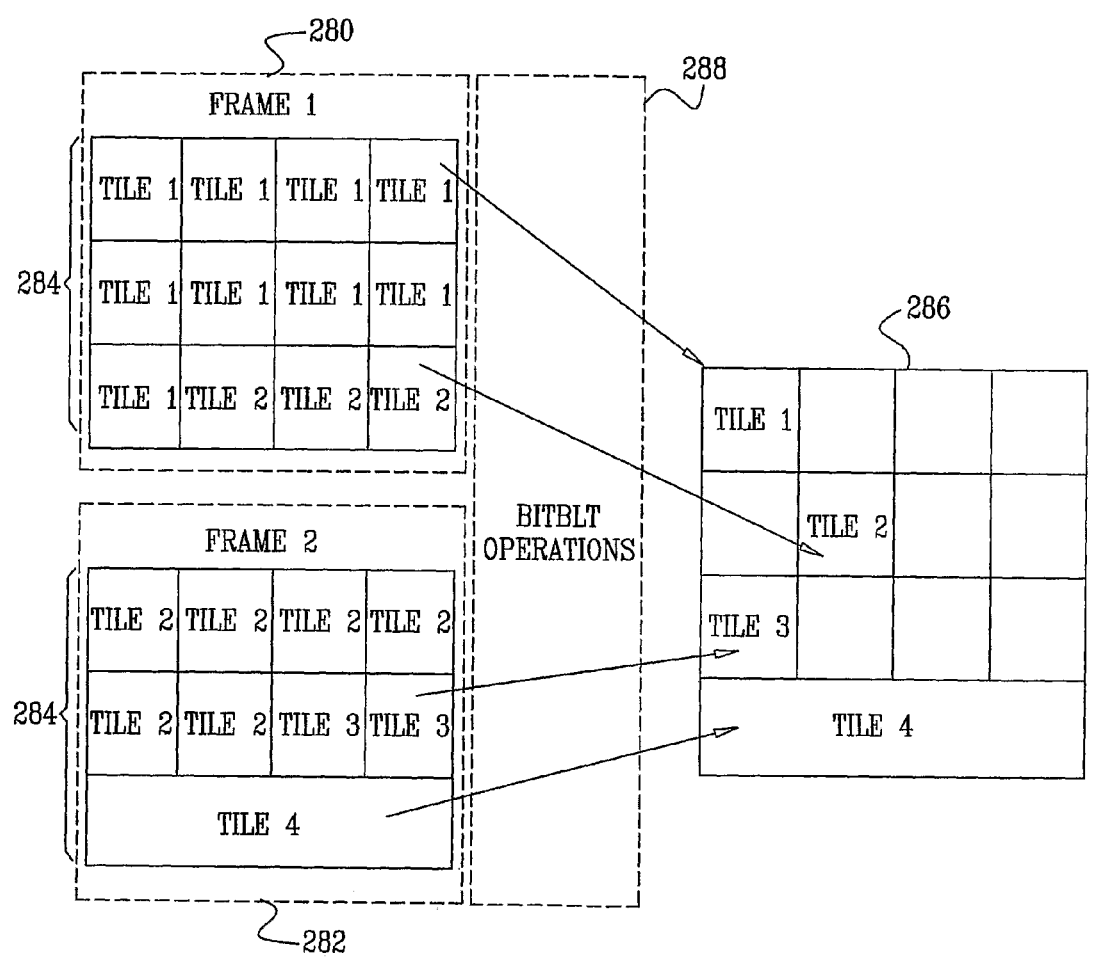
FIG. 32 is a block diagram view of an illustration of a preferred method of playing out multiple clips simultaneously using the set-top box system of FIG. 13.

Reference is now made to FIG. 32, which is a block diagram view of an illustration of a preferred method of playing out multiple clips simultaneously using the set-top box system 12 of FIG. 13. A plurality of tiles 284 are located in an I-frame 280 and an I-frame 282. The tiles 284 are associated with different video clips or stills. For example, all the tiles 284 labeled "tile1" are associated with a single video clip. An output 286 is formed using Bitblt operations (block 288). The Bitblt operations are typically performed by the image transform engine 102 selecting the appropriate tiles 284 from the I-frames 280, 282 in order to form the output 286.

As discussed above, the basic level video effects processor 222 (FIG. 24), the managed decoder 250 (FIG. 29) and the advanced level video effects processor 268 (FIG. 31) are preferably operative to playout multiple clips simultaneously. Playing out multiple clips simultaneously is typically used to generate mosaics and moving video selection panes (arrow 50) shown in the high definition EPG 54 of FIG. 4. The individual clips are typically looped or concatenated with other clips. At the same time, the clips are optionally animated on/off screen, rotated, or a completely new set of mosaics are revealed through folding away the old set of mosaics. Individual entries in the mosaic table could be highlighted, and spun round to reveal a new movie clip.

FIG. 32 shows the way that the input video sequences are typically constructed of the tiles 284 in a completely different way than the video sequences appear on the output 286 thereby allowing for improved compression of the video clips.

Figure 33:
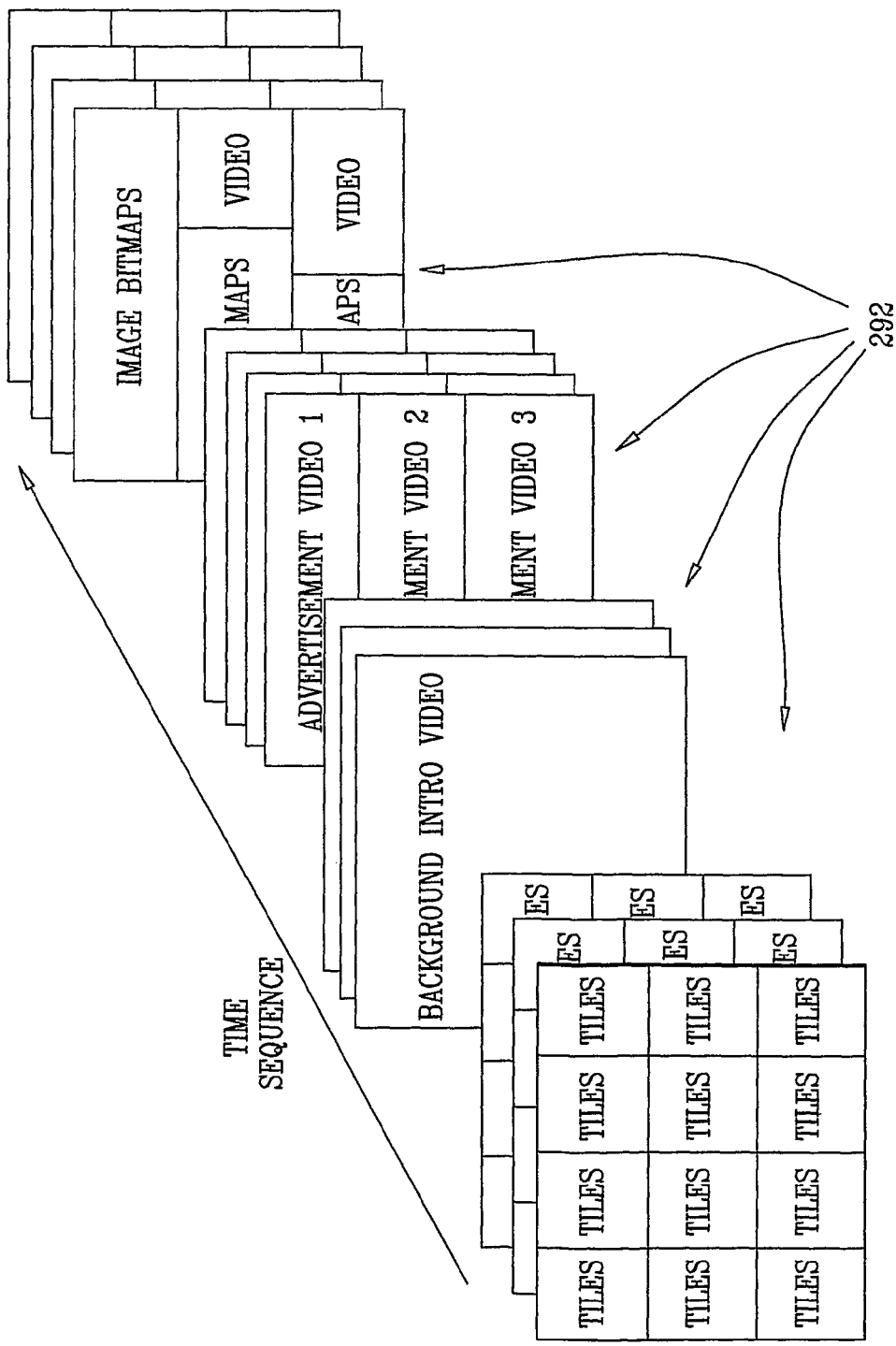
FIG. 33 is a block diagram view illustrating a preferred compression of screenshots for use with the set-top box system of FIG. 13.

Reference is now made to FIG. 33, which is a block diagram view illustrating a preferred compression of a plurality of screenshots 292 for use with the set-top box system 12 of FIG. 13. Long GOP compression is used, typically at the broadcaster Headend, to compress packages of movie thumbnails, stills, animations, moving backgrounds and overlays. The compressed packages are then received and stored by the set-top box system 12. The compressed packages can be decoded in the set-top box system 12 by the managed decoder 250 (FIG. 29) or the advanced level video effects processor 268 (FIG. 31). Then, the content is preferably distributed either in memory to the next stage of the set-top box system 12 or back to mass storage, ready for any future required effects.

In many systems the basis of EPG Screens are compressed as an MPEG-2 I-frame which is uncompressed when the screen is needed. With the increase in number of screens, the space available in flash memory to store the compressed screenshots is at a premium. Additionally, HD displays have increased the quality expectations of the viewers. Therefore, a compression system 298 for compressing image screenshots constructed and operative in accordance with a preferred embodiment of the present invention is described with reference to FIGS. 34-40.

Figure 34:
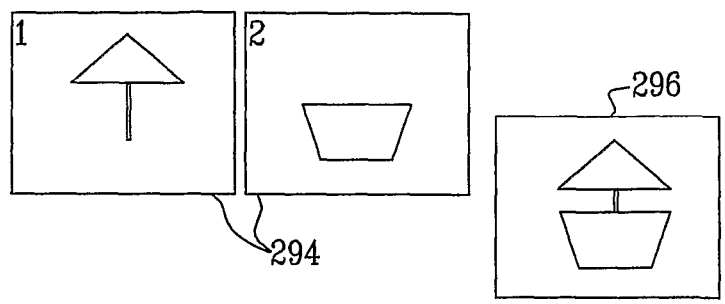
FIG. 34 is a view of image screenshots including a reference screenshot for use in a compression system constructed and operative in accordance with a preferred embodiment of the present invention.

Reference is now made to FIG. 34, which is a view of a plurality of image screenshots 294 (only two shown for simplicity) including a reference screenshot 296 (only one shown for simplicity) for use in the compression system 298.

Instead of compressing the sequence of screenshots 294 as a sequence of I-frames, the sequence of screenshots 294 are preferably compressed as a sequence of P, or B frames, all of which are predicted from one, two or more, common images (for example, the reference screenshot 296) not otherwise used for display. In other words, the reference screenshot 296 is not displayed on a display screen (e.g.: Television) after the reference screenshot 296 is decoded. In order to perform the compression, the sequence of screenshot frames 294 are typically analyzed to identify parts which are common among the screenshots 294, typically based on macroblock boundaries. The parts of the screenshots 294 that are common to a sufficient number of the screenshots 294 are then preferably composed into one or more new screenshots. The new screen shots or reference screenshots 296 preferably become the basis of prediction for all other "real" screenshot frames 294. The reference screenshots 296 are then generally compressed as I-frames. The actual, original screenshots 294 are then typically compressed (encoded) as P or B frames, using the new reference image screenshots 296 in the normal predictive manner used by MPEG. Given sufficient commonality between the screenshots 294 generally leads to an improvement in the compression quality and/or efficiency.

When decoding the compressed screenshots, the decoder (the managed decoder 250 (FIG. 29) or the advanced level video effects processor 268 (FIG. 31), by way of example only) typically needs to first decode the relevant reference screenshots 296 and then the actual P or B frames representing the desired screenshot. Optionally, the new reference screenshots 296 are cached in dynamic random access memory (DRAM) to save repeated decoding of each screenshot used. However, if the decoder is fast enough, storing the reference screenshot 296 in DRAM may not be necessary. Given correct formatting of the compressed (encoded) screenshots, it is generally trivial to either concatenate the bitstreams that represent the images of the screenshots or to send the images to the decoder one after the other. It should be noted that the new reference image screenshots 296 of FIG. 33 are never displayed. The reference screenshots 296 are typically created from the images to be compressed (encoded).

In FIG. 34, the reference screenshot 296 is created from parts of the image screen shots 294. The reference screenshot 296 will not be displayed on screen. The image screen shots 294 are typically encoded as P frames derived from the dummy reference screenshot 296. It should be noted that the dummy reference screenshot 296 is optionally: (a) sent as part of the compression scheme used to compress the video sequence; or (b) sent out of band using a completely different compression scheme like PNG for example; or (c) part of a standard image or dictionary of images that resides in the decoder in the set-top box system 12. In case (b), other compression schemes may give the benefit of a very high quality reference image (for example, but not limited to, a losslessly compressed reference frame) from which the other images are derived. In case (c), compression benefits may be yielded when something is already known about the images to be broadcast, for example, if the images to be broadcast are always cartoons or are all in the style of a resident EPG, then a set of reference frames in the decoder may give great benefits in terms of compression efficiency.

Figure 35:
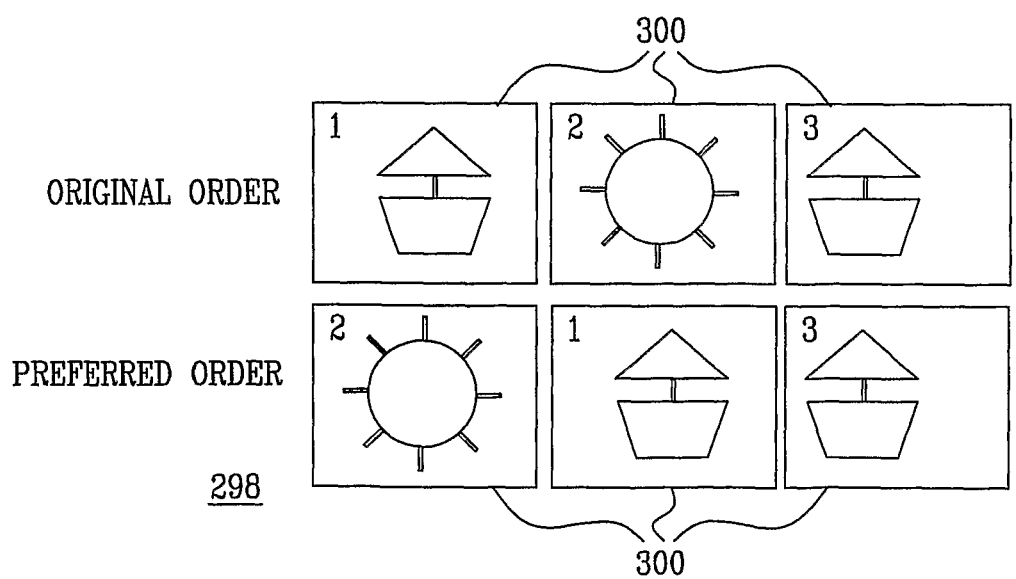
FIG. 35 is a view a plurality of image screenshots being ordered for use in the compression system of FIG. 34.

Reference is now made to FIG. 35, which is a view a plurality of image screenshots 300 being ordered for use in the compression system 298 of FIG. 34. Optionally, the compression system 298 is operative to order (re-order or rearrange) the sequence of screenshots 300 to ensure efficient compression. In the illustration of FIG. 35, it is generally more efficient to send picture 1 before picture 3, as picture 3 can be efficiently derived from picture 1, but very inefficiently derived from picture 2.

Figure 36:
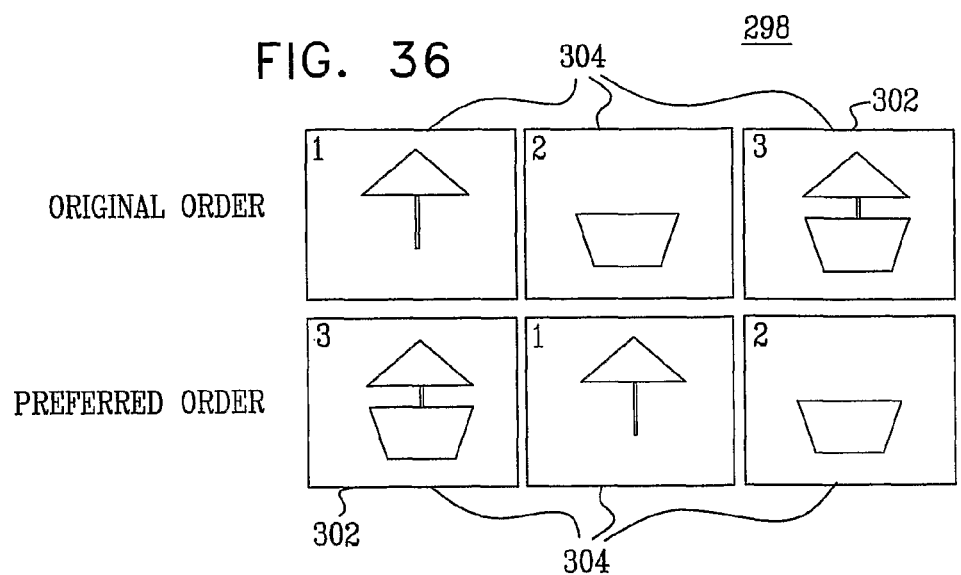
FIG. 36 is a view a common image of a plurality of image screenshots for use in the compression system of FIG. 34.

Reference is now made to FIG. 36, which is a view of a common image 302 of a plurality of image screenshots 304 for use in the compression system 298 of FIG. 34. Optionally, the compression system 298 is operative to identify which of the image screenshots 304 has the greatest commonality with all of the other screenshots 304. If there is sufficient commonality, the compression system 298 preferably uses the common image 302 in place of an artificially created reference image. In FIG. 36, it generally makes more sense to send frame 3 first, as the common image 302 (reference frame), and then frames 1 and 2 as P-Frames derived from frame 3.

If the timing requirements allow more than two images to be decoded, it may be desirable to allow one EPG image to depend on a sequence of previous images. For example, a screenshot D could depend on screenshot C which is predicted and reconstructed from a screenshot B and a screenshot A. Hence decoding the screenshot D requires the screenshots A, B and C to be decoded in order to generate the required reference images for the screenshot D. Altering the "order" of the screenshots (relative to the ID of the screenshots) may improve compression efficiency.

The reference image screenshot(s) that are generated do not need to be encoded as I-frames; where applicable, a more appropriate mechanism for encoding may be used instead, for example, but not limited to, JPEG2000. The screenshots are still decoded as normal, but before decoding, the MPEG decoder sets up pointers to the reference image screenshots which have been decoded previously using a mechanism other than an MPEG decoding engine (such as an MPEG-2 decoding engine).

Figure 37:
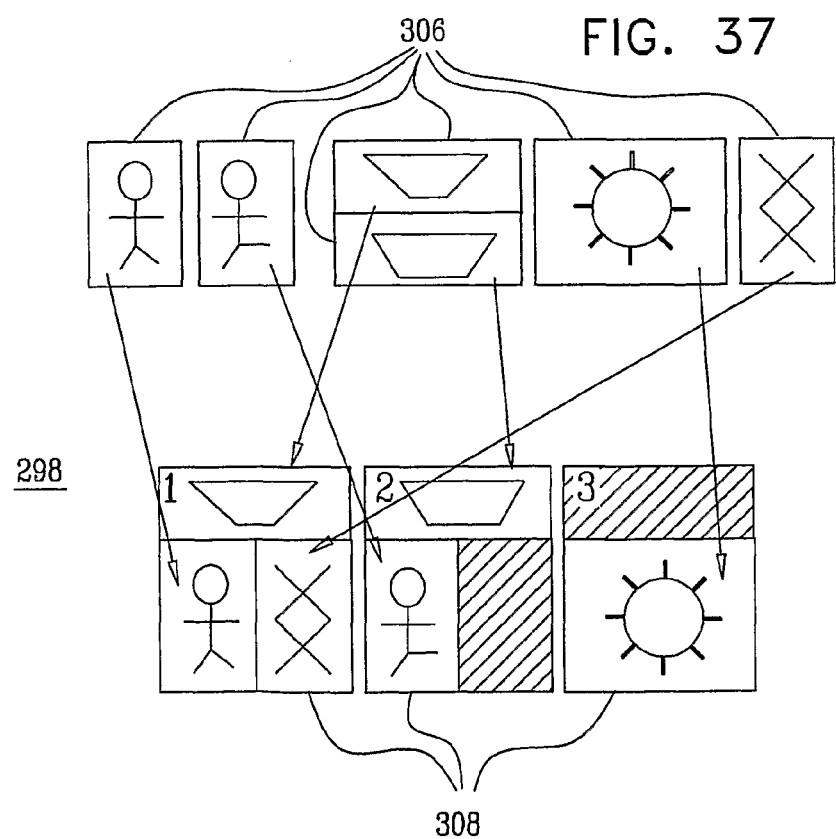
FIG. 37 is a view a plurality of smaller than full-screen size screenshots being combined into a plurality of full-screen size screenshots for use in the compression system of FIG. 34.

Reference is now made to FIG. 37, which is a view a plurality of smaller than full-screen size screenshots 306 being combined into a plurality of full-screen size screenshots 308 for use in the compression system 298 of FIG. 34. Where the screenshots 306 are smaller than full screen, for example, but not limited to, on-screen displays (OSDs), the screenshots 306 are optionally combined into the full-screen size screenshots 308. When the full-screen size screenshots 308 are decoded, only the required section of the image is used. Combining the screenshots 306 into the full-screen size screenshots 308 reduces the total number of image frames requiring storage. Additional information preferably conveys the actual location and size of the sub-image to be extracted from the full-screen size screenshots 308, such as Video Service Information (VSI) from Xtreamplay of NDS Limited.

The compression system 298 preferably also determines the areas of full-screen size screenshots 308 that need to be decoded for each smaller than full-screen size screenshots 306 to be decoded. The decoding area information of the sub-pictures is typically conveyed to the decoder used in decoding the screenshots 306 to improve the efficient decoding of the screenshots 306. Alternatively, the compression system 298 may preferably work from a fixed decoding area and ensure that all the items needed to decode a given sub-picture screenshot 306 occur within the fixed decoding area.

In FIG. 37, the screenshots 306 which are similar have been ordered and placed in the full-screen size screenshots 308 to take advantage of the space available and the way that most long GOP compression schemes derive one picture from the previous picture very efficiently.

Reference is now made to FIG. 38, which is a view of a plurality of images 310 including a plurality of equally sized spare areas 312 for use in the compression system 298 of FIG. 34. If the images 310 do not fill the full area of the screen, then the spare area 312 may be filled with still images or other smaller video sequences (not shown).

Reference is now made to FIG. 39, which is a view of a plurality of images 314 including a plurality of unequal sized spare areas 316 for use in compression system 298 of FIG. 34. If video images 314 expand in size over time, then the spare area 316, available for the insertion of other still or video images, around the images 314, changes with time.

In accordance with a most preferred embodiment of the present invention, where multiple compression mechanisms exist (for example, but not limited to, JPEG-2000, MPEG I-frames, GIF, Vector Graphics), including local software generation of images on the set-top box system 12, a static analysis typically chooses the most appropriate mechanism for any individual part of the screenshot. The parts of the screen shots could then be combined using the motion prediction techniques of MPEG-2 which are able to extract macroblocks of data from one or two reference images. If more than two motion prediction techniques are available, then short sections of MPEG-2 are typically used to combine the relevant parts of several images into the maximum of two reference images for generation of the final image.

The managed decoder 250 (FIG. 29) or the advanced level video effects processor 268 (FIG. 31), by way of example only, are typically suitable for decoding the compressed sequences of the compression system 298.

Reference is now made to FIG. 40, which is a block diagram view of compression system 298 of FIG. 34. The compression system 298 preferably includes an encoder 318 which scans a plurality of input images 320, a plurality of videos 322, a plurality of coordinates 324 of the input images 320 and of the videos 322 and a plurality of parameters 326 for the compression system 298 such as, maximum resolution and decoder characteristics, by way of example only. The encoder 318 is either a real time encoder or a non-real time encoder.

If the encoder 318 is non real time, the encoder 318 is typically a computer operative to iterate many different layouts and orders to find the optimum compression layout. Once the optimum layout has been found, a package of compressed frames 325 and associated metadata are typically written out for sending to a decoder.

If the encoder 318 is a real time encoder, the encoder 318 is typically operative to work in substantially same way as the non-real time encoder, but combinations of layout are generally more limited due to the reduced compression time available.

The encoder 318 preferably includes an analyzing module 319 and a compression module 321 for performing the functions of the compression system 298 described with reference to FIGS. 33-39. The analyzing module 319 and compression module 321 are now described below in order to describe how the functionality of the compression system 298 described with reference to FIGS. 33-39 is allocated between the analyzing module 319 and the compression module 321.

The analyzing module 319 is preferably operative to: analyze the screenshots 320, 322 to identify commonality among the screenshots 320, 322 typically based on macroblock boundaries of the screenshots 320, 322; create a reference frame based on the commonality of the screenshots 320, 322 or determine a suitable pre-existing frame as the reference frame based on the commonality of the screenshots 320, 322 (by way of example only, the pre-existing frame is typically a part of a dictionary of images that resides in a set-top box or the pre-existing frame is one of the screenshots 320, 322); and reorder a sequence of the screenshots 320, 322 so as to improve efficiency of the compression of the screenshots 320, 322.

The compression module 321 is typically operative to compress the screenshots 320, 322, based on the reference frame, into a stream of compressed frames 325 including one or more MPEG B-frames and/or one or more MPEG P-frames.

If the reference frame(s) is not already resident on the receiving devices (the set-top boxes), the reference frame is typically compressed by the compression module as an MPEG I-frame into the stream of the compressed-frames 325. Alternatively, the reference frame is compressed in a different format (such as PNG by way of example only) and sent in a different stream to the stream of compressed frames 325.

In a similar way to the tile processing described above, sets of sprites are typically stored along with a precise PNG alpha mask and a combination of the sprites and the PNG alpha mask are used to define sprite sets which can be loaded into memory.

The decoders of the video effects processor 78 described with reference to FIGS. 24-30 typically pull multiple assets off a disk (not shown) of the set-top box system 12 continuously. The decoders preferably cue up content ahead of time, so therefore, using cueing, and considering disk issues in the design of the video effects, the load on the disk can be managed.

Local video is optionally inserted into the video effects processor 78 (FIG. 13) from special base band inputs and connected input devices, by way of example only. If the local video input is from a local DV based camera device, then a DV based chain including a DV hardware decoder, one of the image transform engines 102 (FIG. 14) and one of the alpha generators 104 (FIG. 16) is preferably included in the video effects processor 78 parallel with the other MPEG I-frame and PNG decoders. The main CPU 212 (FIG. 13) is typically operative to extract frames from the input device and pass the frames to the video effects processor 78 through the DV input route, by way of example only.

Similarly, if the local video input is from a base band video input, then frames of video preferably enter the video effects processor 78 (FIG. 13) through a chain including one of the image transform engines 102 (FIG. 14) and one of the alpha generators 104 (FIG. 16).

Figure 41:
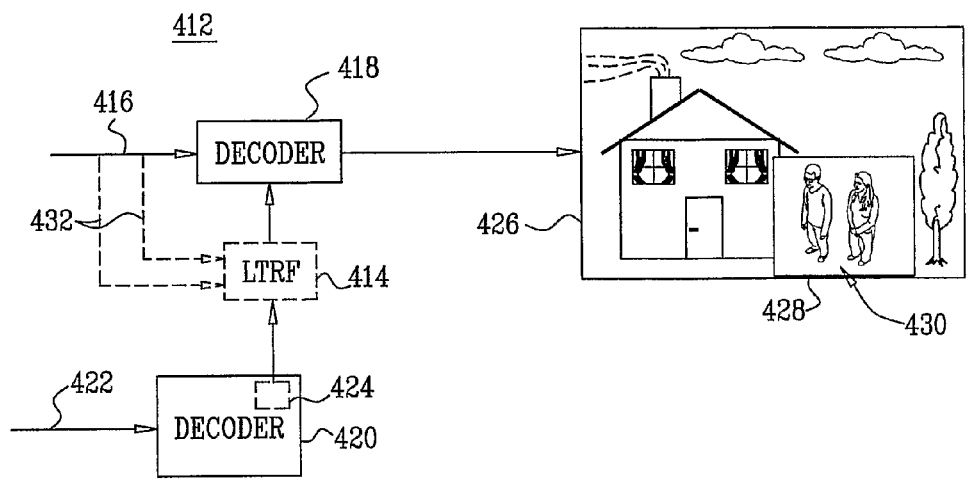
FIG. 41 is a block diagram view of a picture-in-picture system constructed and operative in accordance with a preferred embodiment of the present invention.

Reference is now made to FIG. 41, which is a block diagram view of a picture-in-picture system 412 constructed and operative in accordance with a preferred embodiment of the present invention. By way of introduction, newer compression standards such as 14496-10 (AVC) allow the decoder to utilize long term reference frames (LTRFs) which are typically used as a source for the final decoded image. The LTRFs are not subject to the usual update and replace cycles whereby reference frames are updated and/or replaced by new reference frames arriving in the video sequence being decoded.

The set-top box system 12 is preferably implemented with twin decoders 418, 420 such that a picture-in-picture style display is typically performed utilizing an LTRF 414 without any specific additional hardware. Consider two video streams, a video stream 416 and a video stream 422. The video stream 416 is specially encoded such that part of the video stream 416 includes one or more references 432 to the LTRF 414, but the LTRF 414 is never transmitted in the main video transport stream. The decoder 418 for the stream 416 is set up such that the LTRF 414 points to an output frame 424 of the decoder 420. The decoder 420 is started in order to decode the video stream 422, but without driving an output. When the stream 416 is decoded and displayed, the result is an output 426 including a video window 428 that displays a video 430 of the stream 422. By control over which stream is played, including which is displayed off disk, a personalized insert is available. By control over the encoder, the location of the display is also controllable.

Figure 42:
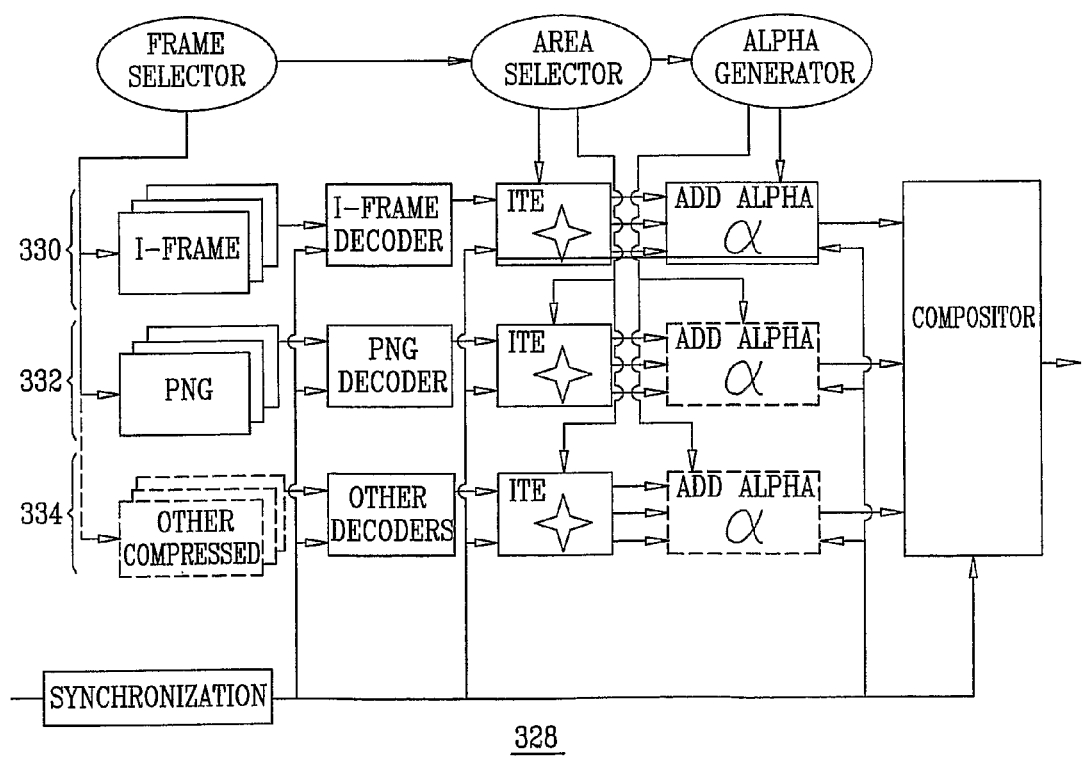
FIG. 42 is a block diagram view of a most preferred basic level video effects processor for use with the set-top box system of FIG. 13.

Reference is now made to FIG. 42, which is a block diagram view of a most preferred basic level video effects processor 328 for use with the set-top box system 12 of FIG. 13. The basic level video effects processor 328 includes an MPEG chain 330, a PNG chain 332 and one or more chains 334 for other compressed video formats.

Figure 43:
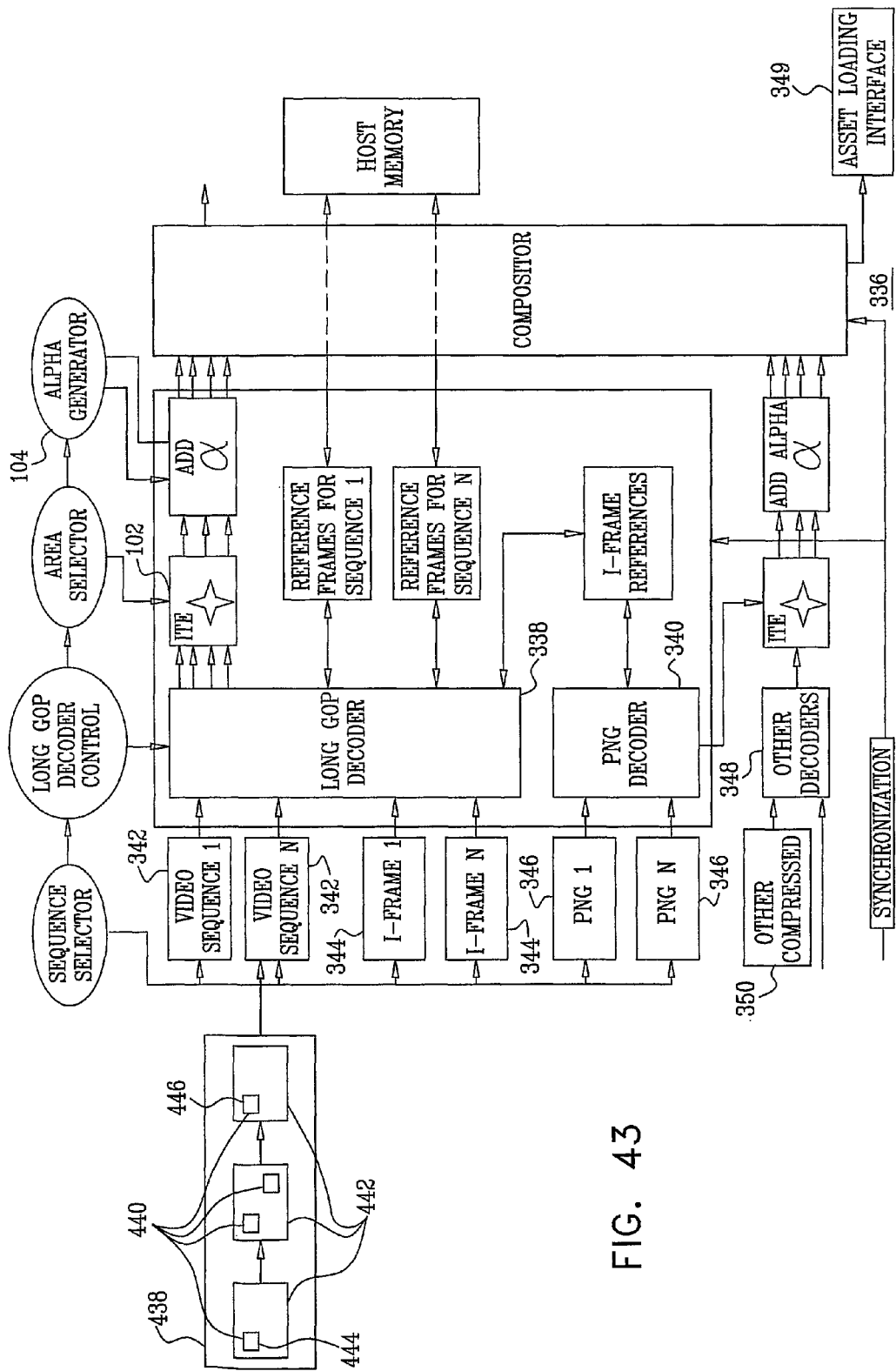
FIG. 43 is a block diagram view of a most preferred advanced level video effects processor for use with the set-top box system of FIG. 13.

Reference is now made to FIG. 43, which is a block diagram view of a most preferred advanced level video effects processor 336 for use with the set-top box system 12 of FIG. 13. The advanced level video effects processor 336 includes: a Long GOP processor 338 for a plurality of video sequences 342 and a plurality of I-frames 344; and a PNG decoder 340 for decoding a plurality of PNGs 346. The advanced level video effects processor 336 includes one of the alpha generators 104. The advanced level video effects processor 336 also includes a plurality of other decoders 348 for decoding a plurality of other compressed video formats 350. The advanced level video effects processor 336 also preferably includes an asset loading interface 349 to capture frames before the frames are sent for display, the frames typically being routed back to disk storage (not shown).

The advanced level video effects processor 336 is also preferably operative to seamlessly loop-decode and concatenate. A storage arrangement, such as the disk arrangement 205 of FIG. 22, is preferably operative to store a compressed video clip 438 formed from a plurality of sub-regions 440 of one or more video frames 442. The video clip 438 has a start 444 and an end 446. The Long GOP processor 338 is preferably operative to: decode only the sub-regions 440 of the video frames 442 with a seamless cut between the start 444 and the end 446 of the video clip 438; and/or seamlessly concatenate the video clip 438 onto the end of a clip (not shown) that is currently playing.

The decoding limit of the decoder 338 is generally not restricted to a fixed number of streams 342 at a fixed decoding rate. The advanced level video effects processor 336 is preferably operative such that the number of movie video thumbnails or image decodes (video sequences 342) decoded at any one time by the decoder 338 depends on the total size of the images for decoding and the maximum processing speed of the decoder 338. By way of example only, it may be possible to decode 16 streams, each with a resolution of 352 by 288 pixels, or two streams with a resolution of 1408 by 576 pixels. Additionally, the flexibility of the decoder 338 may be used to decode a stream faster than would normally be allowed with a fixed limit decoder. By way of example only, an image having a resolution of 704 by 576 pixels may be decoded in one-quarter of the normal time taken by a fixed limit decoder.

Additionally, the advanced level video effects processor 336 is preferably operative to: receive a compressed frame (for example, but not limited to, the compressed frame 442) which is too large for decoding by the Long GOP processor 338; and decode only a sub-region (for example one of the sub-regions 440) of the compressed frame. The sub-region is up to the maximum image size supported by the speed of the Long GOP processor 338. The compressed frame is larger than the maximum image size supported by the Long GOP processor 338. By way of example only, the decoder 338 can decode an image of resolution 2816 by 576 pixels contained within an image having a resolution of 4096 by 4096 pixels.

Reference is now made to FIG. 44, which is a block diagram view of the graphical effects processor 80 for use with the set-top box system 12 of FIG. 13. The graphical effects processor 80 is preferably used to create any suitable graphical elements or effects which are created dynamically in the set top box 12 (rather than being pre-rendered by the broadcaster/content provider). The graphical elements or effects generally include, by way of example only, vector and image based graphics, text, 3D geometry based graphics and any suitable effects dynamically applied to vector and image based graphics, text and 3D geometry based graphics. The graphical effects processor 80 is linked to and complimentary to the video effects processor 78 (FIG. 13). The graphical effects processor 80 is operative to accept any suitable bitmap based assets from the video effects processor 78 (FIG. 13).

The graphical effects processor 80 is preferably operative to support the creation of suitable graphical features in the set-top box system 12, in particular, where doing so reduces the overall cost of bandwidth and storage such that the savings result in a net benefit to the manufacturer of the set-top box system 12. The graphical effects processor 80 is preferably operative to support a timeline synchronization 356 required to allow for time sequenced presentation effects for example, but not limited to, knowing when to ask the video effects processor 78 to extract and decode requested assets.

FIG. 44 shows a hardware stack 352 and a software stack 354 of the graphical effects processor 80. The software stack 354 is shown in order to describe the full context for the graphical effects processor 80. It should be noted that it may also be necessary to partition some of the software stack 354 functionality into a separate dedicated graphics CPU (not shown). The descriptions below are therefore separated in to hardware and software in order to describe the full functionality of the graphical effects processor 80.

Figure 45:
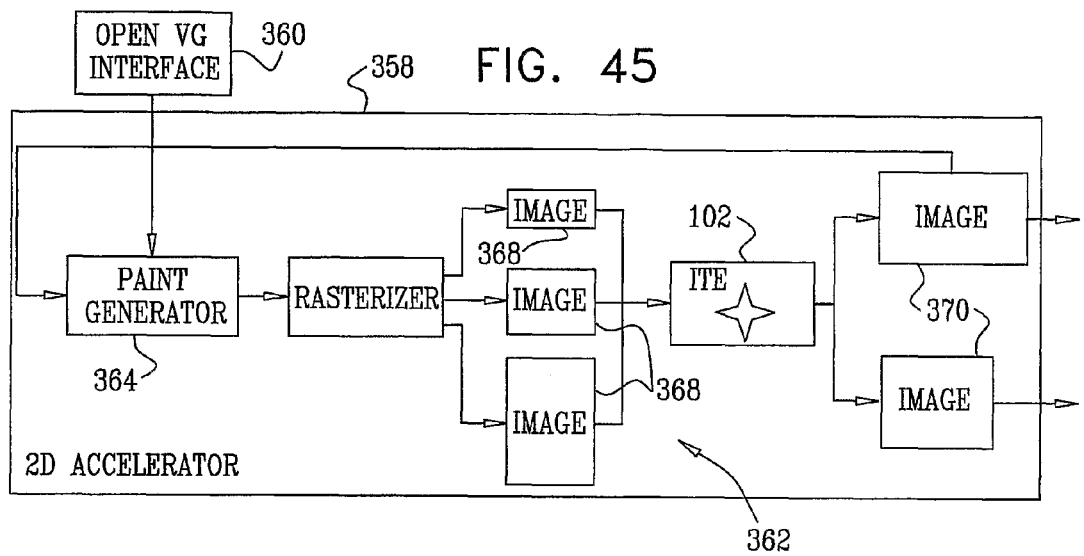
FIG. 45 is a block diagram view of a 2D accelerator of the graphical effects processor of FIG. 44.

Reference is now made to FIG. 45, which is a block diagram view of a 2D accelerator 358 of the graphical effects processor 80 of FIG. 44. The 2D accelerator 358 is arranged as a pipeline 362 which is used to generate raster based graphics from paths and paints. The 2D accelerator 358 includes an interface 360 which is typically an OpenVG v1.0 Interface. The flow of information through the pipeline 362 is preferably as described below.

The 2D accelerator 358 typically includes a paint generator 364, which generates paints. The paints are typically bitmaps loaded through the interface 360. Alternatively or additionally, the paints are generated mathematically from within the paint generator 364, in which case, the paints are typically solid color or gradient fills, by way of example only.

The 2D accelerator 358 includes a rasterizer 366 which subsequently uses the paints generated by the paint generator 364.

The rasterizer 366 typically generates bitmap rasters. The inputs to the rasterizer 366 are paths, transforms, strokes and fills. Paths are sets of points, joined together in a particular way. Paths are typically joined by straight lines and/or curved lines, by way of example only, to form a line, curve and/or bounded area/region. The lines or regions are then either filled by a paint and/or stroked by a paint. Fills are performed based on rules. Strokes are typically painted along a path with a paint. The paints are typically applied to a brush which is used to stroke along paths, or fill an area bounded by a closed path. The brush has characteristics like beveled edges and/or rounded ends (by way of example only). Transforms typically include rotations, scaling and/or skewing. Transforms are typically the same as the transforms performed in the raster domain by the image transform engine 102, but the transforms performed by the rasterizer 366 are typically performed before any rasterization, in order not to compromise quality. By way of example only, scaling in the vector domain generally incurs no quality loss, but scaling in the raster domain typically results in quality loss. Vector scaling is particularly useful for scaling text, by way of example only.

Any output from the rasterizer 366 is full 32 bit color with an 8 bit alpha channel and is fully anti-aliased.

The rasterizer 366 typically generates a plurality of different raster images 368 per frame. The raster images 368 generally continue through the pipeline 362 to become part of complex graphical constructions. The final part of the pipeline 362 uses the image transform engine 102 to perform functions in the raster domain typically including a deflicker operation, for example, before blending sets of vector originated rasters into the final composition. A plurality of memory buffers 370 including the final compositions are then passed downstream for compositing with the main broadcast feeds in the video compositor 82 (FIG. 13).

The 2D accelerator 358 preferably supports at least two contexts (two separate fully composited outputs), at the maximum resolution and frame rate supported by the outputs. It should be noted that more outputs may be required if the set-top box system 12 needs to support multiple simultaneous TV outputs.

OpenVG only specifies a nearest neighbor interpolation kernel. Therefore, the image transform engine 102 is typically operative to support a bilinear kernel, and preferably, support a bicubic kernel.

The 2D accelerator 358 preferably supports YUV images (4:4:4, 4:2:0, 4:2:2, 4:1:1) by way of example only.

Reference is again made to FIG. 44.

The 2D accelerator 358 is a general purpose engine which preferably accelerates the basic functions required for a vector graphics operation. The software stack 354 disposed above the 2D accelerator 358 preferably performs functions generally required for the set-top box system 12 described below.

The graphical effects processor 80 optionally includes a 3D hardware accelerator 372 which is typically OpenGL-ES based.

The software stack 354 preferably includes a vector library 374 preferably operative to support drawing vector primitives not defined in OpenVG. The software stack 354 preferably includes the VGU Utility Library as defined in Open VG 1.0. The VGU Utility Library typically supports creation of, and appending to paths, the following shapes, by way of example only: lines, polylines, polygons, rectangles, rounded rectangles, ellipses (including circles) and arcs. The vector library 374 preferably supports transforms (for example, but not limited to, 3×3 affine; supporting scaling, rotation and shearing).

The software stack 354 preferably includes a text library 376 generally operative to provide advanced text rendering support for example: at the character level including face, color, style, weight, size, kerning, vector transforms (3×3 affine, supporting scaling, rotation and shearing); and text layout functions, such as flowing text to fit arbitrary shaped bounding boxes, line spacing and breaking and hyphenation, handling of international character sets and presentation, rendering text to arbitrary paths including curves; of vector and/or bitmap font library.

The software stack 354 preferably also includes an image processing library 378 typically operative to support image manipulations including for example: image blending (alpha based porter-duff); transform manipulation (3×3 projective); other deformations such as page turns; color manipulation (brightness, contrast, hue/saturation/lightness); channel splitting, mixing and combining; convolution kernel based filtering (maximum kernel size as per OpenVG) including blurs (Gaussian), sharpening, edge detection and/or embossing; additive noise and dithering; sub-pixel shift re-sampling; pixel format conversion; programmatic texture generation (tile based, radial and linear gradient fills); and image file format decoding.

It should be noted that the 2D accelerator 358 is generally assumed to use the image transform engine 102 (FIG. 14) or decoders of the video effects processor 78 (FIG. 13) for some or all of the functionality of the image processing library 378.

The software stack 354 also preferably includes an animation/effects library 380 preferably operative to support: TV-centric effects including moving highlights and lens flare; motion path based animation of vector primitives; physics based motion path generator that models ballistics, gravity, bounces and/or collisions; auto generation of alpha planes (drop shadow and luma/chroma key); and text specific effects such as reveals, fades, flips, smooth scrolling banners.

The software stack 354 also typically includes a vector file parser 382 preferably operative to parse the following file formats: Macromedia Flash (SWF) file format version; and SVG Basic 1.2 (documents and document fragments) including gzip and BinXML compressed variants.

The software stack 354 preferably includes a software graphics stack 384 and a control and timing module 436 to manage the control and timing of a graphics effect. The software stack 354 optionally includes a 3D library 386 to support the 3D hardware accelerator 372.

In the absence of the 3D accelerator 372, the 3D library 386 preferably includes a software vertex transformation engine (not shown) that is typically used to generate screen coordinates for vertices in a simple 3D model. The screen coordinates are then typically used to derive projected and affine transformations used by the image transform engine(s) 102 (FIG. 14) for video and graphics scaling used in 'pseudo 3D' effects and transitions.

Figure 46:
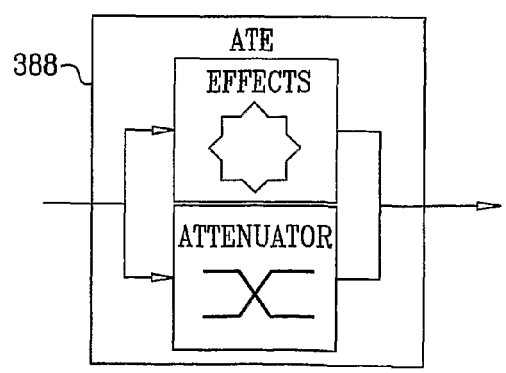
FIG. 46 is a block diagram view of an audio transfer engine for use in the set-top box system of FIG. 13.

Reference is now made to FIG. 46, which is a block diagram view of an audio transfer engine 388 for use in the audio effects processor 84 of the set-top box system of FIG. 13.

As TV systems migrate towards HD, it is expected that the quality of audio will have to increase at the same time, necessitating higher quality audio outputs, more audio outputs, analogue and digital formats simultaneously.

The audio effects processor 84 (FIG. 13) is used to generate all audio outputs and effects in the set-top box system 12, and co-ordinate the audio outputs and effects together with the rest of the set-top box system 12. It should be noted that it is assumed that any multi-language audio issues have been resolved in the main CPU 212 (FIG. 13) prior to the audio streams entering the audio effects processor 84.

The sources of audio in the set-top box system 12 are generally: live off-air broadcasts with formats ranging from mono to multi-channel; locally stored disk based audio, originating from live-off air broadcasts with formats ranging from mono to multi-channel; locally stored disk based assets such as MP3s and home made videos with formats ranging from mono to multi-channel; local audio feeds for example, but not limited to, local microphones or attached devices with formats ranging from mono to multi-channel; local audio samples; and locally created audio such as synthesis. The term "local" as used in the specification and claims is defined as being in the location of the set-top box system 12, as opposed to being in the location of a Headend or a broadcaster or a content provider.

The audio effects processor 84 is preferably operative to include the following processing options: process nothing, for example, but not limited to, making sure that for normal viewing of TV programs, as little processing as possible is made to the audio channel; transitions so that in the same way that video transitions are described hereinabove, the corresponding audio transitions are preferably supported, including control of volume and the speed/timing/shape of the associated ramp is required, for example, but not limited to, when changing channels or when new content is inserted or when transitioning to alternative screens; mixing, including control over which of the many input audio feeds makes it through the set-top box system 12, the volume of the input and which channel the input appears on; audio sound effects, for example, but not limited to, reverb may be added to any of the audio streams; compression so that a rich audio experience is provided while minimizing transmission bandwidths or storage requirements, for example, extensive use of compression is preferably made for stored or transmitted audio clips; synthesis for the generation of musical sound tracks or effects for games and EPGs, by way of example only. The synthesis is preferably performed in order to minimize the transmission and storage requirements for the audio effects processor 84. The synthesis is preferably Wavetable based, polyphonic and provides the quality of audio experience that is at least as good as mobile phone polyphonic synthesizers.

The audio transfer engine 388 is preferably a building block of the audio effects processor 84. The audio transfer engine 388 preferably performs effects on audio samples as the audio travels through the audio transfer engine 388. The audio transfer engine 388 preferably performs the following functions: changing the attenuation of audio channels under software control including fixed attenuation or ramp-like gain profiles where the shape of the attenuation profile is definable; and effects including reverb, echo, time stretching, panning, pitch shifting and dynamic range compression.

The audio transfer engine 388 is preferably operative to apply multiple operations to audio streams as the audio streams are passing through the audio effects processor 84. Each audio transfer engine 388 only operates on one mono audio stream, although there are many audio streams in the set-top box system 12.

Reference is now made to FIG. 47, which is a block diagram view of the audio effects processor 84 of the set-top box system 12 of FIG. 13. The audio effects processor 84 typically includes a managed audio decoder 390 preferably operative to playout a plurality of stereo audio streams 392, for example, but not limited to, 16 stereo audio streams 392, each of the stereo audio streams 392 being controlled with sample accuracy. Transitions between the stereo audio streams 392 and other streams in the audio effects processor 84 are made through a combination of the audio transfer engine 388 and the audio mixer 394. To do a cross fade audio transition, for example, the audio transfer engines 388 typically change the attenuation of audio channels with a software defined ramp profile, such that once mixed at the audio mixer 394, the effect is to fade one channel out and the other channel in.

A plurality of audio streams 396 entering the audio effects processor 84 are typically mono, stereo or multi-channel in pulse code modulated (PCM) format. The audio streams 396 may have different sample precisions and rates. In order to rationalize the different formats, the audio transfer engines 388 and the audio mixer 394 preferably operate on mono-only streams and at a multiple of the highest sample rate.

The audio effects processor 84 preferably includes an audio crossbar switch and splitter 398. All the audio streams 396 are split into channels on entry to the audio crossbar switch and splitter 398. The channels of the audio streams 396 are routed out of the audio crossbar switch and splitter 398 on a plurality of software defined outputs 402.

The audio transfer engines 388 are preferably operative to perform operations on the various outputs 402 of the audio crossbar switch and splitter 398, for example, but not limited to, attenuation or reverb effects. Each mono stream output 402 processed by the audio transfer engines 388 is then typically input as an input feed 404 into the audio mixer 394 for mixing into a final output presentation.

As the input feeds 404 are mono, the audio mixer 394 preferably has complete control over where any audio is positioned in a multi-channel audio presentation.

When an audio stream 406 leaves the audio mixer 394, the audio stream 406 is optionally processed by one of the audio transfer engines 388, for example, but not limited to, applying an overall attenuation or an effect such as dynamic range compression.

As described above, the managed audio decoder 390 is preferably operative to handle multiple stored compressed stereo audio streams 392. The managed audio decoder 390 is typically an audio equivalent of a managed video decoder such as the managed decoder 250 of FIG. 29. The managed audio decoder 390 preferably has the following features: cueing-up separate audio streams, for example, but not limited to, up to 16 separate audio streams, to a known audio sample start point; playing an audio stream which was previously been cued up; looping an audio sample with the loop point at a sample accurate location in the stream; concatenating and inserting audio streams with sample accuracy; allowing control software (not shown) to define the stream, sample start/end; providing interrupts to software to indicate start/end; coordinating with audio transfer engines 388 to allow for downstream audio effects and transitions; synchronizing playout with the rest of the system (block 408); and any suitable audio compression format supported by the audio effects processor 84 is typically supported, so by way of example only, if the audio effects processor 84 supports a multi-channel compressed format, then so does the managed audio decoder 390.

The audio effects processor 84 also preferably includes an audio midi synthesizer 410. The audio midi synthesizer 410 is preferably used to generate music for games, iTV applications and EPGs where bandwidth and storage requirements cannot be satisfied using other methods. The audio midi synthesizer 410 is preferably a low-cost Wavetable synthesizer similar to Wavetable synthesizers in polyphonic mobile phones, by way of example only.

User input is assumed to come from any number of suitable sources, and is generally platform dependent. User input for the set-top box system 12 preferably includes the following features: any suitable remote control functionality is preferably two-way; multiple controllers are preferably supported; and pressing keys simultaneously is preferably supported, for example, but not limited to, up to four keys simultaneously.

Any suitable user inputs having an audio capability are preferably either: hard-wired to one of the inputs of the audio effects processor 84 and therefore the inputs are controllable through the audio effects processor 84; or the audio is accessible to the main CPU 212 (FIG. 13) and any suitable audio streams may be fed into one of the audio transfer engines 388.

Any suitable user inputs having video capability are preferably either hard wired into the video effects processor 78 (FIG. 13), or frame's of the video feeds are read and inserted into the video effects processor 78 (FIG. 13) with minimal overhead of the main CPU 212 (FIG. 13).

It should be noted that if a plug-in architecture is required by the platform operator to handle features like additional downloadable video or audio processing, for example, a plug-in architecture is typically provided by supplying additional spare CPU power in the hardware design of the set-top box system 12.

The set-top box system 12 optionally includes a middleware based plug-in architecture (not shown) by giving full access to all video and audio paths through the set-top box system 12 from any suitable general purpose CPU. The plug-in feature is typically arranged as described above in order to minimize hardware costs.

It is appreciated that software components of the present invention may, if desired, be implemented in ROM (read only memory) form. The software components may, generally, be implemented in hardware, if desired, using conventional techniques.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

What is claimed is:

1. A set-top box system for cueing up of material, the system comprising:
    a storage arrangement to store a plurality of videos; and
    a first decoder operationally connected to the storage arrangement, the first decoder having a dedicated decoding buffer, the first decoder being operative to:
        decode one of the videos off of the storage arrangement;
        stop decoding the one video at a first specific frame;
        save at least one reference frame and a plurality of decoding state information from the first decoder into a storage element which is external to the dedicated decoding buffer, the at least one reference frame and the decoding state information being necessary to allow restarting the decoding from the first specific frame; then
        loading the at least one reference frame and the decoding state information from the storage element in to the first decoder; and then
        restarting the decoding from the first specific frame at a future point in time.

2. A set-top box system to display a video of a first video stream including a window displaying a video of a second video stream using a long-term reference frame, the system comprising:
    a first decoder to decode the first video stream, the first video stream including a reference to the long-term reference frame; and
    a second decoder to decode the second video stream, the second decoder having an output frame, the first decoder being configured such that the long-term reference frame referenced in the first video stream points to the output frame of the second decoder, the second decoder being operative to decode the second video stream without driving an output such that when the first video stream is decoded and displayed, the display includes a picture-in-picture display with the video of the second video stream displayed in a window over the video of the first video stream.

* * * * *

UNITED STATES PATENT AND TRADEMARK OFFICE
Certificate

Patent No. 8,069,466 B2　　　　　　　　　　　　　　　　Patented: November 29, 2011

On petition requesting issuance of a certificate for correction of inventorship pursuant to 35 U.S.C. 256, it has been found that the above identified patent, through error and without any deceptive intent, improperly sets forth the inventorship.
   Accordingly, it is hereby certified that the correct inventorship of this patent is: Ian Shelton, Ringwood (GB); James Geoffrey Walker, Guildford (GB); Kevin Murray, Fordingbridge (GB); Michael Costello, Middlesex (GB); Nicholas Ashton Hall, Walton-on-Thames (GB); and Neil Cormican, London (GB)

Signed and Sealed this Fourteenth Day of May 2013.

<div align="right">

SCOTT BELIVEAU
*Supervisory Patent Examiner*
Art Unit 2427
Technology Center 2400

</div>